(12) United States Patent
Goto

(10) Patent No.: US 11,966,450 B2
(45) Date of Patent: Apr. 23, 2024

(54) CALCULATION DEVICE, CALCULATION METHOD, AND COMPUTER PROGRAM PRODUCT

(71) Applicant: KABUSHIKI KAISHA TOSHIBA, Tokyo (JP)

(72) Inventor: Hayato Goto, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 147 days.

(21) Appl. No.: 17/185,748

(22) Filed: Feb. 25, 2021

(65) Prior Publication Data
US 2022/0083315 A1 Mar. 17, 2022

(30) Foreign Application Priority Data
Sep. 15, 2020 (JP) .............................. JP2020-154794

(51) Int. Cl.
*G06F 17/11* (2006.01)
(52) U.S. Cl.
CPC ..................... *G06F 17/11* (2013.01)
(58) Field of Classification Search
CPC .......... G06F 17/10; G06F 17/11; G06F 17/13; G06F 17/18; G06F 7/02–026; G06N 10/00–80; G06N 10/60
See application file for complete search history.

(56) References Cited

U.S. PATENT DOCUMENTS

2019/0266212 A1   8/2019   Goto et al.

FOREIGN PATENT DOCUMENTS

| JP | 2017-73106 A  | 4/2017 |
|----|---------------|--------|
| JP | 2019-145010 A | 8/2019 |
| JP | 2021-43667 A  | 3/2021 |

OTHER PUBLICATIONS

Goto et al. "Supplementary Materials for Combinatorial optimization by simulating adiabatic bifurcations in nonlinear Hamiltonian systems" https://www.science.org/doi/10.1126/sciadv.aav2372?_ga= 2.178000805.127732808.1663616893-1950832234.1663444792& (Year: 2019).*

(Continued)

*Primary Examiner* — Andrew Caldwell
*Assistant Examiner* — Carlo Waje
(74) *Attorney, Agent, or Firm* — Finnegan, Henderson, Farabow, Garrett & Dunner, LLP

(57) ABSTRACT

According to an embodiment, a calculation device includes a memory and one or more processors configured to update, for elements each associated with first and second variables, the first and second variables for each unit time, sequentially for the unit times and alternately between the first and second variables. In a calculation process for each unit time, the one or more processors are configured to: for each of the elements, update the first variable based on the second variable; update the second variable based on the first variables of the elements; when the first variable is smaller than a first value, change the first variable to a value of the first value or more and a threshold value or less; and when the first variable is greater than a second value, change the first variable to a value of the threshold value or more and the second value or less.

22 Claims, 26 Drawing Sheets

(56) References Cited

OTHER PUBLICATIONS

Yu Zou and Mingjie Lin on "Massively Simulating Adiabatic Bifurcations with FPGA to Solve Combinatorial Optimization" in Proceedings of the 2020 ACM/SIGDA International Symposium on Field-Programmable Gate Arrays (FPGA '20). https://doi.org/10.1145/3373087.3375298 (Year: 2020).*

Hennessy et al., "Computer Organization and Design: The Hardware/Software Interface", Fifth Edition, Chapters 1-2 pp. 1-174, 2014. Retrieved from <https://ict.iitk.ac.in/wp-content/uploads/CS422-Computer-Architecture-ComputerOrganizationAndDesign5thEdition2014.pdf> (Year: 2014).*

Goto, H., Endo, K., Suzuki, M., Sakai, Y., Kanao, T., Hamakawa, Y., Hidaka, R., Yamasaki, M., & Tatsumura, K. (2021). High-performance combinatorial optimization based on classical mechanics. Science Advances, 7. (Year: 2021).*

A. Lucas, "Ising formulations of many NP problems," Frontiers in Physics, vol. 2, Article 5, 15 pages (2014).

M.W. Johnson et al., "Quantum annealing with manufactured spins," Nature, vol. 473, pp. 194-198 (2011).

T. Inagaki et al. "A coherent Ising machine for 2000-node optimization problems," Science, vol. 354, No. 6312, pp. 603-606 (2016).

H. Goto, "Bifurcation-based adiabatic quantum computation with a nonlinear oscillator network," Sci. Rep., vol. 6:21686, 8 pages (2016).

M. Yamaoka et al., "A 20k-Spin Ising Chip to Solve Combinatorial Optimization Problems With CMOS Annealing," IEEE J. Solid-State Circuits, vol. 51, No. 1, pp. 303-309 (2016).

S. Tsukamoto et al., "An Accelerator Architecture for Combinatorial Optimization Problems," Fujitsu Sci. Tech. J., vol. 53, No. 5, pp. 8-13 (2017).

Hayato Goto, et al., "Combinatorial optimization by simulating adiabatic bifurcations in nonlinear Hamiltonian systems," Science Advances, vol. 5, eaav2372, 8 pages (2019).

Egor S. Tiunov, et al., "Annealing by simulating the coherent Ising machine," Optics Express, vol. 27, No. 7, pp. 10288-10295 (2019).

* cited by examiner

FIG.8
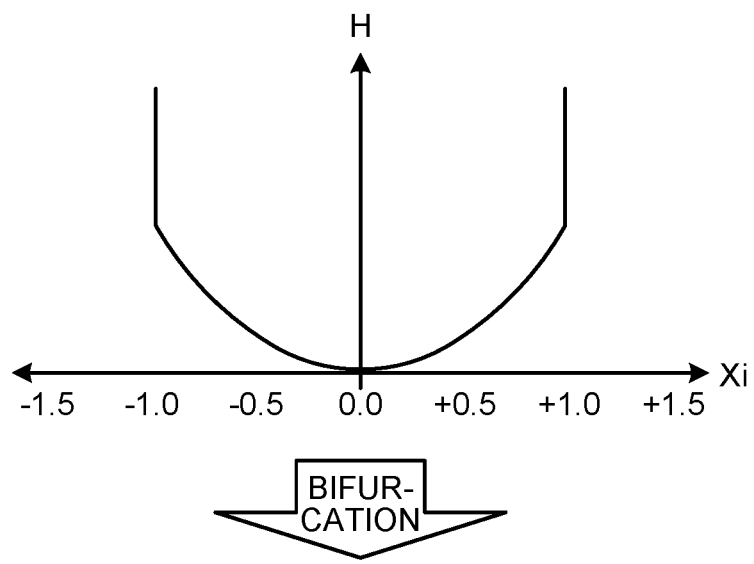
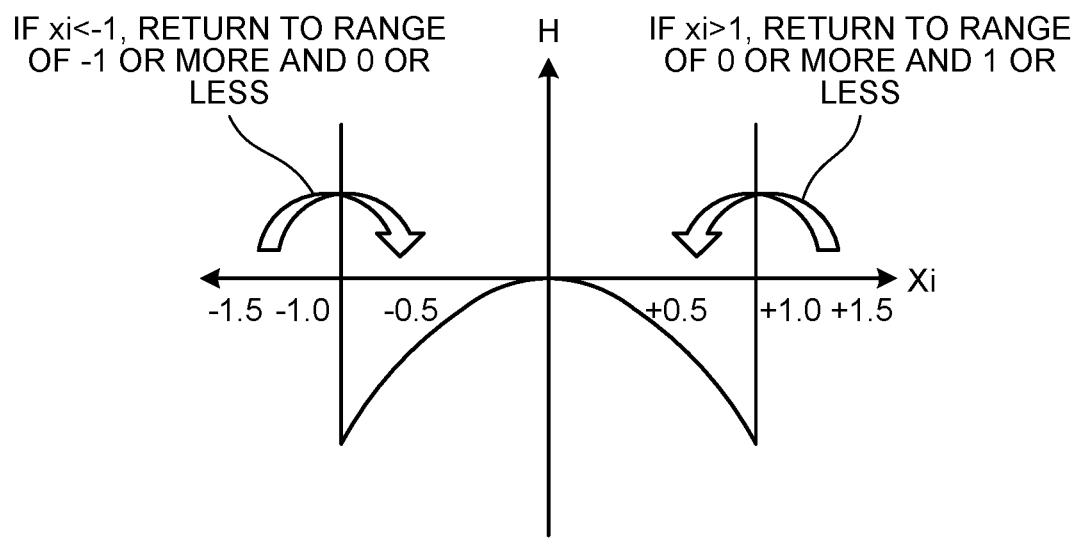

MEAN VALUE IN 1000 TIMES

MAXIMUM VALUE IN 1000 TIMES

MEAN VALUE IN 1000 TIMES

MAXIMUM VALUE IN 1000 TIMES

MEAN VALUE IN 1000 TIMES

MAXIMUM VALUE IN 1000 TIMES

MEAN VALUE IN 1000 TIMES

MAXIMUM VALUE IN 1000 TIMES

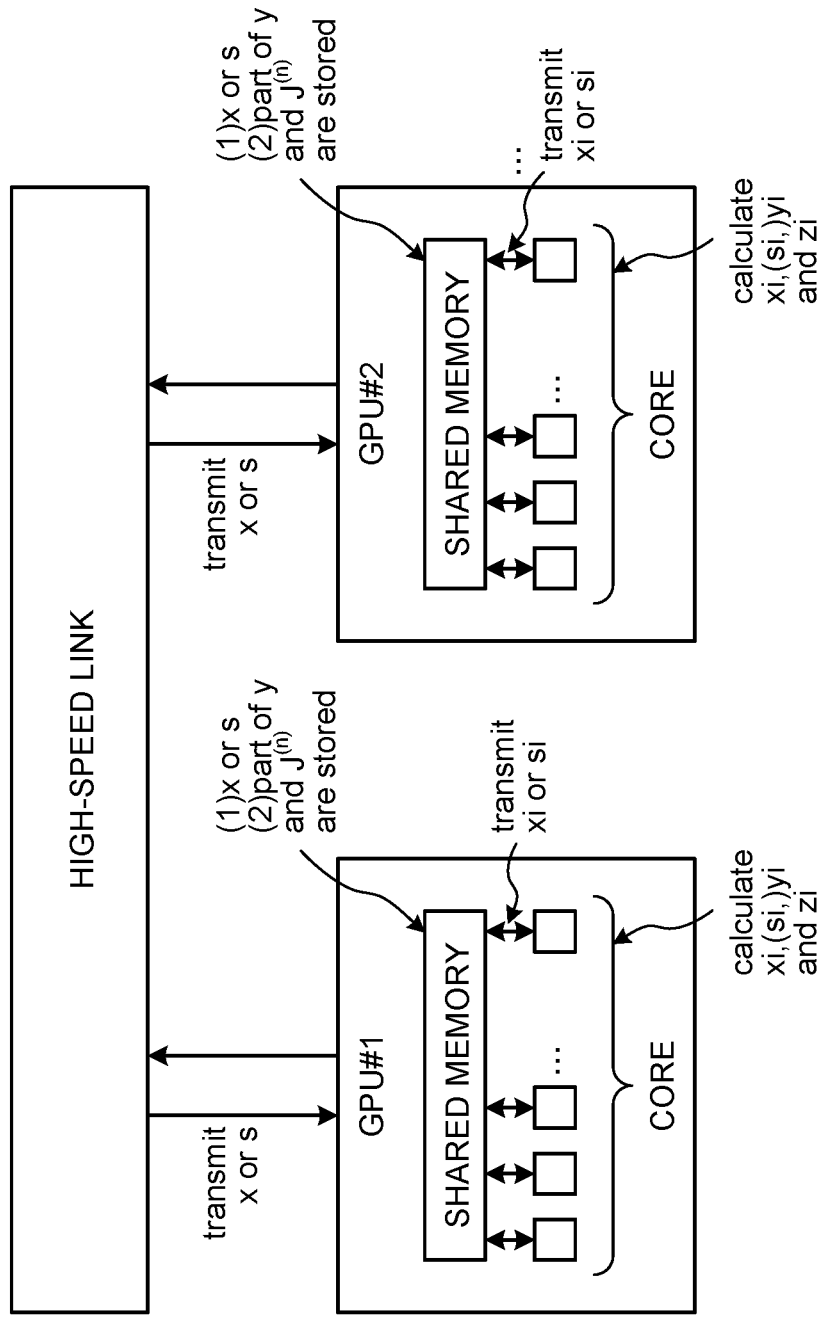

CALCULATION DEVICE, CALCULATION METHOD, AND COMPUTER PROGRAM PRODUCT

CROSS-REFERENCE TO RELATED APPLICATIONS

This application is based upon and claims the benefit of priority from Japanese Patent Application No. 2020-154794, filed on Sep. 15, 2020; the entire contents of which are incorporated herein by reference.

FIELD

Embodiments described herein relate to a calculation device, a calculation method, and a computer program product.

BACKGROUND

Combinatorial optimization problems are problems of selecting a combination most suitable for a purpose from among a plurality of combinations. Combinatorial optimization problems are mathematically reduced to problems of maximizing a function, called an "objective function", having a plurality of discrete variables, or problems of minimizing the function. While combinatorial optimization problems are universal problems in various fields such as finance, logistics, transportation, designing, manufacturing, and life science, optimal solutions are not always found because of "combinatorial explosion" in which the number of combinations increases exponentially with the problem size. Moreover, it is often difficult to obtain even an approximate solution close to the optimal solution.

Technologies for calculating a solution to a combinatorial optimization problem in a practical time frame have been exploited in order to solve problems in various fields and promote social innovation and progress in science technologies.

BRIEF DESCRIPTION OF THE DRAWINGS

FIG. 8 is a diagram illustrating an example of bifurcation in an algorithm in which the absolute value of $x_i$ does not exceed 1;

FIG. 16 is a diagram schematically illustrating an example of a configuration using GPUs;

DETAILED DESCRIPTION

Figure 1:
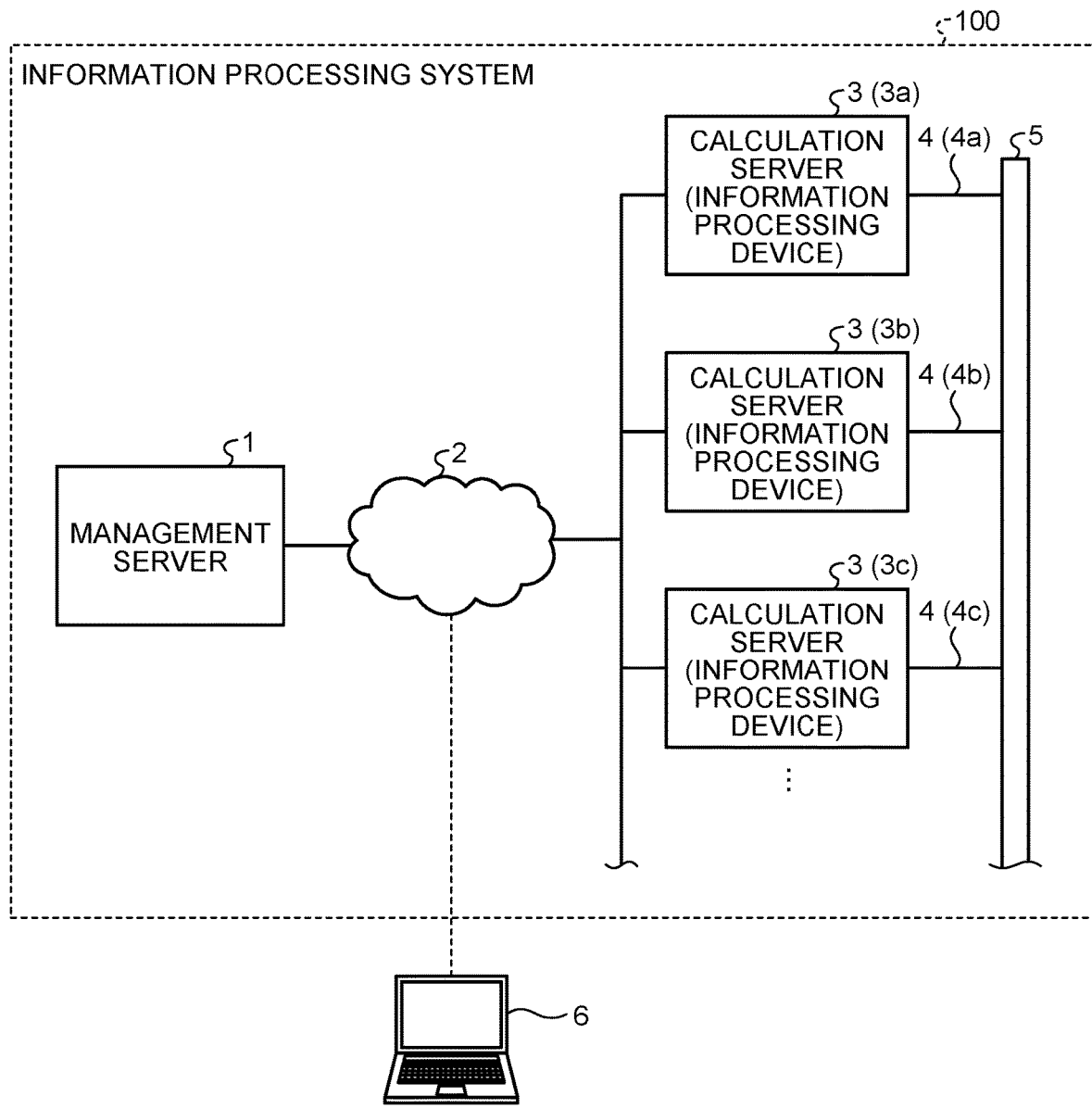
FIG. 1 is a diagram illustrating a configuration example of an information processing system.

According to an embodiment, a calculation device configured to solve a combinatorial optimization problem includes a memory and one or more processors coupled to the memory. The one or more processors are configured to: update, for a plurality of elements each associated with a first variable and a second variable, the first variable and the second variable for each of unit times from an initial time to an end time, sequentially for the unit times and alternately between the first variable and the second variable; and output a solution to the combinatorial optimization problem based on the first variables of the plurality of elements at the end time. The plurality of elements correspond to a plurality of discrete variables representing the combinatorial optimization problem. The first variables and the second variables are represented by a real number. In a calculation process for each of the unit times, the one or more processors are configured to, for each of the plurality of elements: update the first variable based on the second variable; update the second variable based on the first variables of the plurality of elements; when the first variable is smaller than a predetermined first value, change the first variable to a value equal to or greater than the first value and equal to or smaller than a predetermined threshold value; and when the first variable is greater than a predetermined second value, change the first variable to a value equal to or greater than the threshold value and equal to or smaller than the second value. The second value is greater than the first value, and the threshold value is greater than the first value and smaller than the second value.

Embodiments will be described below with reference to the accompanying drawings. In the drawings, the same constituent elements are denoted by the same numbers and a description thereof is omitted as appropriate.

System Configuration

FIG. 1 is a block diagram illustrating a configuration example of an information processing system 100. The information processing system 100 in FIG. 1 includes a management server 1, a network 2, a plurality of calculation servers (information processing devices) 3 (3a to 3c), a plurality of cables 4 (4a to 4c), and a switch 5. FIG. 1 also illustrates an information terminal 6 capable of communicating with the information processing system 100. The management server 1, a plurality of calculation servers 3 (3a to 3c), and the information terminal 6 can perform data communication with each other through the network 2. The network 2 is, for example, the Internet in which a plurality of computer networks are connected to each other. The network 2 may be a communication medium either wired or wireless or a combination thereof. An example of the communication protocol used in the network 2 is TCP/IP, but the kind of communication protocol is not limited.

The calculation servers 3 (3a to 3c) are connected to the switch 5 through the cables 4 (4a to 4c). The cables 4 (4a to 4c) and the switch 5 form an interconnection between the calculation servers. The calculation servers 3 (3a to 3c) can perform data communication with each other through the interconnect. The switch 5 is, for example, an InfiniBand switch, and the cables 4a to 4c are, for example, InfiniBand cables. However, instead of InfiniBand switch/cables, wired LAN switch/cables may be used. Any communication standards and communication protocol may be used for the cables 4a to 4c and the switch 5. Examples of the information terminal 6 include a notebook PC, a desktop PC, a smartphone, a tablet, and a vehicle-mounted terminal.

In solving a combinatorial optimization problem, parallel processing and/or distribution of processes can be performed. The calculation servers 3 (3a to 3c) and/or the processors of the calculation servers 3 (3a to 3c) therefore may share and execute some of the steps of some calculation processes or may perform similar calculation processes for different variables in parallel. The management server 1, for example, converts a combinatorial optimization problem input by a user into a format that can be processed by the calculation servers 3 and controls the calculation servers 3. The management server 1 then acquires the calculation results from the calculation servers 3 and converts the consolidated calculation results into a solution to the combinatorial optimization problem. The user thus can obtain the solution to the combinatorial optimization problem. It is assumed that the solution to the combinatorial optimization problem includes an optimal solution and an approximate solution close to the optimal solution.

Although FIG. 1 illustrates three calculation servers 3 (3a to 3c), it is not intended to limit the number of calculation servers 3 included in the information processing system 100. The number of calculation servers 3 used for solving a combinatorial optimization problem is not limited. For example, the number of calculation servers 3 included in the information processing system 100 may be one. Among the calculation servers 3 included in the information processing system 100, one calculation server 3 may be used to solve a combinatorial optimization problem. Hundreds or more of calculation servers 3 may be included in the information processing system 100. The calculation server 3 may be a server installed in a datacenter or may be a desktop PC installed in an office. The calculation server 3 may be computers of different kinds installed at different locations. Any kinds of information processing devices may be used as the calculation servers 3. For example, the calculation server 3 may be a general-purpose computer or may be a dedicated electronic circuit or a combination thereof.

Figure 2:
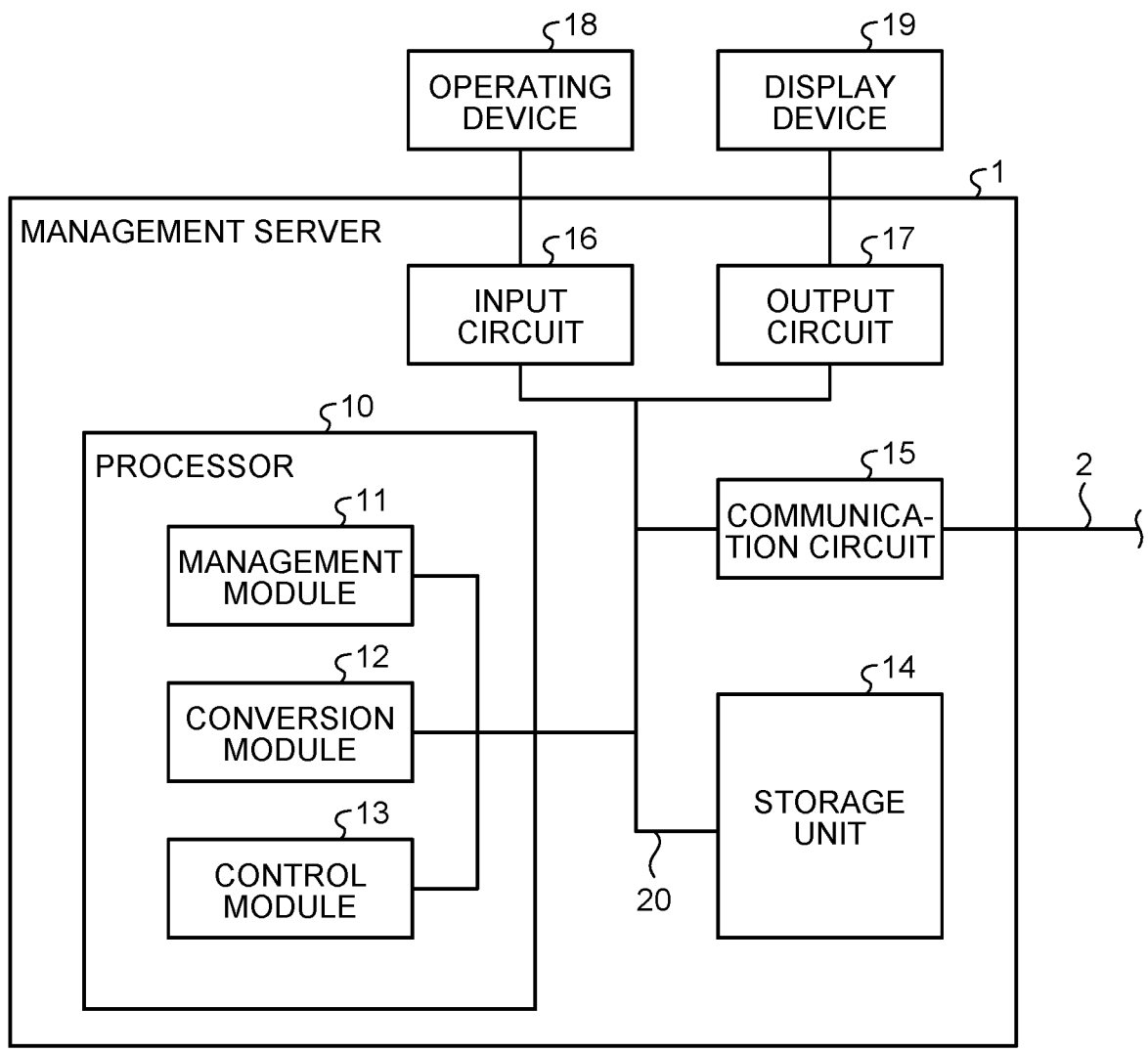
FIG. 2 is a block diagram illustrating a configuration example of a management server.

FIG. 2 is a block diagram illustrating a configuration example of the management server 1. The management server 1 in FIG. 2 is, for example, a computer including a central processing unit (CPU) and a memory. The management server 1 includes a processor 10, a storage unit 14, a communication circuit 15, an input circuit 16, and an output circuit 17. The processor 10, the storage unit 14, the communication circuit 15, the input circuit 16, and the output circuit 17 are connected to each other through a bus 20. The processor 10 includes, as an internal functional configuration, a management module 11, a conversion module 12, and a control module 13.

The processor 10 is an electronic circuit that executes computation and controls the management server 1. As the processor 10, for example, a CPU, a microprocessor, an ASIC, an FPGA, a PLD, or a combination thereof can be used. The management module 11 provides an interface for operating the management server 1 through the user's information terminal 6. Examples of the interface provided by the management module 11 include an API, a CLI, and a webpage. For example, the user can input information on a combinatorial optimization problem or view and/or download the calculated combinatorial optimization problem solution through the management module 11. The conversion module 12 inputs parameters for a combinatorial optimization problem and converts the input parameters into a form that can be processed by the calculation servers 3. The control module 13 transmits a control command to each calculation server 3. After the control module 13 acquires a calculation result from each calculation server 3, the conversion module 12 consolidates a plurality of calculation results, converts the consolidated calculation results into a solution to the combinatorial optimization problem, and outputs the solution to the combinatorial optimization problem.

The storage unit 14 stores a computer program for the management server 1 and a variety of data including data necessary for running the computer program and data generated by the computer program. As used herein the computer program includes both an OS and an application. The storage unit 14 may be a volatile memory, a nonvolatile memory, or a combination thereof. Examples of the volatile memory include a DRAM and an SRAM. Examples of the nonvolatile memory include a NAND flash memory, an NOR flash memory, a ReRAM, and an MRAM. Alternatively, a hard disk, an optical disk, a magnetic tape, or an external storage device may be used as the storage unit 14.

The communication circuit 15 transmits/receives data to/from devices connected to the network 2. The communication circuit 15 is, for example, a network interface card (NIC) for a wired LAN. However, the communication circuit 15 may be a communication circuit of any other kinds, such as a wireless LAN. The input circuit 16 implements data input to the management server 1. It is assumed that the input circuit 16 includes, for example, USB or PCI-Express as an external port. In the example in FIG. 2, an operating device 18 is connected to the input circuit 16. The operating device 18 is a device for inputting information to the management server 1. The operating device 18 is, for example, but not limited to, a keyboard, a mouse, a touch panel, or a voice recognition device. The output circuit 17 implements data output from the management server 1. It is assumed that the output circuit 17 includes HDMI (registered trademark), DisplayPort, or the like, as an external port. In the example in FIG. 2, a display device 19 is connected to the output circuit 17. Examples of the display device 19 include, but not limited to, a liquid crystal display (LCD), an organic electroluminescent (EL) display, and a projector.

An administrator of the management server 1 can perform maintenance of the management server 1, using the operating device 18 and the display device 19. The operating device 18 and the display device 19 may be built in the management server 1. The operating device 18 and the display device 19 are not necessarily connected to the management server 1. For example, the administrator may perform maintenance of the management server 1, using an information terminal capable of communicating with the network 2.

Figure 3:
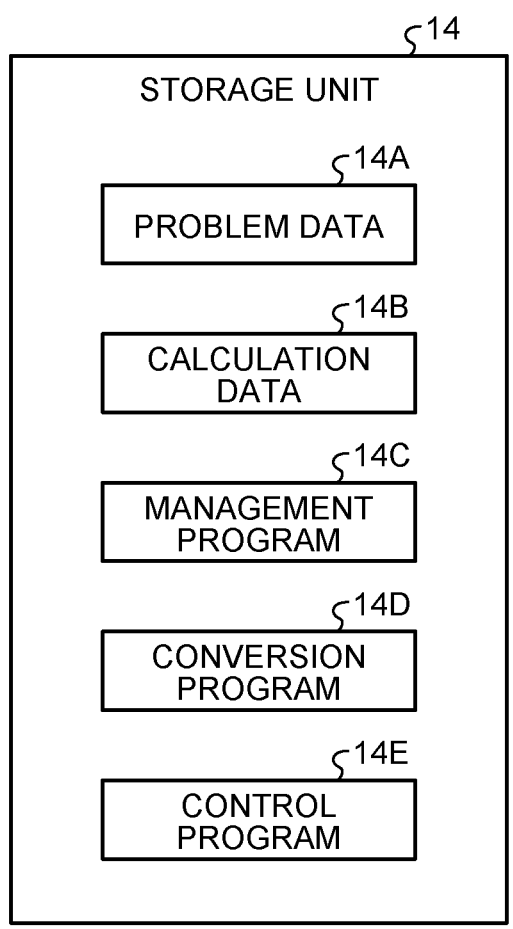
FIG. 3 is a diagram illustrating an example of data stored in a storage unit of the management server.

FIG. 3 illustrates an example of data stored in the storage unit 14 of the management server 1. The storage unit 14 in FIG. 3 stores problem data 14A, calculation data 14B, a management program 14C, a conversion program 14D, and a control program 14E. For example, the problem data 14A includes data of a combinatorial optimization problem. For example, the calculation data 14B includes a calculation result collected from each calculation server 3. For example, the management program 14C is a computer program that implements the function of the above-noted management module 11. For example, the conversion program 14D is a computer program that implements the function of the above-noted conversion module 12. For example, the control program 14E is a computer program that implements the function of the above-noted control module 13.

Figure 4:
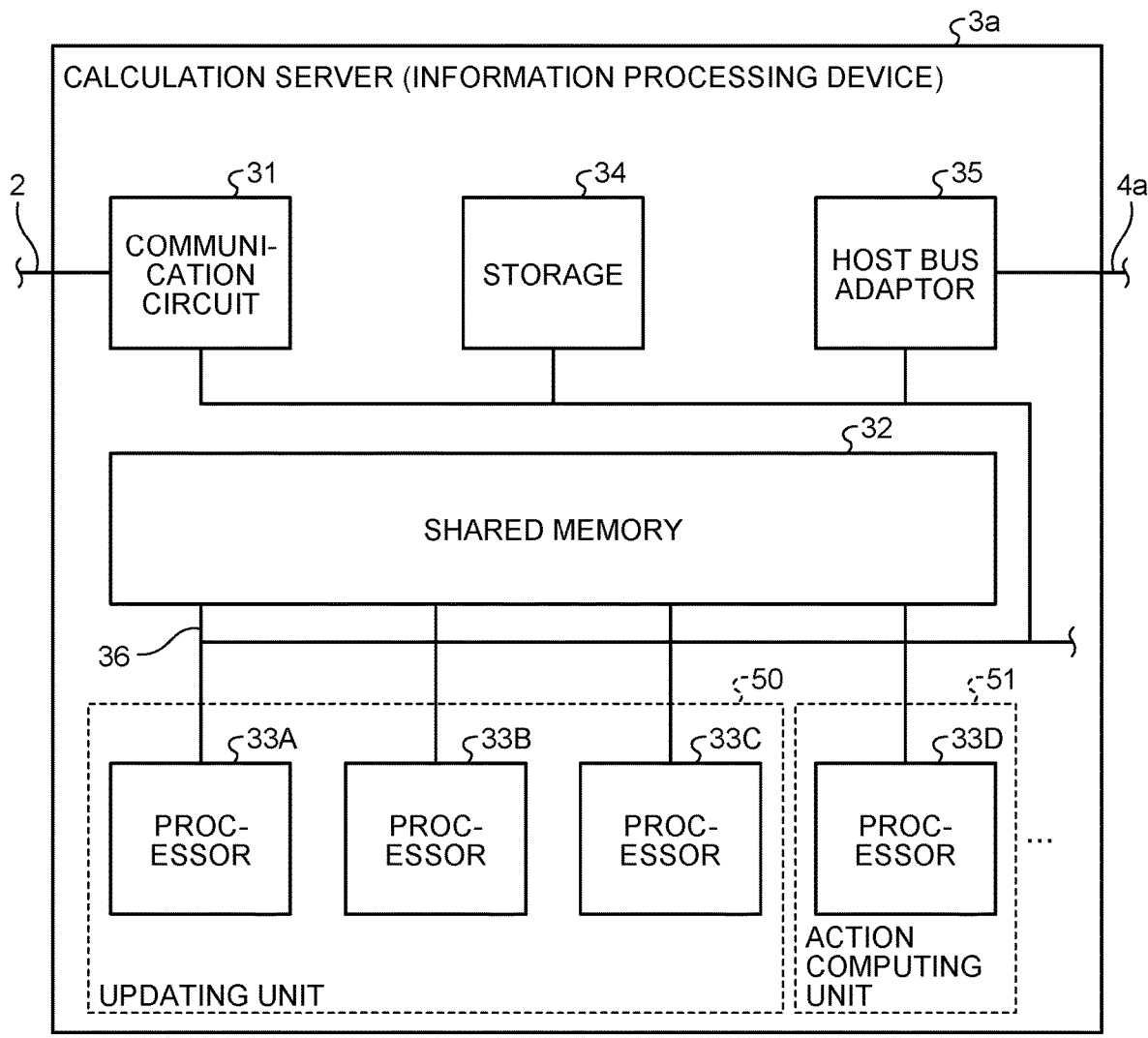
FIG. 4 is a block diagram illustrating a configuration example of a calculation server.

FIG. 4 is a block diagram illustrating a configuration example of the calculation server 3a. FIG. 4 illustrates a configuration of the calculation server 3a by way of example. The other calculation servers 3 may have a configuration similar to that of the calculation server 3a or may have a configuration different from that of the calculation server 3a. The calculation server 3a is, for example, an information processing device that singly executes calculation of a first vector, a second vector, and a third vector, or shares and executes the calculation with the other calculation servers 3. The calculation server 3a may calculate a fourth vector in which elements of the first vector are converted by the signum function. The values of elements of the third vector are obtained, for example, by an equation derived from an energy equation of the Ising model.

For example, the elements of the third vector can be calculated based on a formula (called basic formula) in the form of a partial derivative of the energy equation of the Ising model with respect to variables included in all terms.

Here, the first vector is a vector with a variable $x_i$ (i 1, 2, ..., N) as an element. The second vector is a vector with a variable $y_i$ (i=1, 2, ..., N) as an element. The third vector is a vector with a variable $z_i$ (i=1, 2, ..., N) as an element. The fourth vector is a vector in which the elements of the first vectors are converted by a first function that takes either one of a first value or a second value greater than the first value. The above-noted signum function is an example of the first function. The detail of the variables $x_i$, $y_i$, and $z_i$ will be described later.

The calculation server 3a includes, for example, a communication circuit 31, a shared memory 32, processors 33A to 33D, a storage 34, and a host bus adaptor 35. It is assumed that the communication circuit 31, the shared memory 32, the processors 33A to 33D, the storage 34, and the host bus adaptor 35 are connected to each other through a bus 36.

The communication circuit 31 transmits/receives data to/from devices connected to the network 2. The communication circuit 31 is, for example, a network interface card (NIC) for a wired LAN. However, the communication circuit 31 may be a communication circuit of any other kinds, such as a wireless LAN. The shared memory 32 is a memory accessible by the processors 33A to 33D. Examples of the shared memory 32 include a volatile memory such as a DRAM and an SRAM. However, a memory of any other kinds such as a nonvolatile memory may be used as the shared memory 32. The processors 33A to 33D can share data through the shared memory 32. Not all of the memory of the calculation server 3a are configured as a shared memory. For example, a part of the memory of the calculation servers 3a may be configured as a local memory accessible only by any one of the processors.

The processors 33A to 33D are electronic circuits that execute a calculation process. Each processor may be, for example, any one of a central processing unit (CPU), a graphics processing unit (GPU), a field-programmable gate array (FPGA), and an application specific integrated circuit (ASIC), or may be combination thereof. The processor may be a CPU core or a CPU thread. When the processor is a CPU, the number of sockets included in the calculation server 3a is not limited. The processor may be connected to any other components of the calculation server 3a through a bus such as PCI express.

In the example in FIG. 4, the calculation server 3a includes four processors. However, the number of processors included in one calculation server 3a may be different therefrom. For example, the number and/or the kind of processors mounted on the calculation server 3a may be different.

An action computing unit 51 is configured to update the elements of the third vector, based on the basic formula in the form of a partial derivative of the objective function of a combinatorial optimization problem to be solved, with respect to variables included in all the terms. Here, the variables of the basic formula are the elements of the first vector or the elements of the fourth vector in which the elements of the first vector are converted by the first function that takes either one of a first value or a second value greater than the first value. An updating unit 50 is configured to, for example, update an element of the first vector by adding a corresponding element of the second vector or a weighted value of a corresponding element of the second vector to the element of the first vector, change an element of the first vector having a value smaller than a first value to any value equal to or greater than the first value and equal to or smaller than a threshold value, change an element of the first vector having a value greater than a second value to a value equal to or greater than the threshold value and equal to or smaller than the second value, and update an element of the second vector by adding a weighted value of the product of a first coefficient monotonously increasing or monotonously decreasing with the number of times of updating and a corresponding element of the first vector, and a weighted value of a corresponding element of the third vector, to the element of the second vector. The threshold value is a value between the first value and the second value. For example, the energy equation of the Ising model can be used as the objective function. Here, the Ising model may be the one having a multibody interaction. Furthermore, −1 can be used as the first value, +1 can be used as the second value, and 0 can be used as the threshold value. However, the threshold value, the first value, and/or the second value may be any other values.

In the example in FIG. 4, the processors 33A to 33C correspond to the updating unit 50, and the processor 33D corresponds to the action computing unit 51. However, the correspondence between the updating unit 50/the action computing unit 51 and the processors illustrated in FIG. 4 is only by way of example. The correspondence between the updating unit 50/the action computing unit 51 and the processors may be different from this. The number of processors allocated to the updating unit 50/the action computing unit 51 is not limited. As described later, the same processor may have the functions of both of the updating unit 50 and the action computing unit 51. When different kinds of processors (for example, CPU, GPU, and FPGA) are mounted on the calculation server 3a, the different kinds of processors may be allocated to the updating unit 50 and the action computing unit 51.

The storage 34 stores a computer program for the calculation server 3a and a variety of data including data necessary for running the computer program and data generated by the computer program. As used herein the computer program includes both an OS and an application. The storage 34 may be a volatile memory, a nonvolatile memory, or a combination thereof. Examples of the volatile memory include a DRAM and an SRAM. Examples of the nonvolatile memory include a NAND flash memory, an NOR flash memory, a ReRAM, and an MRAM. A hard disk, an optical disk, a magnetic tape, or an external storage device may be used as the storage 34.

The host bus adaptor 35 implements data communication between the calculation servers 3. The host bus adaptor 35 is connected to the switch 5 through the cable 4a. The host bus adaptor 35 is, for example, a host channel adaptor (HCA). The host bus adaptor 35, the cable 4a, and the switch 5 form an interconnect that can achieve a high throughput and thereby can improve the speed of parallel calculation processing.

Figure 5:
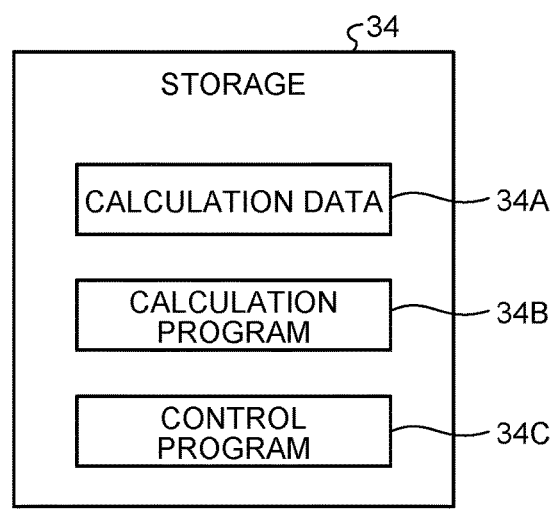
FIG. 5 is a diagram illustrating an example of data stored in a storage of the calculation server.

FIG. 5 illustrates an example of data stored in the storage of the calculation server 3. The storage 34 of FIG. 5 stores calculation data 34A, a calculation program 34B, and a control program 34C. The calculation data 34A includes data in progress of calculation and a calculation result of the calculation server 3a. At least part of the calculation data 34A may be stored in a different storage level, such as the shared memory 32, a cache of a processor, or a register of a processor. The calculation program 34B is a program that implements a calculation process in each processor and a storage process of data into the shared memory 32 and the storage 34, based on a prescribed algorithm. The control program 34C is a program that controls the calculation server 3a based on a command transmitted from the control module 13 of the management server 1 and transmits the calculation result of the calculation server 3a to the management server 1.

Combinatorial Optimization Problem Technologies related to solving a combinatorial optimization problem will now be described. An example of the information processing device used for solving a combinatorial optimization problem is an Ising machine. The Ising machine refers to an information processing device that calculates energy of the ground state of the Ising model. So far, the Ising model has often been used mainly as a model of ferromagnetic or phase transition phenomena. However, in recent years, the Ising model has increasingly been used as a model for solving a combinatorial optimization problem. Equation (1) below shows the energy of the Ising model.

$$E_{Ising} = \sum_{i=1}^{N} h_i s_i + \frac{1}{2} \sum_{i=1}^{N} \sum_{j=1}^{N} J_{i,j} s_i s_j \tag{1}$$

Here, $s_i$, $s_j$ are spins. The spin is a binary variable that takes a value of either +1 or −1. N is the number of spins. $h_i$ is a local magnetic field acting on each spin. J is a matrix of a coupling coefficient between spins. The matrix J is a real symmetric matrix in which diagonal components are zero. Therefore, $J_{ij}$ denotes an element at the $i^{th}$ row and $j^{th}$ column of the matrix J. Although the Ising model in Equation (1) is a quadratic equation for spins, an expanded Ising model including a term of degree 3 or more for spins (an Ising model having a multibody interaction) may be used. The Ising model having a multibody interaction will be described later.

When the Ising model in Equation (1) is used, energy $E_{Ising}$ is set as an objective function, and a solution that can minimize the energy $E_{Ising}$ can be calculated. The solution to the Ising model can be written in the form of spin vector ($s_1$, $s_2$, ..., $s_N$). In particular, the vector ($s_1$, $s_2$, ..., $s_N$) that yields the minimum value of the energy $E_{Ising}$ is called optimal solution. However, the calculated solution of the Ising model need not be a strict optimal solution. The problem of finding an approximate solution that minimizes the energy $E_{Ising}$ (that is, the approximate solution in which the value of the objective function is as close to the optimal value as possible) is hereinafter called the Ising problem.

In Equation (1), $s_i$ is a binary variable representing a spin and therefore the expression $(1+s_i)/2$ can be used to facilitate conversion to a discrete variable (bit) used in a combinatorial optimization problem. Therefore, the solution to a combinatorial optimization problem can be found by converting a combinatorial optimization problem into the Ising problem and allowing an Ising machine to perform calculation. The problem of finding a solution that minimizes a quadratic objective function whose variable is a discrete variable (bit) that takes a value of either 0 or 1 is called a quadratic unconstrained binary optimization (QUBO) problem. It can be said that the Ising problem given by Equation (1) is equivalent to the QUBO problem.

For example, quantum annealers, coherent Ising machines, and quantum bifurcation machines have been developed as hardware implementations of Ising machines. The quantum annealer implements quantum annealing using a superconducting circuit. The coherent Ising machine uses an oscillation phenomenon of a network formed in an optical parametric oscillator. The quantum bifurcation machine uses a quantum-mechanical bifurcation phenomenon in a network of a parametric oscillator having Kerr effect. While these hardware implementations can significantly reduce computation time, scale increase and stable operation are difficult.

Alternatively, widespread digital computers can be used to solve the Ising problem. Digital computers are easily increased in scale and stably run, compared with the hardware implementations using physical phenomena described above. An example of algorithms for solving the Ising problem using a digital computer is simulated annealing (SA). Technologies for performing simulated annealing faster have been developed. However, since common simulated annealing is a sequentially updating algorithm in which individual variables are sequentially updated, it is difficult to accelerate a calculation process by parallelization.

Simulated Bifurcation Algorithm

In view of the technical problems described above, a simulated bifurcation algorithm has been developed that can solve a large-scale combinatorial optimization problem fast by parallel calculation in a digital computer (for example, Hayato Goto, Kosuke Tatsumura, Alexander R. Dixon, "Combinatorial optimization by simulating adiabatic bifurcations in nonlinear Hamiltonian systems", Science Advances, Vol. 5, No. 4, eaav2372, 19 Apr. 2019). Hereinafter an information processing device and electronic circuits for solving a combinatorial optimization problem using the simulated bifurcation algorithm will be described.

An overview of the simulated bifurcation algorithm is first described. In the simulated bifurcation algorithm, two variables $x_i$ and $y_i$ each corresponding to N elements are used. The variable $x_i$ may be called first variable, and the variable $y_i$ may be called second variable. Here, in the simulated bifurcation algorithm, each of N elements represents a virtual particle. N elements correspond to N spins in the Ising model representing an optimization problem. The first variable $x_i$ denotes the position of the $i^{th}$ particle of N particles. The second variable $y_i$ denotes the momentum of the $i^{th}$ particle. N denotes the number of spins included in the Ising model and is an integer equal to or greater than 2, and i denotes any integer equal to or greater than 1 and equal to or smaller than N and denotes an index that identifies a spin. In the simulated bifurcation algorithm, for N variables $x_i$ and N variables $y_i$ (i=1, 2, . . . , N), simultaneous ordinary differential equations in Equation (2) below are numerically solved. Both variables $x_i$ and $y_i$ are continuous variables represented by real numbers.

$$\frac{dx_i}{dt} = \frac{\partial H}{\partial y_i} = Dy_i \qquad (2)$$

$$\frac{dy_i}{dt} = -\frac{\partial H}{\partial x_i} = \{-D + p(t) - Kx_i^2\}x_i + f_i$$

Here, H is the Hamiltonian in Equation (3) below. The coefficient D is a predetermined constant and corresponds to detuning. The coefficient p(t) corresponds to pumping amplitude and its value monotonously increases according to the number of times of updating in calculation of the simulated bifurcation algorithm. The variable t represents time. The initial value of the coefficient p(t) may be set to 0. The coefficient p(t) corresponds to the first coefficient. The coefficient K corresponds to positive Kerr coefficient. The external force $f_i$ is given by Equation (4) below. In Equation (4), $z_i$ is given by a partial derivative of the inside of the parentheses of the term corresponding to the energy $E_{Ising}$ in Equation (3) with respect to the variable $x_i$.

$$H = \sum_{i=1}^{N}\left[\frac{D}{2}(x_i^2 + y_i^2) - \frac{p(t)}{2}x_i^2 + \frac{K}{4}x_i^4 + c\left(h_i x_i \alpha(t) + \frac{1}{2}\sum_{j=1}^{N} J_{i,j} x_i x_j\right)\right] \qquad (3)$$

$$f_j = -cz_i \qquad (4)$$

$$z_i = h_i \alpha(t) + \sum_{j=1}^{N} J_{i,j} x_j$$

Here, a constant coefficient can be used as the coefficient c. In this case, the value of the coefficient c need to be determined before calculation by the simulated bifurcation algorithm is executed. For example, in order to obtain accuracy of calculation, the coefficient c can be set to a value close to a reciprocal of the maximum eigenvalue of $J^{(2)}$ matrix. For example, a value $c=0.5D\sqrt{(N/2n)}$ can be used. Here, n is the number of edges of a graph for a combinatorial optimization problem. Furthermore, $\alpha(t)$ is a coefficient increasing with p(t). For example, $\sqrt{(p(t))}$ can be used as $\alpha(t)$.

By using the simulated bifurcation algorithm, a combinatorial optimization problem having an objective function of degree 3 or more can be solved. The problem of finding a combination of variables that minimizes an objective function of degree 3 or more with a binary variable as a variable is called a higher order binary optimization (HOBO) problem. When a HOBO problem is treated, Equation (5) below can be used as an energy equation in the Ising model expanded to a higher order.

$$E_{HOBO} = \sum_{i=1}^{N} J_i^{(1)} s_i + \frac{1}{2}\sum_{i=1}^{N}\sum_{j=1}^{N} J_{i,j}^{(2)} s_i s_j + \frac{1}{3!}\sum_{i=1}^{N}\sum_{j=1}^{N}\sum_{k=1}^{N} J_{i,j,k}^{(3)} s_i s_j s_k + \dots \qquad (5)$$

Here, $J^{(n)}$ is an $n^{th}$-rank tensor and is generalization of the local magnetic field $h_i$ and the matrix J of the coupling coefficient in Equation (1). For example, the tensor $J^{(1)}$ corresponds to a vector of the local magnetic field $h_i$ (referred to as sixth vector). In the $n^{th}$-rank tensor $J^{(n)}$, when a plurality of subscripts have the same value, the value of an element is 0. In Equation (5), the terms up to degree 3 are shown, a higher-order term can be defined similarly to Equation (5). Equation (5) corresponds to the energy of the Ising model including a multibody interaction.

It can be said that both of QUBO and HOBO are a kind of polynomial unconstrained binary optimization (PUBO). That is, among PUBOs, a combinatorial optimization problem having a quadratic objective function is QUBO. Among PUBOs, a combinatorial optimization problem having an objective function of degree 3 or more is HOBO.

When a HOBO problem is solved using the simulated bifurcation algorithm, the Hamiltonian H in Equation (3) above can be replaced by Equation (6) below, and the external force $f_i$ in Equation (4) above can be replaced by Equation (7) below.

$$H = \sum_{i=1}^{N}\left[\frac{D}{2}(x_i^2 + y_i^2) - \frac{p(t)}{2}x_i^2 + \frac{K}{4}x_i^4 + \right. \qquad (6)$$

$$\left. c\left(J_i^{(1)} x_i \alpha(t) + \frac{1}{2}\sum_{j=1}^{N} J_{i,j}^{(2)} x_i x_j + \frac{1}{3!}\sum_{j=1}^{N}\sum_{i=1}^{N} J_{i,j}^{(3)} x_i x_j x_k + \dots\right)\right]$$

$$H_{Ising} = \sum_{i=1}^{N}\left[J_i^{(1)} x_i \alpha(t) + \frac{1}{2}\sum_{j=1}^{N} J_{i,j}^{(2)} x_i x_j + \frac{1}{3!}\sum_{j=1}^{N}\sum_{k=1}^{N} J_{i,j}^{(3)} x_i x_j x_k + \dots\right]$$

$$f_i = -cz_i$$

$$z_i = \frac{\partial H_{Ising}}{\partial x_i} = J_i^{(1)}\alpha(t) + \sum_{j=1}^{N} J_{i,j}^{(2)} x_j + \sum_{j=1}^{N}\sum_{k=1}^{N} J_{i,j,k}^{(3)} x_j x_k + \ldots \quad (7)$$

For example, the second equation $z_i$ in (7) can be used to calculate the elements of the third vector. This equation is in the form of a partial derivative of the second equation in (6) with respect to the variable $x_i$ included in all the terms. The elements of the first vector are variables. In this way, the Hamiltonian may include the term of multibody interaction (third- or higher-rank tensor). As the Hamiltonian, the one not including the term of multibody interaction (third- or higher-rank tensor) may be used. The second equation $z_i$ in (7) is an example of the basic formula derived from the terms corresponding to the Ising model's energy in the Hamiltonian. That is, the first value may be $-1$, the second value may be 1, and the objective function may include a term corresponding to the energy equation of the Ising model. In this case, the objective function may include a term of multibody interaction.

In the simulated bifurcation algorithm, the value of spin $s_i$ can be obtained, based on the sign of the variable $x_i$ after the value of $p(t)$ is increased from an initial value (for example, 0) to a prescribed value. For example, the signum function in which when $x_i>0$, $\text{sgn}(x_i)=1$, and when $x_i<0$, $\text{sgn}(x_i)=-1$ can be used to obtain the value of spin $s_i$ by converting the variable $x_i$ by the signum function when the value of $p(t)$ increases to a prescribed value. As the signum function, for example, a function in which when $x_i \neq 0$, $\text{sgn}(x_i)=x_i/|x_i|$ and when $x_i=0$, $\text{sgn}(x_i)=1$ or $-1$ can be used. That is, the updating unit 50 may be configured to find a solution to a combinatorial optimization problem by converting an element of the first vector having a value smaller than a third value between the first value and the second value into the first value and converting an element of the first vector having a value greater than the third value into the second value. For example, the updating unit 50 may be configured to find a solution to a combinatorial optimization problem by converting an element of the first vector having a positive value into $+1$ and converting the first vector having a negative value into $-1$. The updating unit 50 may find a solution (for example, spin $s_i$ of the Ising model) to a combinatorial optimization problem at any timing. For example, the updating unit 50 may be configured to find a solution to a combinatorial optimization problem when the number of times of updating of the first vector, the second vector, and the third vector, or the value of the first coefficient p is greater than a threshold value. When the Ising problem is solved, the solution to the combinatorial optimization problem corresponds to spins $s_i$ of the Ising model.

Computation of Simulated Bifurcation Algorithm

For example, a differential equation given by Equations (2), (3), (4) or Equations (2), (6), (7) can be solved using the symplectic Euler method. As shown by Equation (8) below, when the symplectic Euler method is used, the differential equation can be written into a discrete recurrence relation.

$$x_i(t+\Delta t) = x_i(t) + Dy_i(t)\Delta t \quad (8)$$

$$y_i(t+\Delta t) = y_i(t) + \left[(-D + p(t+\Delta t) - Kx_i^2(t+\Delta t))x_i(t+\Delta t) + f_i(t+\Delta t)\right]\Delta t$$

$$f_i(t+\Delta t) = -cz_i(t+\Delta t)$$

$$z_i(t+\Delta t) =$$

$$J_i^{(1)}\alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t) x_k(t+\Delta t) + \ldots$$

Here, t is time, and $\Delta t$ is time step (unit time, time step size). The nonlinear term $Kx^2_i(t+\Delta t)$ in Equation (8) prevents divergence of the variable $x_i$ during calculation.

In the calculation server 3, N variables $x_i$ and N variables $y_1$ (i=1, 2, ..., N) may be updated based on the algorithm in Equation (8). That is, the data updated by the calculation server 3 may include the first vector $(x_1, x_2, \ldots, x_N)$ with the variable $x_i$ (i=1, 2, ..., N) as an element, the second vector $(y_1, y_2, \ldots, y_N)$ with the variable $y_i$ (i=1, 2, ..., N) as an element, and the third vector $(z_1, z_2, \ldots, z_N)$ with the variable $z_i$ (i=1, 2, ..., N) as an element. The calculation server 3 can update the elements $z_i$ (i=1, 2, ..., N) of the third vector, the elements $x_i$ (i=1, 2, ..., N) of the first vector, and the elements $y_i$ (i=1, 2, ..., N) of the second vector, based on the algorithm in Equation (8).

Referring to Equation (8), it can be understood that only one kind of subscript (i) appears, except for the product-sum operation of matrix or tensor included in the external force term $f_i$. Therefore, the computation of the portions in which only one kind of subscript (i) appears in Equation (8) can be parallelized, thereby reducing the calculation time.

In Equation (8), time t and time step $\Delta t$ are used in order to indicate the correspondence with the differential equation. However, when the symplectic Euler method is actually implemented in software or hardware, time t and time step $\Delta t$ are not necessarily included as explicit parameters. For example, if time step $\Delta t$ is 1, time step $\Delta t$ can be removed from the algorithm in implementation. When time t is not included as an explicit parameter in implementation of the algorithm, $x_i(t+\Delta t)$ can be interpreted as the updated value of $x_i(t)$ in Equation (8). That is, "t" in Equation (8) above and the subsequent equations denotes the value of the variable before updating, and "t+$\Delta t$" denotes the value of the variable after updating.

The results of solving a combinatorial optimization problem when the simulated bifurcation algorithm is implemented in a digital computer by the symplectic Euler method will now be described. In the following, the mean value and the maximum value of the cut value are shown in a case where G22 in a bench mark set (G-set) of the maximum cut problem was solved 1000 times. The maximum cut problem is a problem of dividing the nodes of a weighted graph into two groups such that the total value of weights of the edges cut by the division is maximized. The maximum cut problem is a kind of combinatorial optimization problems.

Figure 6A:
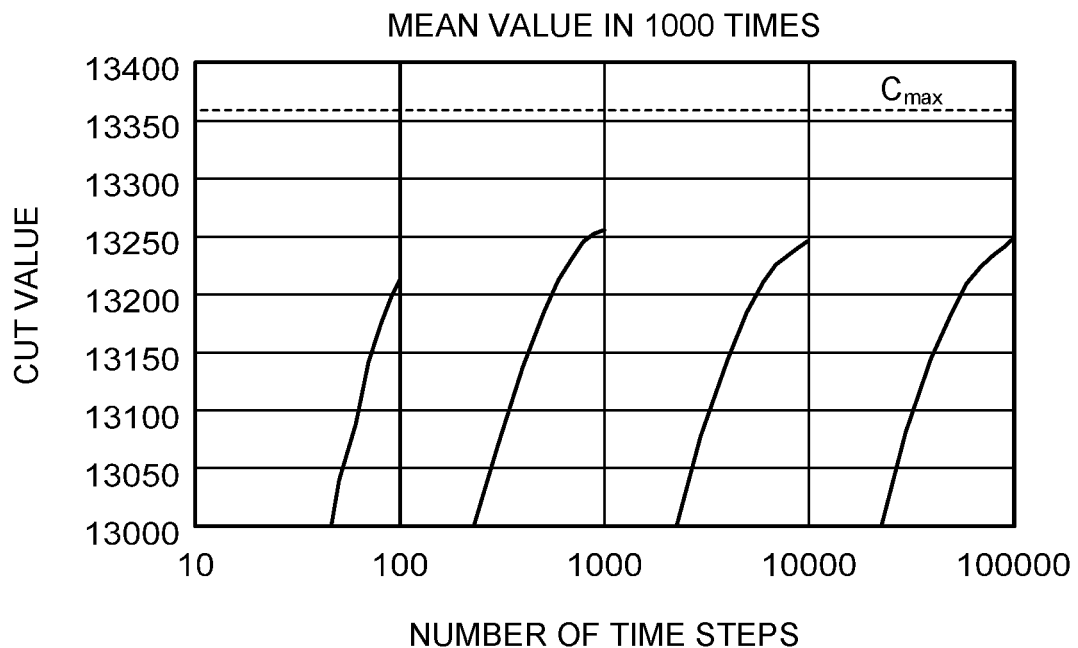
FIG. 6A is a diagram illustrating a mean value of the cut value when the algorithm in Equation (8) is used.
Figure 6B:
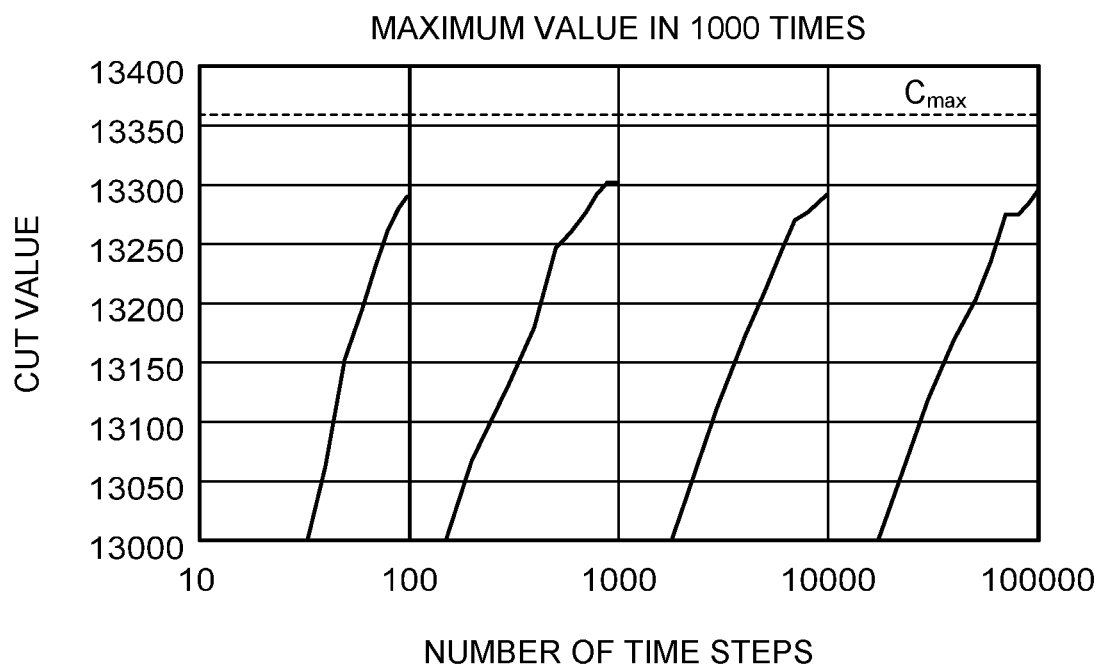
FIG. 6B is a diagram illustrating a maximum value of the cut value when the algorithm in Equation (8) is used.

FIG. 6A and FIG. 6B illustrate the result when the algorithm in Equation (8) above was used. The calculation is performed with time step $\Delta t=0.5$, and the total number of time steps is 100, 1000, 10000, and 100000. For coefficients, $D=K=1$, $c=0.5D\sqrt{(N/2n)}$ were used. The number of edges in the graph of G22, 19990, is substituted into n. With increase in the number of time steps, the value of the coefficient p (first coefficient) was linearly increased from 0 to 1. For the initial value of the variable $x_i$, 0 was set, and for the initial value of the variable $y_i$, a pseudo-random number in the range of $[-0.1, 0.1]$ was set.

FIG. 6A illustrates the mean value of the cut value. On the other hand, FIG. 6B illustrates the maximum value of the cut value. In the graphs of FIG. 6A and FIG. 6B, the vertical axis corresponds to the cut value, and the horizontal axis corresponds to the number of time steps. The broken line Cmax in the horizontal direction in the graphs of FIG. 6A and FIG. 6B indicates the maximum cut value 13359 known in G22. It can be said that the closer to the broken line Cmax the cut value is, the closer result to the optimal solution is obtained. Referring to FIG. 6A and FIG. 6B, even when the total number of time steps increases, the maximum cut value is not reached.

Improvement of Algorithm

Figure 7:
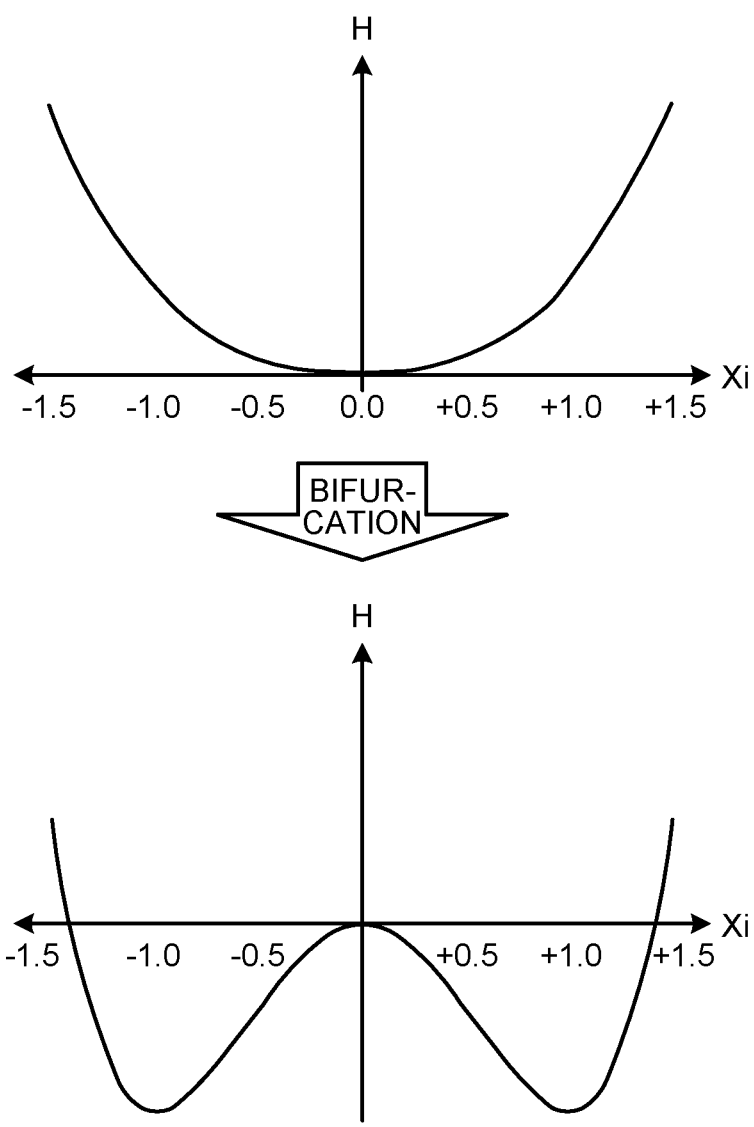
FIG. 7 is a diagram illustrating an example of bifurcation in an algorithm in which the absolute value of $x_i$ exceeds 1.

FIG. 7 is a diagram illustrating a bifurcation phenomenon of the algorithm in Equation (8). When the simulated bifurcation algorithm is solved by the symplectic Euler method, a single stable motion state bifurcates into multiple stable states as the parameters of the system change. In the bifurcation phenomenon in the algorithm in Equation (8), the variable $x_i$ extends from a region greater than 1 to a region smaller than −1.

FIG. 8 is a diagram depicting a bifurcation phenomenon of an improved algorithm. The algorithm in Equation (8) was improved as follows. Specifically, as illustrated in FIG. 8, when the absolute value of the variable $x_i$ becomes greater than 1, the absolute value of the variable $x_i$ is changed to a value equal to or greater than 0 and equal to or smaller than 1 without changing its sign. For example, when $x_i$>1 as a result of updating, the value of the variable $x_i$ is set to w. Here, w is a value equal to or greater than 0 and equal to or smaller than 1. When $x_i$<−1 as a result of updating, the value of the variable $x_i$ is set to −w. In this way, the variable $x_i$ can always be kept in the range equal to or greater than −1 and equal to or smaller than 1 while the sign of the variable $x_i$ is kept.

For example, w may be a predetermined value equal to or greater than 0 and equal to or smaller than 1. Alternatively, w may be a value in accordance with a random number that occurs with a uniform probability in a specific interval [$w_1$, $w_2$] within a range equal to or greater than 0 and equal to or smaller than 1, where $w_1$ is equal to or greater than 0 and equal to or smaller than $w_2$, and $w_2$ is equal to or greater than $w_1$ and equal to or smaller than 1.

Furthermore, w may be an index value representing the average of magnitudes of N variables $x_i$. The index value representing the average of magnitudes of N variables $x_i$ is, for example, the root mean square or the average absolute value of the previous N variables $x_i$. For example, w may be a value, determined by a random number, equal to or greater than the index value representing the average of magnitudes of N variables $x_i$ and equal to or smaller than 1.

For example, w may be an increasing coefficient that increases with time from the initial time to the end time, from 0 to equal to or smaller than 1. The increasing coefficient may be, for example, a linear function that is 0 at the initial time and 1 at the end time, where time is a variable, or the square root of the linear function. For example, w may be a value, determined by a random number, equal to or greater than the increasing coefficient and equal to or smaller than 1.

When $x_i$>1 as a result of updating, the variable $y_i$ corresponding to the variable $x_i$ may be multiplied by a coefficient r. That is, the updating unit 50 may be configured to update an element of the second vector corresponding to an element of the first vector having a value smaller than the first value or an element of the second vector corresponding to an element of the first vector greater than the second value to a value obtained by multiplying the original element of the second vector by a second coefficient. For example, the updating unit 50 may be configured to update an element of the second vector corresponding to an element of the first vector having a value smaller than −1 or an element of the second vector corresponding to an element of the first vector having a value greater than 1 to a value obtained by multiplying the original element of the second vector by the second coefficient. Here, the second coefficient corresponds to the above-noted coefficient r.

When the absolute value of the variable $x_i$ becomes greater than 1 as a result of updating, the variable $y_i$ may be changed to 0 or a predetermined value. When $x_i$>1 as a result of updating, the value of the variable $y_i$ corresponding to the variable $x_i$ may be set to a pseudo-random number. For example, a random number in the range of [−0.1, 0.1] can be used. That is, the updating unit 50 may be configured to set the value of an element of the second vector corresponding to an element of the first vector having a value smaller than the first value or an element of the second vector corresponding to an element of the first vector having a value greater than the second value to a pseudo-random number.

First Algorithm

As described above, when updating is performed such that |$x_i$| does not become greater than 1, the value of $x_i$ does not diverge even when the nonlinear term $Kx^2_i(t+\Delta t)$ in Equation (8) is removed. Therefore, a first algorithm in Equation (9) below can be used instead of the algorithm in Equation (8).

$$x_i(t+\Delta t) = x_i(t) + Dy_i(t)\Delta t \qquad (9)$$

$$y_i(t+\Delta t) = y_i(t) + [\{-D + p(t+\Delta t)\}x_i(t+\Delta t) + f_i(t+\Delta t)]\Delta t$$

$$f_i(t+\Delta t) = -cz_i(t+\Delta t)$$

$$z_i(t+\Delta t) =$$

$$J_i^{(1)}\alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t)x_k(t+\Delta t) + \ldots$$

In the case of a QUBO problem, $z_i(t+\Delta t)$ in Equation (9) can be given by Equation (10) below.

$$z_i(t+\Delta t) = -h_i\alpha(t+\Delta t) - \sum_{j=1}^{N} J_{i,j} x_j(t+\Delta t) \qquad (10)$$

In the first algorithm in Equation (9) above, a pseudo-random number is not necessarily used. The first algorithm in Equation (9) is to solve the Hamiltonian equation similar to Equation (8), and the variable $y_i$ corresponds to the momentum. Therefore, the solution can be found stably using the symplectic Euler method, even without using a small value as the time step $\Delta t$. In the first algorithm in Equation (9), a combinatorial optimization problem having an objective function of degree 3 or more can be solved.

Figure 9A:
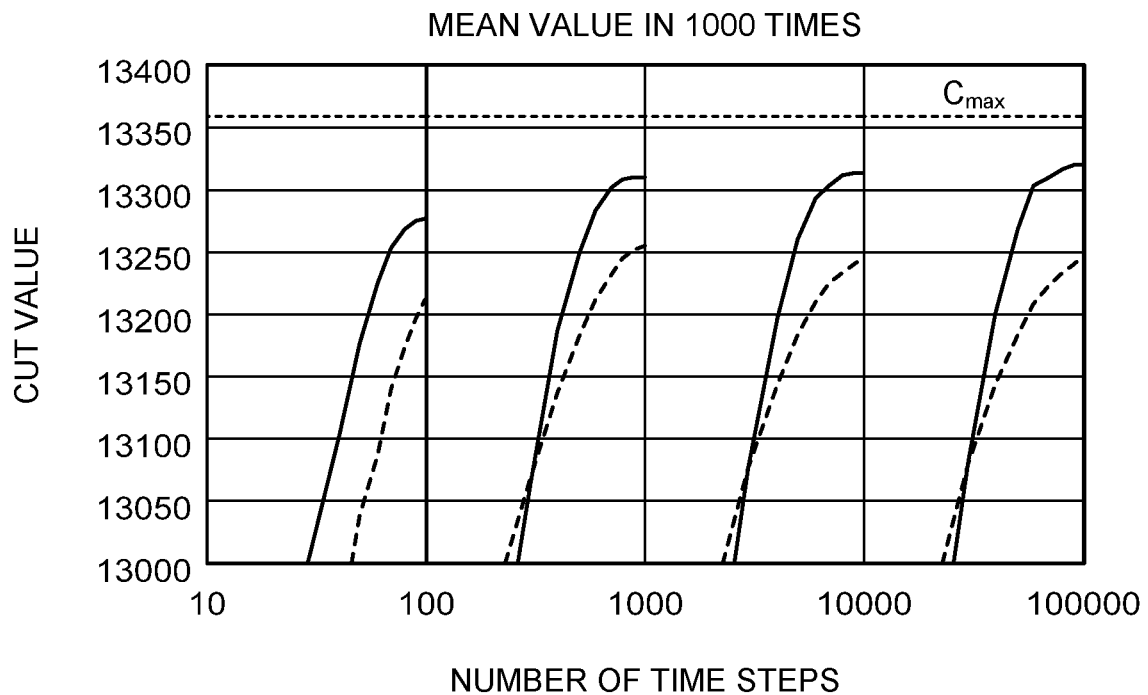
FIG. 9A is a diagram illustrating a mean value of the cut value when a first algorithm was used.
Figure 9B:
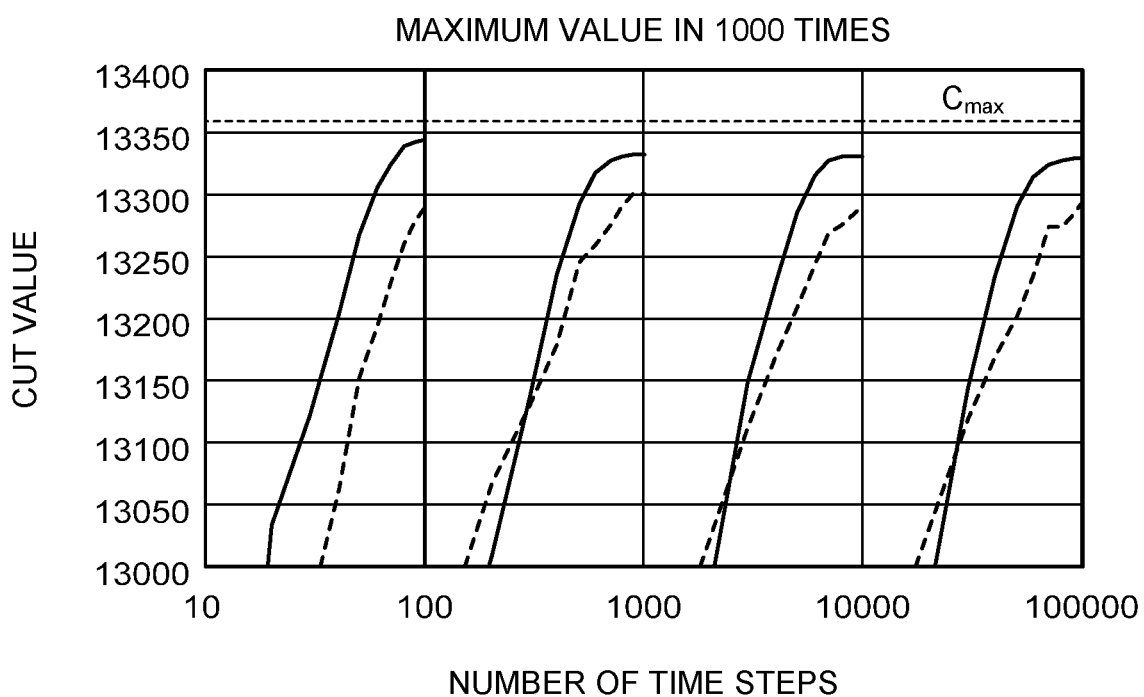
FIG. 9B is a diagram illustrating a maximum value of the cut value when the first algorithm was used.

FIG. 9A and FIG. 9B illustrate the result when G22 in G-set was solved 1000 times using the first algorithm in Equation (9). In FIG. 9A and FIG. 9B, the first algorithm in Equation (9) is used. The value of the second coefficient r is set to 0, and the time step is set to $\Delta t=1$. w is a uniform random number in the interval [$x_{av2}$, 1]. $x_{av2}$ is the root mean square of N variables $x_i$. The other calculation conditions are similar to those in FIG. 6A and FIG. 6B. In Equation (9), there is no nonlinear term and therefore the time step $\Delta t$ can be set to twice that of FIG. 6A and FIG. 6B.

FIG. 9A illustrates the mean value of the cut value. On the other hand, FIG. 9B illustrates the maximum value of the cut value. The correspondence of the axes and the definition of the broken line Cmax in the horizontal direction in the graphs are similar to those of FIG. 6A and FIG. 6B. Data depicted by the solid lines in the graphs in FIG. 9A and FIG. 9B corresponds to the result when the first algorithm in Equation (9) was applied. On the other hand, data depicted by the broken lines in the graphs of FIG. 9A and FIG. 9B corresponds to the result when the algorithm in Equation (8) was used.

Referring to FIG. 9A and FIG. 9B, it can be understood that both of the mean value of the cut value and the maximum value of the cut value approach the optimal solution, compared with FIG. 6A and FIG. 6B. However, even in the results in FIG. 9A and FIG. 9B, there is still a difference between the calculated value and the optimal solution. This error may be attributable to that the continuous variable $x_i$ is used rather than spin $s_i$ as a variable, in the basic formula that defines the value $z_i$ of an element of the third vector. Specifically, as high-order terms increase, the product computation of variables x in $z_i$ may cause increase of the error. For example, when a variable greater than 1 is multiplied multiple times, the value becomes significantly greater than 1.

Second Algorithm

In order to reduce the error, the first algorithm in Equation (9) was further improved. Specifically, as shown in Equation (11) below, a value $\mathrm{sgn}(x_i)$ obtained by converting the continuous variable $x_i$ by the signum function was substituted into $z_i$, instead of the continuous variable $x_i$. The value $\mathrm{sgn}(x_i)$ obtained by converting the continuous variable $x_i$ by the signum function corresponds to spin $s_i$.

$$x_i(t+\Delta t) = x_i(t) + Dy_i(t)\Delta t \qquad (11)$$
$$y_i(t+\Delta t) = y_i(t) + [\{-D + p(t+\Delta t)\}x_i(t+\Delta t) + f_i(t+\Delta t)]\Delta t$$
$$f_i(t+\Delta t) = -cz_i(t+\Delta t)$$
$$z_i(t+\Delta t) =$$
$$J_i^{(1)}\alpha(t+\Delta t) + \sum_{j=1}^{N} J_{i,j}^{(2)} s_j(t+\Delta t) + \sum_{j=1}^{N}\sum_{k=1}^{N} J_{i,j,k}^{(3)} s_j(t+\Delta t)x_k(t+\Delta t) + \ldots$$

In the case of a QUBO problem, $z_i(t+\Delta t)$ in Equation (11) is given by Equation (12) below.

$$z_i(t+\Delta t) = -h_i\alpha(t+\Delta t) - \sum_{j=1}^{N} J_{i,j} s_j(t+\Delta t) \qquad (12)$$

In Equation (11), the coefficient α in the term including the first-rank tensor in $z_i$ may be set to a constant (for example, α=1). The second algorithm in Equation (11) is not the one that solves the Hamiltonian equation, unlike Equations (8) and (9). Equation (11) can be considered as a dynamical system controlled by an external field. In the second algorithm in Equation (11), when a HOMO having a high-order objective function is handled, the product of any spins in $z_i$ takes a value of either −1 or 1, and therefore occurrence of an error due to product computation can be prevented.

As shown in the second algorithm in Equation (11) above, data calculated by the calculation server 3 may further include a fourth vector $(s_1, s_2, \ldots, s_N)$ with $s_i$ (i= 1, 2, ..., N) as an element. The fourth vector can be obtained by converting the elements of the first vector by the signum function. That is, the action computing unit 51 may be configured to update the values of the elements of the third vector, using the basic formula in the form of a partial derivative of the energy equation of the Ising model with respect to variables included in all the terms. Here, the elements of the first vector or the elements of the fourth vector obtained by converting the elements of the first vector by the signum function can be used as the variables of the basic formula.

Figure 10A:
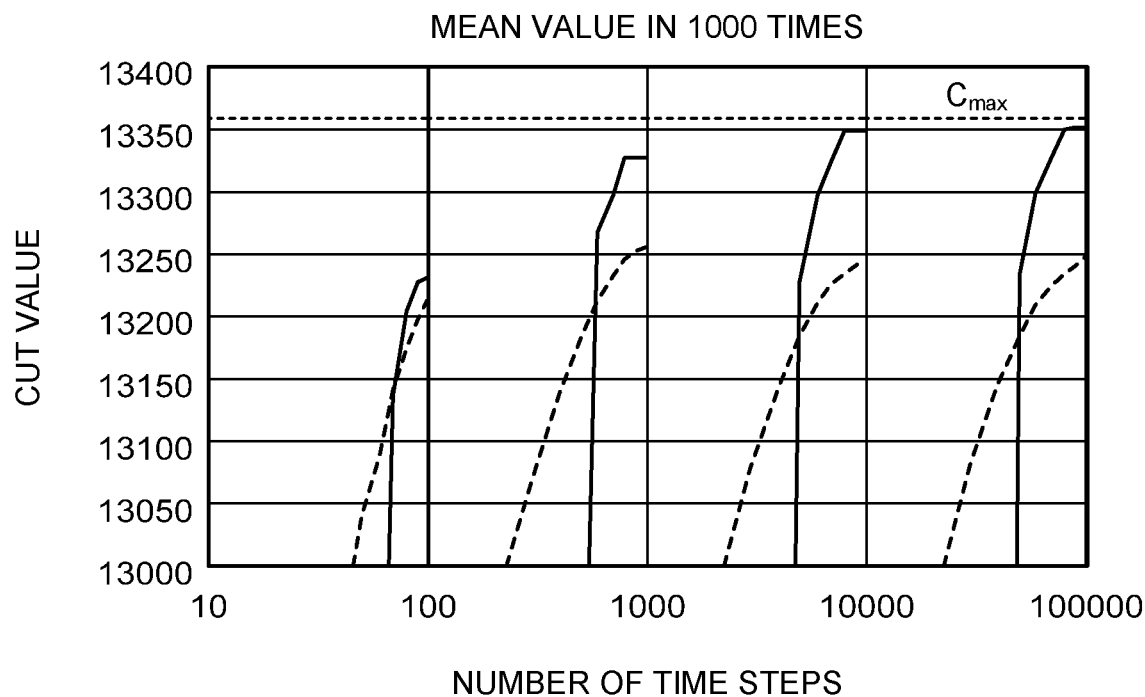
FIG. 10A is a diagram illustrating a mean value of the cut value when a second algorithm was used.
Figure 10B:
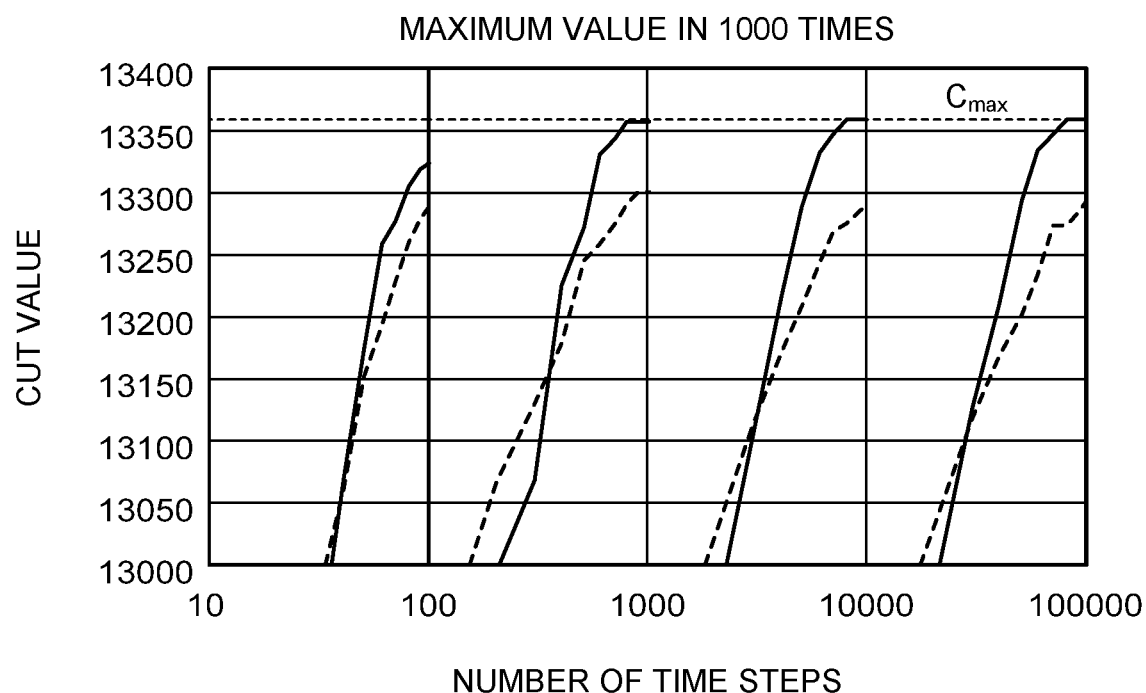
FIG. 10B is a diagram illustrating a maximum value of the cut value when the second algorithm was used.

FIG. 10A and FIG. 10B illustrate the result when G22 in G-set was solved 1000 times using the second algorithm in Equation (11). Except for the difference of the algorithms used, the calculation conditions (for example, time step Δt, the coefficients, w defined for keeping $x_i$ between −1 to 1) in FIG. 10A and FIG. 10B are similar to those of FIG. 9A and FIG. 9B. FIG. 10A illustrates the mean value of the cut value. On the other hand, FIG. 10B illustrates the maximum value of the cut value. The correspondence of the axes and the definition of the broken line Cmax in the horizontal direction in the graphs are similar to those of FIG. 6A and FIG. 6B and FIG. 9A and FIG. 9B. Data depicted by the solid lines in the graphs of FIG. 10A and FIG. 10B corresponds to the result when the second algorithm in Equation (11) was applied. On the other hand, data depicted by the broken lines in the graphs of FIG. 10A and FIG. 10B corresponds to the result when the algorithm in Equation (8) was used.

Referring to FIG. 10A and FIG. 10B, it can be understood that both of the mean value of the cut value and the maximum value of the cut value are values closer to the optimal solution, compared with FIG. 9A and FIG. 9B. Referring to FIG. 10B, it can be understood that the maximum value 13359 of the cut value can be obtained by using the second algorithm in Equation (11).

Third Algorithm

The first algorithm in Equation (9) may be transformed into Equation (13) below.

$$x_i(t+\Delta t) = x_i(t) + Dy_i(t)\Delta t \qquad (13)$$
$$y_i(t+\Delta t) = y_i(t) + [\{-D + p(t+\Delta t)\}x_i(t+\Delta t) + f_i(t+\Delta t)]\Delta t$$
$$f_i(t+\Delta t) = -g(t)\mathrm{sgn}[z_i(t+\Delta t)]$$
$$z_i(t+\Delta t) =$$
$$J_i^{(1)}\alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t)x_k(t+\Delta t) + \ldots$$

In the case of a QUBO problem, $z_i(t+\Delta t)$ in Equation (13) is given by Equation (14) below.

$$z_i(t+\Delta t) = -h_i\alpha(t+\Delta t) - \sum_{i=1}^{N} J_{i,j} x_j(t+\Delta t) \qquad (14)$$

The third algorithm in Equation (13) differs from the examples described above in calculation method of the term $f_i$ corresponding to the external force. The value $z_i$ calculated using the fourth equation of (13) is converted by the signum function and normalized by 1. That is, the action computing unit 51 may be configured to update the elements of the third vector based on the value obtained by converting the value ($z_i$) of the basic formula calculated with an element of the first vector as a variable, by a first function. For example, the signum function can be used as the first function. However, as will be described later, any other functions may be used as the first function.

In Equation (13), the function g(t) is used instead of the coefficient c. In general, the degree of contribution of the value $z_i$ of an element of the third vector to the calculation result varies with problems. However, in Equation (13), since the value $z_i$ of an element of the third vector is normalized by 1, there is no need for determining the value of the coefficient c for each problem. For example, Equation (15) below can be used as the function g(t).

$$g(t) = \{D - p(t)\}\sqrt{p(t)} \quad (15)$$

The function in Equation (15) monotonously increases and then monotonously decreases, with the number of times of updating. However, Equation (15) above is only by way of example, and a function different from this, with p(t) as a parameter, may be used as g(t). That is, the action computing unit 51 may be configured to update the elements of the third vector by multiplying a second function with the first coefficient p as a parameter.

Figure 11A:
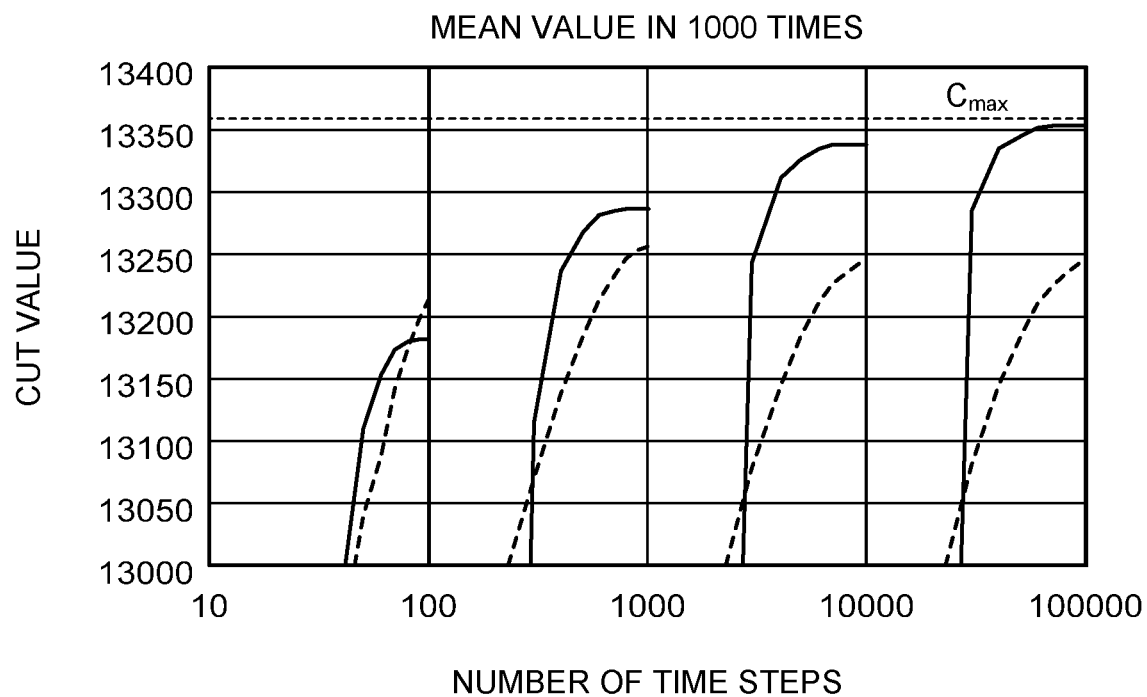
FIG. 11A is a diagram illustrating a mean value of the cut value when a third algorithm was used.
Figure 11B:
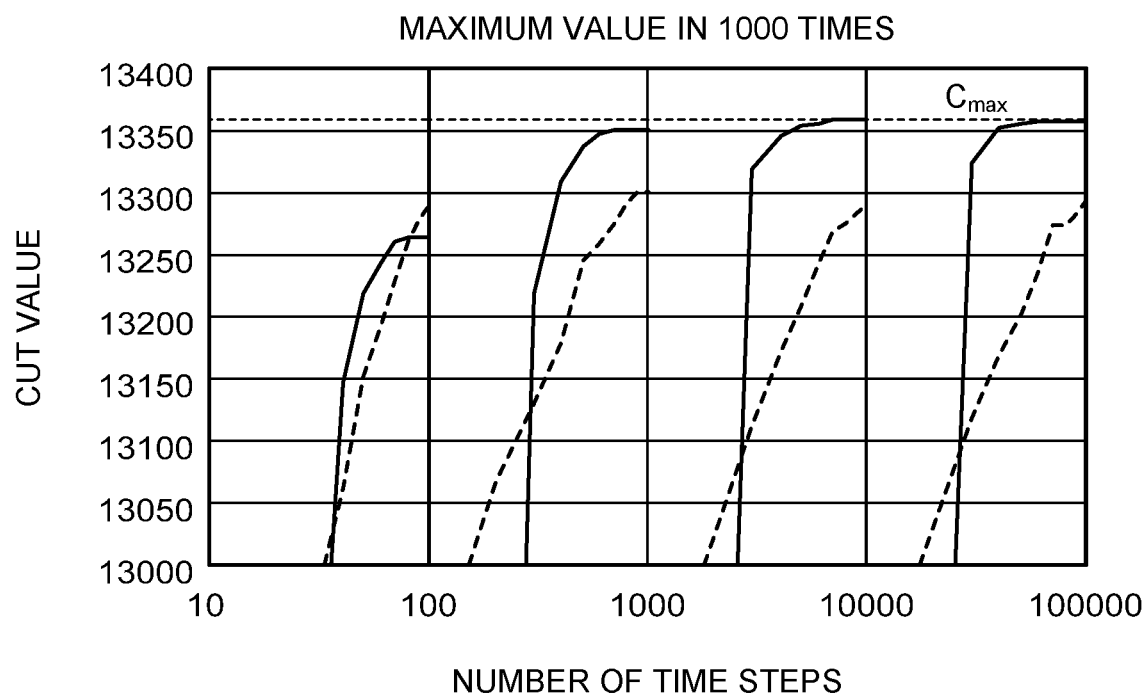
FIG. 11B is a diagram illustrating a maximum value of the cut value when the third algorithm was used.

FIG. 11A and FIG. 11B illustrate the result when G22 in G-set was solved 1000 times using the third algorithm in Equation (13). Except for the difference of the algorithms used, the calculation conditions (for example, time step Δt, the coefficients used, w defined for keeping $x_i$ between −1 to 1) in FIG. 11A and FIG. 11B are similar to those of FIG. 9A and FIG. 9B. FIG. 11A illustrates the mean value of the cut value. On the other hand, FIG. 11B illustrates the maximum value of the cut value. The correspondence of the axes and the definition of the broken line Cmax in the horizontal direction in the graphs are similar to those of FIG. 6A and FIG. 6B and FIG. 9A and FIG. 9B. Data depicted by the solid lines in the graphs of FIG. 11A and FIG. 11B corresponds to the result when the third algorithm in Equation (13) was applied. On the other hand, data depicted by the broken lines in the graphs of FIG. 11A and FIG. 11B corresponds to the result when the algorithm in Equation (8) was used.

Referring to FIG. 11A and FIG. 11B, it can be understood that both of the mean value of the cut value and the maximum value of the cut value are values closer to the optimal solution, compared with the algorithm in Equation (8). Referring to FIG. 11B, it can be understood that the maximum value 13359 can be obtained by using the third algorithm in Equation (13).

Modifications

In the algorithms in Equation (9), Equation (11), and Equation (13), calculation may be performed using the coefficient α in the term including the first-rank tensor in the basic formula (the equation of $z_i$) as a constant coefficient (for example, α=1). In the algorithms in Equation (9), Equation (11), and Equation (13), a coefficient that monotonously decreases or monotonously increases with the number of times of updating may be used as the coefficient α in the term including the first-rank tensor in the basic formula (the equation of $z_i$). In this case, the term including the first-rank tensor in the basic formula monotonously decreases or monotonously increases with the number of times of updating.

The first algorithm in Equation (9) and the second algorithm in Equation (11) described above include the coefficient c. When it is desired that the coefficient c is set to a value close to the reciprocal of the maximum eigenvalue of the $J^{(2)}$ matrix, it is necessary to calculate the maximum eigenvalue of the $J^{(2)}$ matrix or to estimate the maximum eigenvalue of the $J^{(2)}$ matrix. The calculation of the maximum eigenvalue requires a large amount of calculation. On the other hand, the estimation of the maximum eigenvalue does not ensure value accuracy. Then, a function whose value varies with the number of times of updating can be used as given by Equation (15) above, instead of the coefficient c. Instead of the coefficient c, an approximate value c1 may be used, which is calculated based on the first vector $(x_1, x_2, \ldots, x_N)$ and the third vector $(z_1, z, \ldots, z_N)$ as given by Equation (16) below.

$$c_1 = \frac{|x|}{|z|} = \frac{\sqrt{x_1^2 + x_2^2 + \ldots + x_N^2}}{\sqrt{z_1^2 + z_2^2 + \ldots + z_N^2}} \quad (16)$$

Referring to Equation (16), both of the denominator and the numerator are the norms of the vectors. As given by Equation (16), L2 norm, which is the root sum square of the elements of the vector, can be used as the norm of the vector. However, a norm by any other definition, such as L1 norm, which is the sum of absolute values of elements of the vector, may be used.

That is, the updating unit 50 may be configured to update an element of the second vector by calculating a third coefficient c1 by dividing the norm of the first vector by the norm of the third vector, and adding a weighted value of the product of the first coefficient p(t+Δt) and the corresponding element of the updated first vector, and a weighted value of the corresponding element of the third vector with the third coefficient c1, to the element of the second vector.

Furthermore, instead of the coefficient c, an approximate value c'1 defined by an inner product as given by Equation (17) below may be used.

$$c_1' = \frac{(x, x)}{|(x, z)|} = \frac{x_1^2 + x_2^2 + \ldots + x_N^2}{|x_1 z_1 + x_2 z_2 + \ldots + x_N z_N|} \quad (17)$$

That is, the updating unit 50 may be configured to update an element of the second vector by calculating a third coefficient c'1 by dividing the inner product of the first vectors by the absolute value of the inner product of the first vector and the third vector, and adding a weighted value of the product of the first coefficient p(t+Δt) and the corresponding element of the updated first vector, and a weighted value of the corresponding element of the third vector with the third coefficient c'1, to the element of the second vector.

The approximate values c1 and c'1 are not constants, unlike the coefficient c, but are coefficients dynamically controlled, because they are calculated based on the values of the first vector $(x_1, x_2, \ldots, x_N)$ and the third vector $(z_1, z_2, \ldots, z_N)$ in each calculation timing. Since for the first vector $(x_1, x_2, \ldots, x_N)$ and the third vector $(z_1, z_2, \ldots, z_N)$, those calculated in the variable updating process can be used, calculating the approximate values c1 and c'1 does not significantly increase the amount of calculation. In the Ising problem with no local magnetic field, when $(x_1, x_2, \ldots, x_N)$ is an eigenvector corresponding to the maximum eigenvalue of $J^{(2)}$, the approximate values c1 and c'1 are equal to the reciprocal of the maximum eigenvalue of $J^{(2)}$. When $(x_1, x_2, \ldots, x_N)$ deviates from the eigenvector, the approximate values c1 and c'1 become values greater than the reciprocal of the maximum eigenvalue of $J^{(2)}$, and convergence to a solution is accelerated.

Figure 12A:
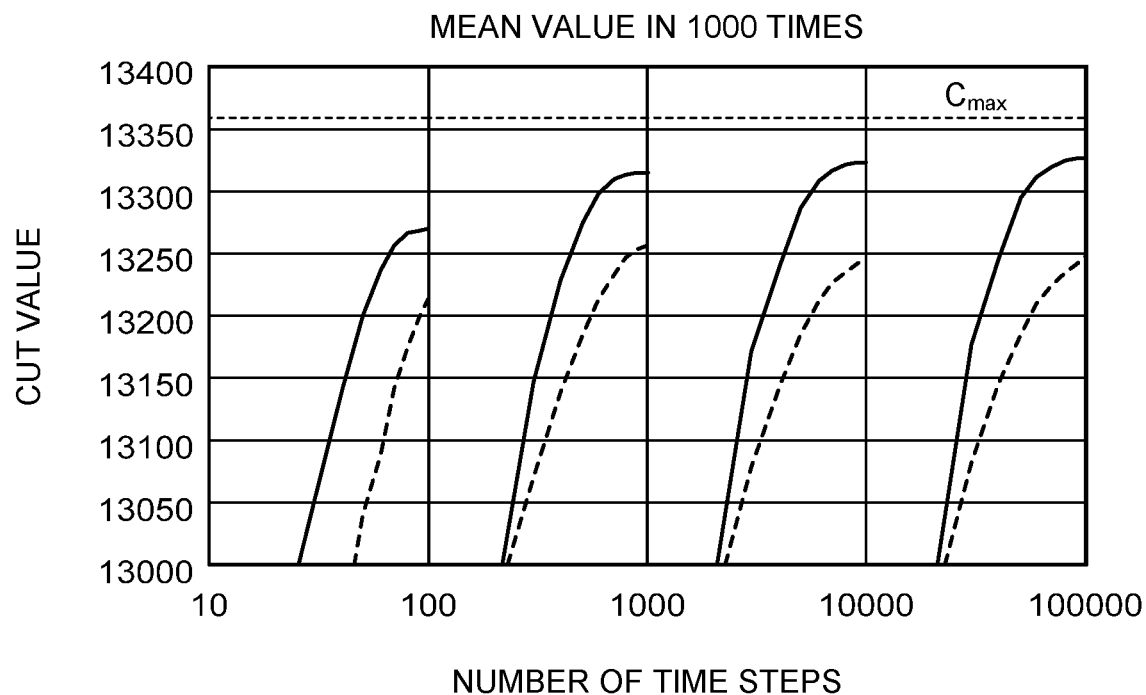
FIG. 12A is a diagram illustrating a mean value of the cut value when the first algorithm using c1 was used.
Figure 12B:
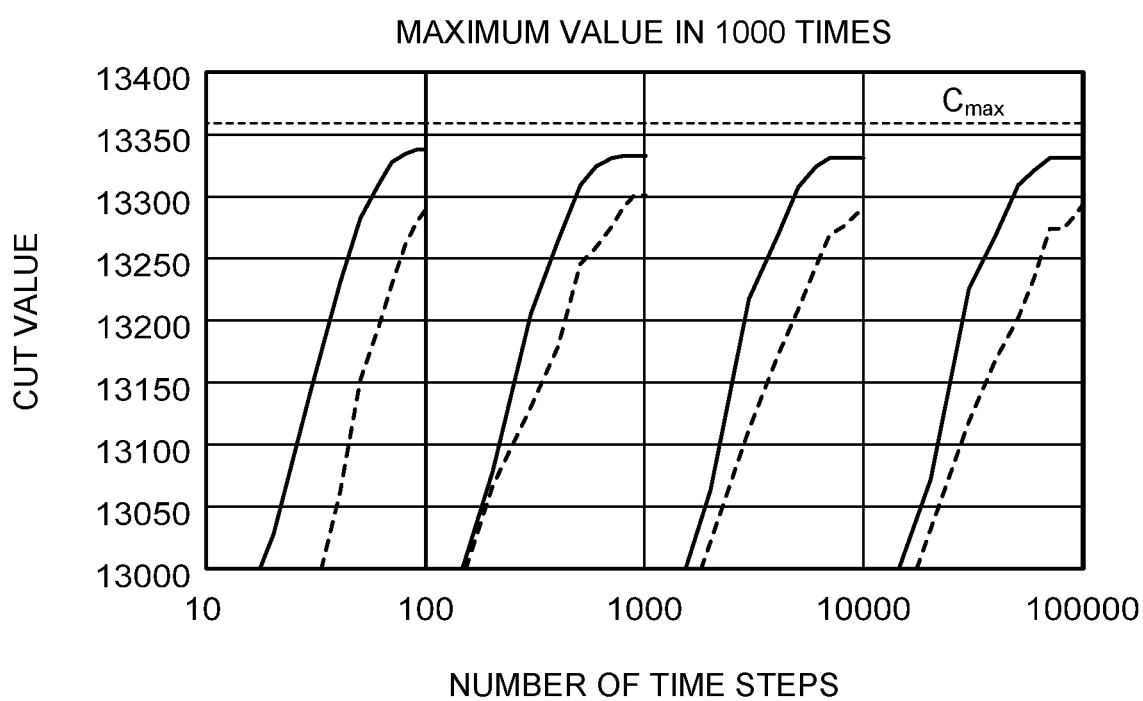
FIG. 12B is a diagram illustrating a maximum value of the cut value when the first algorithm using c1 was used.
Figure 13A:
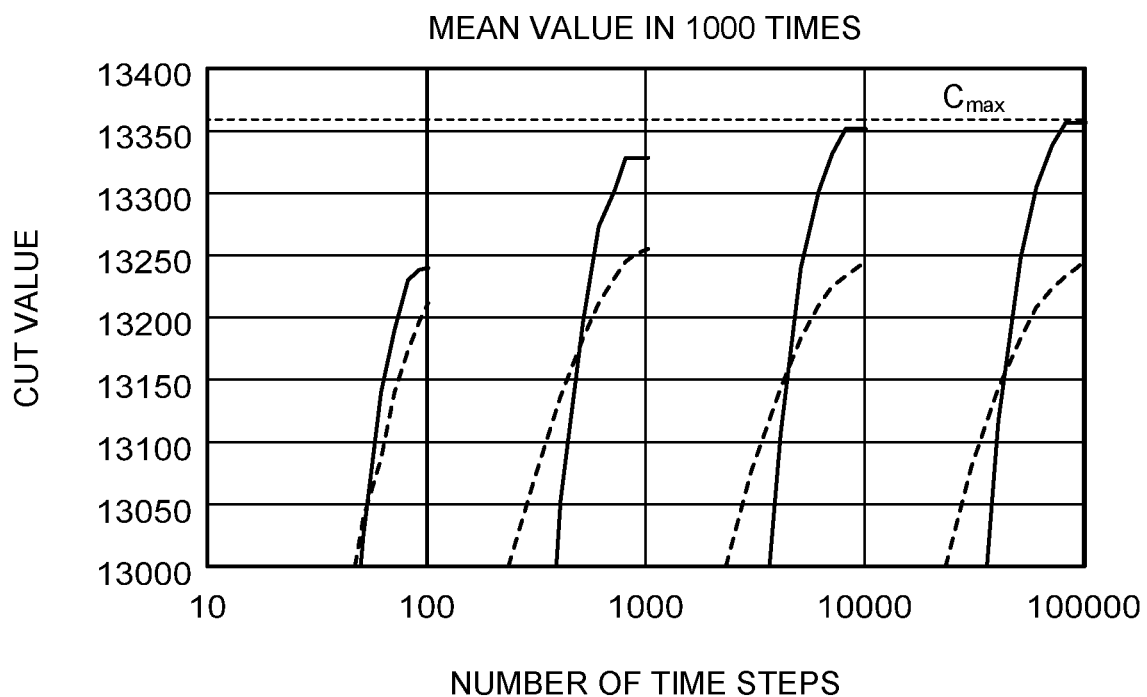
FIG. 13A is a diagram illustrating a mean value of the cut value when the second algorithm using c1 was used.
Figure 13B:
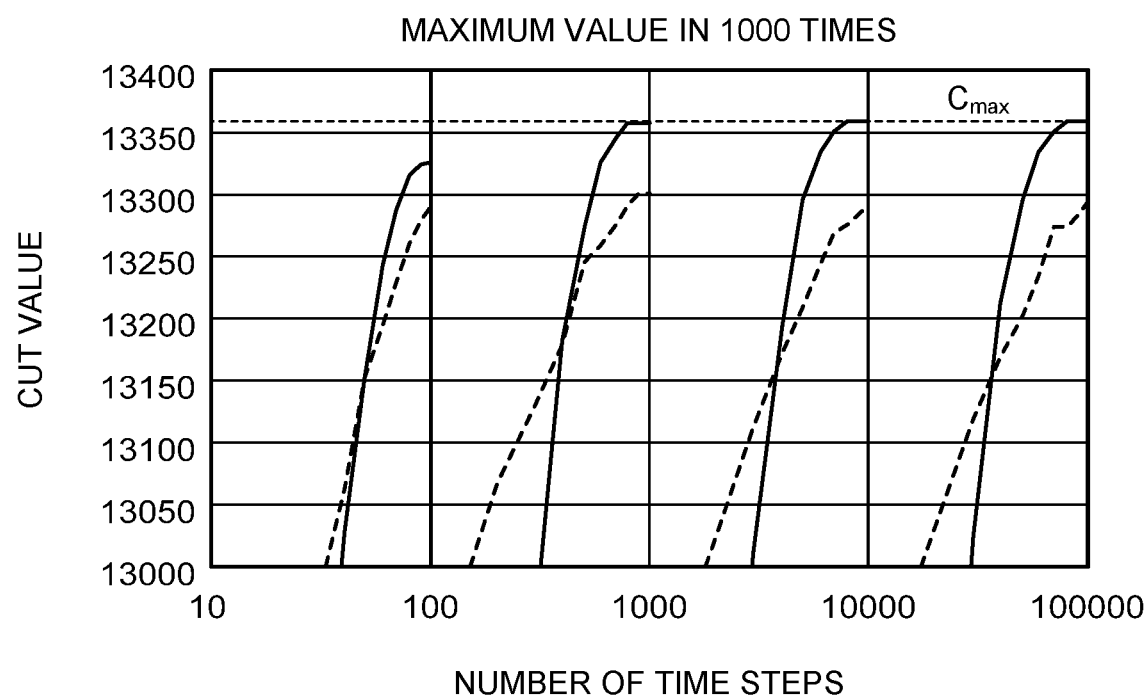
FIG. 13B is a diagram illustrating a maximum value of the cut value when the second algorithm using c1 was used.

FIG. 12A and FIG. 12B illustrate the result when G22 in G-set was solved 1000 times using the approximate value c1 instead of the coefficient c in the first algorithm in Equation (9). FIG. 13A and FIG. 13B illustrate the result when G22 in G-set was solved 1000 times using the approximate value c1 instead of the coefficient c in the second algorithm in Equation (11).

FIG. 12A and FIG. 13A illustrate the mean value of the cut value. On the other hand, FIG. 12B and FIG. 13B illustrate the maximum value of the cut value. The correspondence of the axes and the definition of the broken line Cmax in the horizontal direction in the graphs are similar to those of the graphs described above. Data depicted by the broken lines in FIG. 12A, FIG. 12B, FIG. 13A, and FIG. 13B shows the result when the algorithm in Equation (8) was used.

Referring to FIG. 12A, FIG. 12B, FIG. 13A, and FIG. 13B, it can be understood that both of the mean value of the cut value and the maximum value of the cut value are values closer to the optimal solution, compared with the algorithm in Equation (8). In particular, it can be understood that in the second algorithm in Equation (11), the maximum value 13359 of the cut value is obtained.

In the first algorithm in Equation (9) and the second algorithm in Equation (11), an approximate value c2 or c'2 defined by Equation (18) below may be used instead of the approximate values c1 and c'1.

$$c_2 = \frac{|s|}{|z|} = \frac{\sqrt{s_1^2 + s_2^2 + \ldots + s_N^2}}{\sqrt{z_1^2 + z_2^2 + \ldots + z_N^2}} = \frac{\sqrt{N}}{\sqrt{z_1^2 + z_2^2 + \ldots + z_N^2}}$$

$$c'_2 = \frac{(s, s)}{|(s, z)|} = \frac{s_1^2 + s_2^2 + \ldots + s_N^2}{|s_1 z_1 + s_2 z_2 + \ldots + s_N z_N|} = \frac{N}{|s_1 z_1 + s_2 z_2 + \ldots + s_N z_N|} \quad (18)$$

That is, the updating unit 50 may be configured to update an element of the second vector by calculating a third coefficient c2 by dividing the norm of the fourth vector obtained by converting the elements of the first vector by the signum function, by the norm of the third vector, and adding a weighted value of the product of the first coefficient p(t+Δt) and the corresponding element of the updated first vector, and a weighted value of the corresponding element of the third vector with the third coefficient c2, to the element of the second vector.

Furthermore, the updating unit 50 may be configured to update an element of the second vector by calculating a third coefficient c'2 by dividing the inner product of the fourth vectors obtained by converting the elements of the first vector by the signum function, by the absolute value of the inner product of the fourth vector and the third vector, and adding a weighted value of the product of the first coefficient p(t+Δt) and the corresponding element of the updated first vector, and a weighted value of the corresponding element of the third vector with the third coefficient c'2, to the element of the second vector.

Since for the third vector $(z_1, z_2, \ldots, z_N)$ in Equation (18), the one calculated by the algorithm can be used, finding the approximate values c2 and c'2 does not significantly increase the amount of calculation.

When the approximate values c1, c'1, c2, c'2 are calculated using the values of the vectors during execution of the algorithms, the values may vary heavily with the calculation timings. In order to suppress variation of the approximate values c1, c'1, c2, c'2, values obtained by converting the approximate values c1, c'1, c2, c'2 based on a prescribed rule may be used instead of the approximate values c1, c'1, c2, c'2. For example, Equation (19) below can be used as the prescribed rule.

$$d(t+\Delta t) = d(t) + \gamma[-d(t) + c(t+\Delta t)]\Delta t \quad (19)$$

Here, a value smaller than 1 may be set for γ. For example, the approximate value calculated by Equations (16) to (18) above is substituted into c(t+Δt) of Equation (19). Assuming that c(t+Δt) is a value obtained by sampling a signal including an oscillating component in each calculation timing, it can be said that d(t+Δt) corresponds to a value after c(t+Δt) passes through a lowpass filter of a certain bandwidth.

That is, the updating unit 50 may be configured to update an element of the second vector by calculating a fourth coefficient that is the value after the third coefficient (one of the approximate values c1, c'1, c2, c'2) passes through a lowpass filter, and using the fourth coefficient instead of the third coefficient.

Examples of finding a solution to the Ising model using the simulated bifurcation algorithm have been described above. However, combinatorial optimization problems that can be solved by the simulated bifurcation algorithm are not limited to the Ising problem. Common combinatorial optimization problems with binary variables can be solved using the simulated bifurcation algorithm. For example, the algorithms described above can be applied to a combinatorial optimization problem in which a variable of the objective function is a binary variable that takes either of a (first value) and b (second value) greater than a. When a solution to the objective function is found after a certain number of times of updating, the function $f(x_i)$ whose range is binary, a or b, may be used instead of the signum function. The value of this function $f(x_i)$ is determined based on the result of comparison of the value of the variable $x_i$ with a threshold value v (a<v<b). For example, if $x_i$<v, $f(x_i)$=a. If v<$x_i$, $f(x_i)$=b. For example, when $x_i$=v, $f(x_i)$=a or $f(x_1)$=b. Here, for example, (a+b)/2 can be used as a value of the threshold value v. The function $f(x_i)$ above may be used as the first function that converts an element of the first vector into an element of the fourth vector.

For example, in a case where the first algorithm in Equation (9), the second algorithm in Equation (11), and the third algorithm in Equation (13) described above are used, the value of the variable $x_i$ is changed to {v−w_} when the variable $x_i$ becomes smaller than a as a result of updating, where w_ is a real number equal to or greater than 0 and equal to or smaller than (v−a). When the variable $x_i$ becomes greater than b as a result of updating, the value of the variable $x_i$ is changed to {v+w_+}, where w_+ is a real number equal to or greater than 0 and equal to or smaller than (b−v).

For example, w_ may be a predetermined value equal to or greater than 0 and equal to or smaller than (v−a), and w_+ may be a predetermined value equal to or greater than 0 and equal to or smaller than (b−v).

Furthermore, w_ may be a value in accordance with a random number that occurs with a uniform probability in a prescribed interval within a range equal to or greater than 0 and equal to or smaller than (v−a). Furthermore, w_+ may be a value in accordance with a random number that occurs with a uniform probability in a prescribed interval within a range equal to or greater than 0 and equal to or smaller than (b−v).

Furthermore, w_ and w_+ may be an index value ($x_{ave}$) representing the average for the magnitudes of deviations of a plurality of first variables ($x_i$) from the threshold value (v). For example, the index value ($x_{ave}$) is the root mean square or the average absolute value of deviations of first variables ($x_i$) of a plurality of elements from the threshold value (v).

Furthermore, $w_-$ may be a value determined by a random number equal to or greater than the index value ($x_{ave}$) and equal to or smaller than (v−a). Furthermore, $w_+$ may be a value determined by a random number equal to or greater than the index value ($x_{ave}$) and equal to or smaller than (b−v). When the index value ($x_{ave}$) exceeds (v−a), $w_-$ is (v−a). When the index value exceeds (b−v), $w_+$ is (b−v).

Furthermore, $w_-$ and $w_+$ may be increasing coefficients. The increasing coefficient is 0 at the initial time of the updating process and increases with time from the initial time to the end time. $w_-$ may be a value determined by a random number equal to or greater than the increasing coefficient and equal to or smaller than (v−a).

Furthermore, $w_+$ may be a value determined by a random number equal to or greater than the increasing coefficient and equal to or smaller than (b−v). When the increasing coefficient exceeds (v−a), $w_-$ is (v−a). When the increasing coefficient exceeds (b−v), $w_+$ is (b−v).

Based on the foregoing, when the first algorithm in Equation (9), the second algorithm in Equation (11), and the third algorithm in Equation (13) described above are applied to a combinatorial optimization problem in which a variable of the objective function is a discrete variable that takes one of the first value (a) and the second value (b), the updating unit 50 performs the following process in the updating process of the first variable $x_i$ and the second variable $y_i$.

That is, when the first variable ($x_i$) is smaller than the first value (a), the updating unit 50 changes the first variable ($x_i$) to a value equal to or greater than the first value (a) and equal to or smaller than the threshold value (v). Furthermore, when the first variable ($x_i$) is greater than the second value (b), the updating unit 50 changes the first variable ($x_i$) to a value equal to or greater than a predetermined threshold value (v) and equal to or smaller than the second value (b).

More specifically, for example, when the first variable ($x_i$) is smaller than the first value (a), the updating unit 50 may change the first variable ($x_i$) to a predetermined value equal to or greater than the first value (a) and equal to or smaller than the threshold value (v), or a value in accordance with a random number that occurs with a uniform probability in a prescribed interval within a range equal to or greater than the first value (a) and equal to or smaller than the threshold value (v). Furthermore, when the first variable ($x_i$) is greater than the second value (b), the updating unit 50 may change the first variable ($x_i$) to a predetermined value equal to or greater than the threshold value (v) and equal to or smaller than the second value (b), or a value in accordance with a random number that occurs with a uniform probability in a prescribed interval within a range equal to or greater than the threshold value (v) and equal to or smaller than the second value (b).

For example, when the first variable ($x_i$) is smaller than the first value (a), the updating unit 50 may change the first variable ($x_i$) to a value obtained by subtracting the index value from the threshold value (v). When the first variable ($x_i$) is greater than the second value (b), the updating unit 50 may change the first variable ($x_i$) to a value obtained by adding the index value to the threshold value (v). In this case, the index value represents the average for the magnitudes of deviations of the first variables ($x_i$) of the elements from the threshold value (v). For example, the index value is the root mean square or the average absolute value of deviations of the first variables ($x_i$) of the elements from the threshold value (v).

For example, when the first variable ($x_i$) is smaller than the first value (a), the updating unit 50 may change the first variable ($x_i$) to a value, determined by a random number, equal to or greater than the first value (a) and equal to or greater than a value obtained by subtracting the index value from the threshold value (v). Furthermore, when the first variable ($x_i$) is greater than the second value (b), the updating unit 50 may change the first variable ($x_i$) to a value, determined by a random number, equal to or greater than a value obtained by adding the index value to the threshold value (v) and equal to or smaller than the second value (b).

When the first variable ($x_i$) is smaller than the first value (a), the updating unit 50 may change the first variable ($x_i$) to a value obtained by subtracting the increasing coefficient from the threshold value (v). When the first variable ($x_i$) is greater than the second value (b), the updating unit 50 may change the first variable ($x_i$) to a value obtained by adding the increasing coefficient to the threshold value (v). In this case, the increasing coefficient is 0 at the initial time and increases with time from the initial time to the end time.

When the first variable ($x_i$) is smaller than the first value (a), the updating unit 50 may change the first variable ($x_i$) to a value, determined by a random number, equal to or greater than the first value (a) and equal to or smaller than a value obtained by adding the increasing coefficient to the threshold value (v). Furthermore, when the first variable ($x_i$) is greater than the second value (b), the updating unit 50 may change the first variable ($x_i$) to a value, determined by a random number, equal to or greater than a value obtained by adding the increasing coefficient to the threshold value (v) and equal to or smaller than the second value (b).

Examples of the simulated bifurcation algorithms implemented by the symplectic Euler method and the results of calculating a combinatorial optimization problem using the individual algorithms have been described above. Implementation examples of the algorithms described above will be described below.

Implementation Example to PC Cluster

First of all, an example of implementation of the algorithms described above to a PC cluster will be described. The PC cluster refers to a system in which a plurality of computers are connected to implement calculation performance unachievable by one computer. For example, the information processing system 100 illustrated in FIG. 1 includes the calculation servers 3 and processors and can be used as a PC cluster. For example, in the PC cluster, parallel calculation can be executed using a message passing interface (MPI), even in a configuration such as the information processing system 100 in which memory is distributed over the calculation servers 3. For example, the control program 14E of the management server 1 and the calculation program 34B and the control program 34C of each calculation server 3 can be implemented using an MPI.

When the number of processors used in the PC cluster is Q, each processor can calculate L variables among the variables $x_i$ included in the first vector ($x_1, x_2, \ldots, x_N$). Similarly, each processor can calculate L variables among the variables $y_i$ included in the second vector ($y_1, y_2, \ldots, y_N$). That is, a processor #j (j=1, 2, . . . , Q) calculates the variables $\{x_m | m=(j-1)L+1, (j-1)L+2, \ldots, jL\}$ and $\{y_m | m=(j-1)L+1, (j-1)L+2, \ldots, jL\}$. It is assumed that the tensor $J^{(n)}$ given by Equation (20) below necessary for calculation of $\{y_m | m=(j-1)L+1, (j-1)L+2, \ldots, jL\}$ by the processor #j is stored in a storage area (for example, a register, a cache, or a memory) accessible by the processor #j.

$$\{J_m^{(1)} \mid m = (i-1)L+1, \ldots iL\} \quad (20)$$

$$\{J_{m,j}^{(2)} \mid m = (i-1)L+1, \ldots iL; j = 1, \ldots N\}$$

$$\{J_{m,j,k}^{(3)} \mid m = (i-1)L+1, \ldots iL; j = 1, \ldots N; k = 1, \ldots N\}, \ldots$$

The case where each processor calculates a given number of variables of the first vector and the second vector has been described here. However, the number of variables of the first vector and the second vector to be calculated may vary among the processors. For example, when there is a performance difference among the processors mounted on the calculation server 3, the number of variables to be calculated can be determined in accordance with the performance of the processors.

That is, the information processing device (for example, the calculation server 3) may include a plurality of processors. The updating unit 50 includes a plurality of processors, and each of the processors in the updating unit 50 may be configured to update the values of some elements of the first vector and the values of some elements of the second vector.

To update the value of the variable $y_i$, the values of all the components of the first vector $(x_1, x_2, \ldots, x_N)$ or the fourth vector $(s_1, s_2, \ldots, s_N)$ obtained by converting the elements of the first vector to binary variables are necessary. The conversion into binary variables can be performed using, for example, the signum function sgn( ). Then, the Allgather function can be used to allow Q processors to share the values of all the components of the first vector $(x_1, x_2, \ldots, x_N)$ or the fourth vector $(s_1, s_2, \ldots, s_N)$. Although the values of the first vector $(x_1, x_2, \ldots, x_N)$ or the fourth vector $(s_1, s_2, \ldots, s_N)$ need to be shared among the processors, the sharing of the values among the processors is not essential for the second vector $(y_1, y_2, \ldots, y_N)$ and the tensor $J^{(n)}$. The sharing of data among the processors can be implemented, for example, by using communication between processors or by storing data in a shared memory.

The processor #j calculates the value of the variable $\{z_m \mid m=(j-1)L+1, (j-1)L+2, \ldots, jL\}$. Then, the processor #j updates the variable $\{y_m \mid m=(j-1)L+1, (j-1)L+2, \ldots, jL\}$, based on the calculated value of $\{z_m \mid m=(j-1)L+1, (j-1)L+2, \ldots, jL\}$.

As given by the equations above, in calculation of the vector $(z_1, z_2, \ldots, z_N)$, the product-sum operation including calculation of the product of the tensor $J^{(n)}$ and the vector $(x_1, x_2, \ldots, x_N)$ or $(s_1, s_2, \ldots, s_N)$ is necessary. The product-sum operation is a process involving the largest amount of calculation in the algorithms described above and may be a bottleneck in improvement in calculation speed. Then, in implementation of the PC cluster, the product-sum operation is distributed over Q=N/L processors and executed in parallel, thereby reducing the calculation time.

That is, the information processing device (for example, the calculation server 3) may include a plurality of processors. The action computing unit 51 may include a plurality of processors, and each of the processors in the action computing unit 51 may be configured to update some elements of the third vector. The updating unit 50 may include a plurality of processors, and each of the processors in the updating unit 50 may be configured to update some elements of the first vector and some elements of the second vector.

Figure 14:
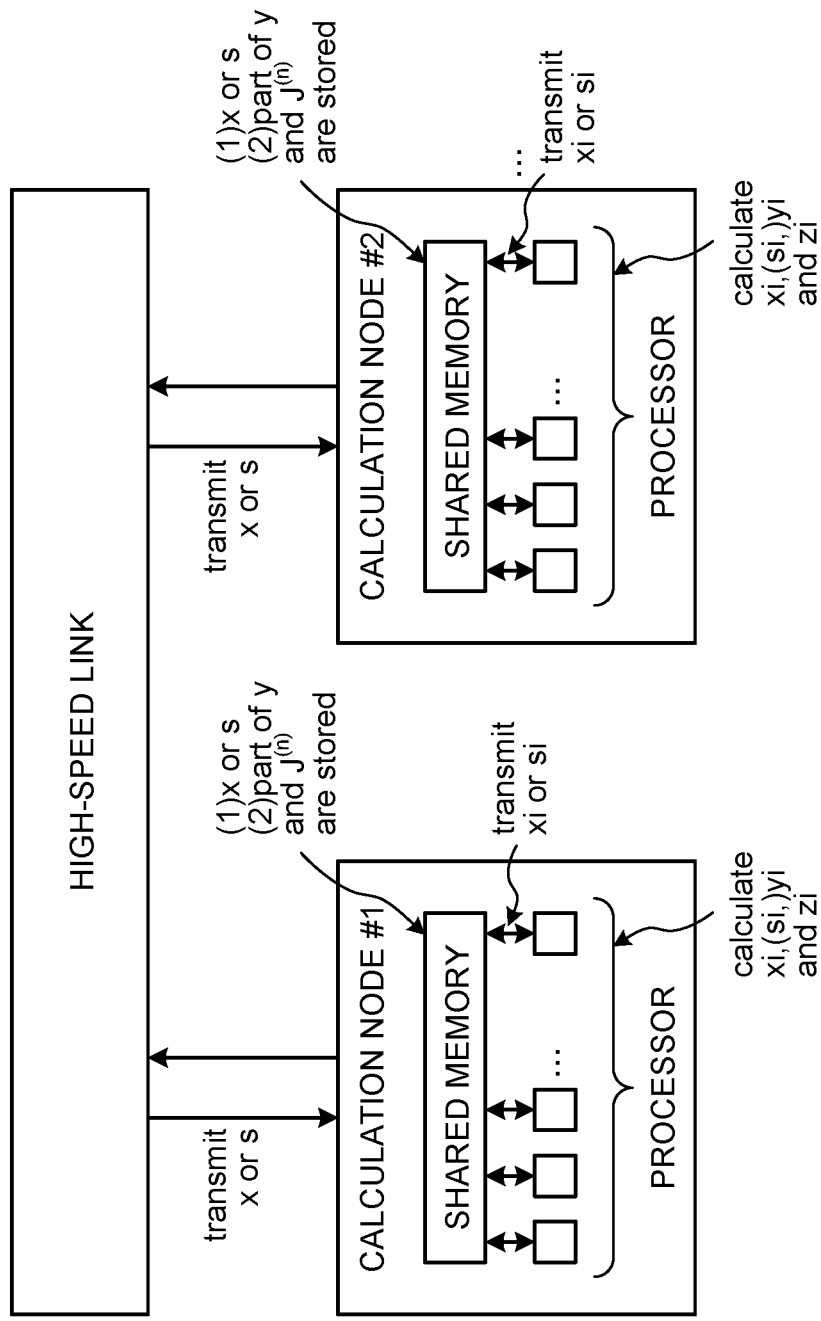
FIG. 14 is a diagram schematically illustrating an example of a multiprocessor configuration.

FIG. 14 schematically illustrates an example of a multi-processor configuration. A plurality of calculation nodes in FIG. 14 correspond to, for example, the calculation servers 3 of the information processing system 100. A high-speed link in FIG. 14 corresponds to, for example, the interconnection between the calculation servers 3 that is formed with the cables 4a to 4c and the switch 5 of the information processing system 100. A shared memory in FIG. 14 corresponds to, for example, the shared memory 32. The processors in FIG. 14 correspond to, for example, the processors 33A to 33D of each calculation server 3. Although FIG. 14 illustrates a plurality of calculation nodes, a configuration of a single calculation node may be used.

FIG. 14 illustrates data arranged at the constituent elements and data transferred between the constituent elements. In each processor, the values of the variables $x_i$, $(s_i)$, $y_i$, and $z_i$ are calculated. The variable $x_i$ or $s_i$ is transferred between the processor and the shared memory. In the shared memory of each calculation node, for example, the first vector $(x_1, x_2, \ldots, x_N)$, L variables of the second vector $(y_1, y_2, \ldots, y_N)$, and part of the tensor $J^{(n)}$ are stored. When the algorithm in Equation (11) is executed, the fourth vector $(s_1, s_2, \ldots, s_N)$ may be stored in the shared memory of each calculation node, instead of the first vector $(x_1, x_2, \ldots, x_N)$. In the high-speed link connecting the calculation nodes, for example, the first vector $(x_1, x_2, \ldots, x_N)$ is transferred. This is because when the Allgather function is used, all the elements of the first vector $(x_1, x_2, \ldots, x_N)$ are necessary to update the variables $y_i$ and $z_i$ in each processor. When the variable $z_i$ is updated according to the algorithm in Equation (11), each processor need to access all the elements of the fourth vector $(s_1, s_2, \ldots, s_N)$. In the high-speed link, therefore, the fourth vector $(s_1, s_2, \ldots, s_N)$ may be transferred.

However, the arrangement and transfer of data illustrated in FIG. 14 is only by way of example. For example, if the processors execute calculation of $\{z_m \mid m=(j-1)L+1, (j-1)L+2, \ldots, jL\}$ including the product-sum operation in parallel, the value of the variable $z_i$ may be transferred between each processor and the shared memory and between calculation nodes, and the value of the variable $y_i$ may be calculated by referring to the shared vector $(z_1, z_2, \ldots, z_N)$. In this way, the data arrangement method, the transfer method, and the parallelization implementation method in the PC cluster are not limited.

That is, the information processing device (for example, the calculation server 3) may include a shared memory accessible by a plurality of processors. In this case, the updating unit 50 can store the elements of the updated first vector or the fourth vector obtained by converting the elements of the updated first vector into binary variables, in the shared memory.

Figure 15A:
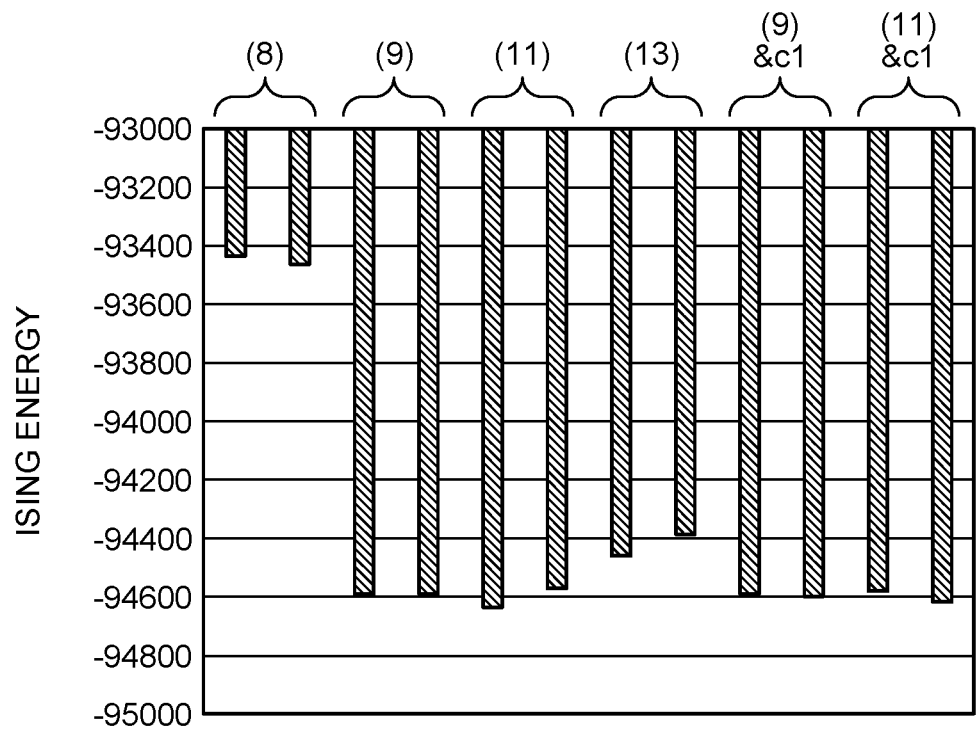
FIG. 15A is a diagram illustrating a mean value of energy when a problem was solved with a PC cluster.
Figure 15B:
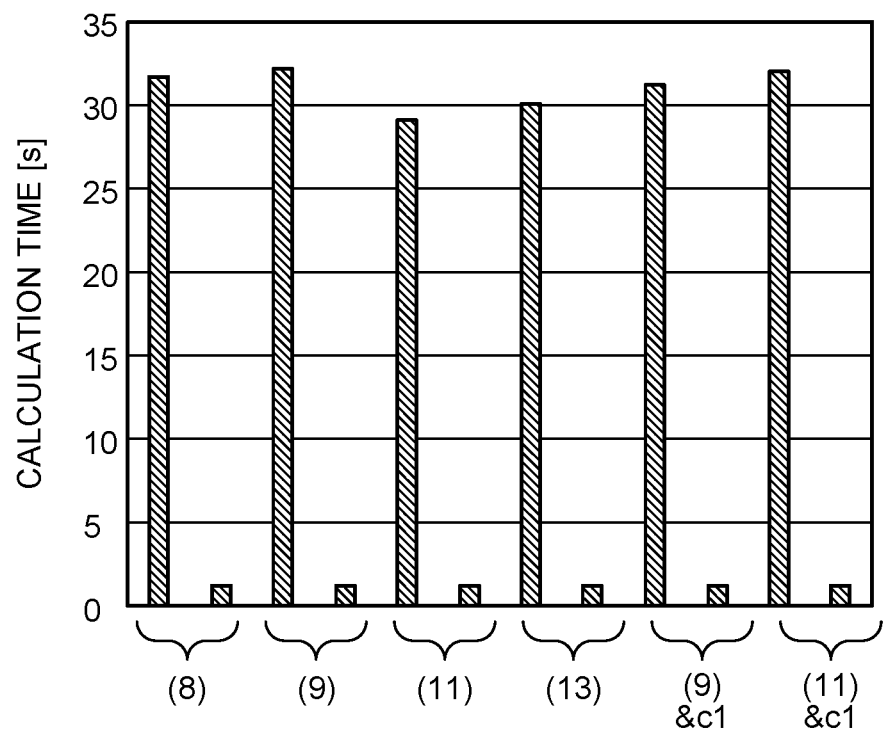
FIG. 15B is a diagram illustrating a mean value of calculation time when a problem was solved with a PC cluster.

The result obtained when the PC cluster executes the algorithms described above will now be described. FIG. 15A and FIG. 15B illustrate the result of solving a fully connected Ising problem of N=3600 (no local magnetic field) using the PC cluster. In the fully connected Ising problem in FIG. 15A and FIG. 15B, the value of each element of the matrix J of the coupling coefficients was set to a uniform random number in the range of [−1, 1]. The total number of time steps was set to 10000. FIG. 15A illustrates the mean value of the energy $E_{Ising}$ when the fully connected Ising problem was solved 10 times using each algorithm. FIG. 15B illustrates the mean value of calculation time in seconds when the fully connected Ising problem was solved 10 times using each algorithm.

The bar charts in FIG. 15A and FIG. 15B illustrate the results in the following six cases from left to right:
(i) the algorithm in Equation (8) was used;
(ii) the first algorithm in Equation (9) was used;
(iii) the second algorithm in Equation (11) was used;
(iv) the third algorithm in Equation (13) was used;
(v) the approximate value c1 was used instead of the coefficient c in the first algorithm in Equation (9); and
(vi) the approximate value c1 was used instead of the coefficient c in the second algorithm in Equation (11).

The bar charts in FIG. 15A and FIG. 15B also illustrate the results when the number of processors Q is 1 and 36 from left to right for each of the cases. In the case where the algorithm in Equation (8) was used, in the case where the first algorithm in Equation (9) was used, and in the case where the second algorithm in Equation (11) was used, a constant $0.5D\sqrt{(3/N)}$ was used as the coefficient c.

Referring to the bar chart in FIG. 15A, it can be understood that in the cases (ii) to (vi), compared with the case (i), the mean value of the energy $E_{Ising}$ is low and a solution closer to the optimal solution is likely to be obtained. Referring to the bar chart in FIG. 15B, it can be understood that the parallel calculation with a multiprocessor configuration significantly reduces the calculation time.

Implementation Example to GPUs

The calculation of the algorithms described above may be performed using a graphics processing unit (GPU). FIG. 16 schematically illustrates an example of a configuration using GPUs. FIG. 16 illustrates a plurality of GPUs connected to each other through a high-speed link. Each GPU is equipped with a plurality of cores that can access a shared memory. In the configuration example in FIG. 16, the GPUs are connected through a high-speed link to form a GPU cluster. For example, when a GPU is mounted on each calculation server 3 in FIG. 1, the high-speed link corresponds to the interconnection between the calculation servers 3 that is formed with the cables 4 (4a to 4c) and the switch 5. In the configuration example in FIG. 16, a plurality of GPUs are used, but parallel calculation can be executed even with a single GPU. That is, each GPU in FIG. 16 can execute the calculation corresponding to a calculation node in FIG. 14. That is, the processor in the information processing device (calculation server 3) may be a core of a graphic processing unit (GPU).

In the GPU, the variables $x_i$ and $y_i$, and the tensor $J^{(n)}$ can be defined as device variables. The GPU can concurrently calculate the product of the tensor $J^{(n)}$ and the first vector $(x_1, x_2, \ldots, x_N)$ or the fourth vector $(s_1, s_2, \ldots, s_N)$ necessary for updating the variable $y_i$ by the matrix-vector product function. The product of tensor and vector can be obtained by repeatedly executing product computation of matrix and vector. For the calculation of the first vector $(x_1, x_2, \ldots, x_N)$ and the part other than the product-sum operation of the second vector $(y_1, y_2, \ldots, y_N)$, each thread executes the updating process for the $i^{th}$ element $(x_i, y_i)$, thereby achieving parallelization of the process.

Figure 17A:
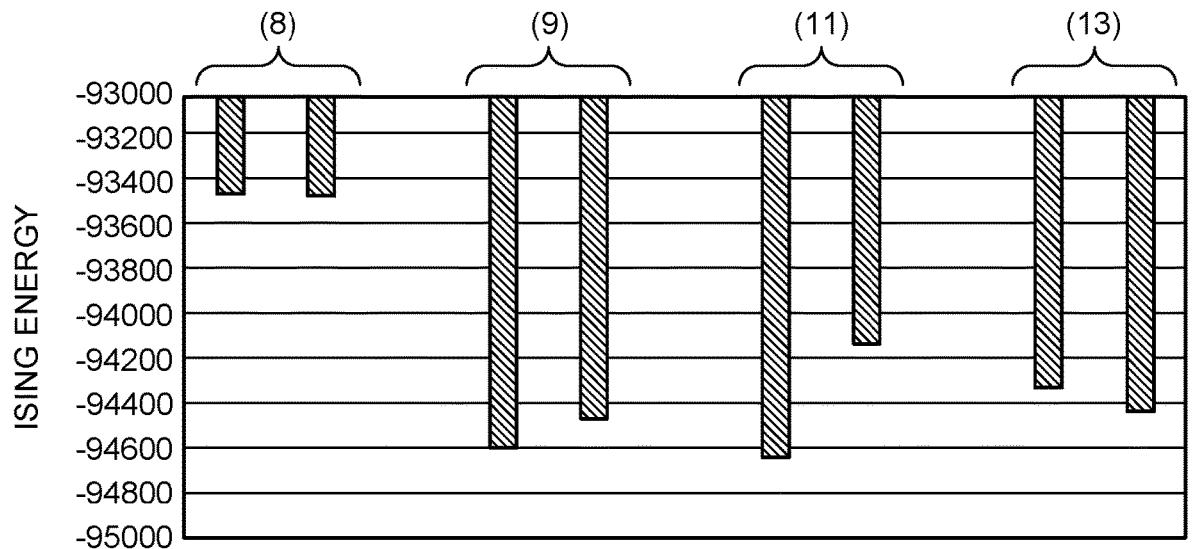
FIG. 17A is a diagram illustrating a mean value of energy when a problem was solved with GPUs.
Figure 17B:
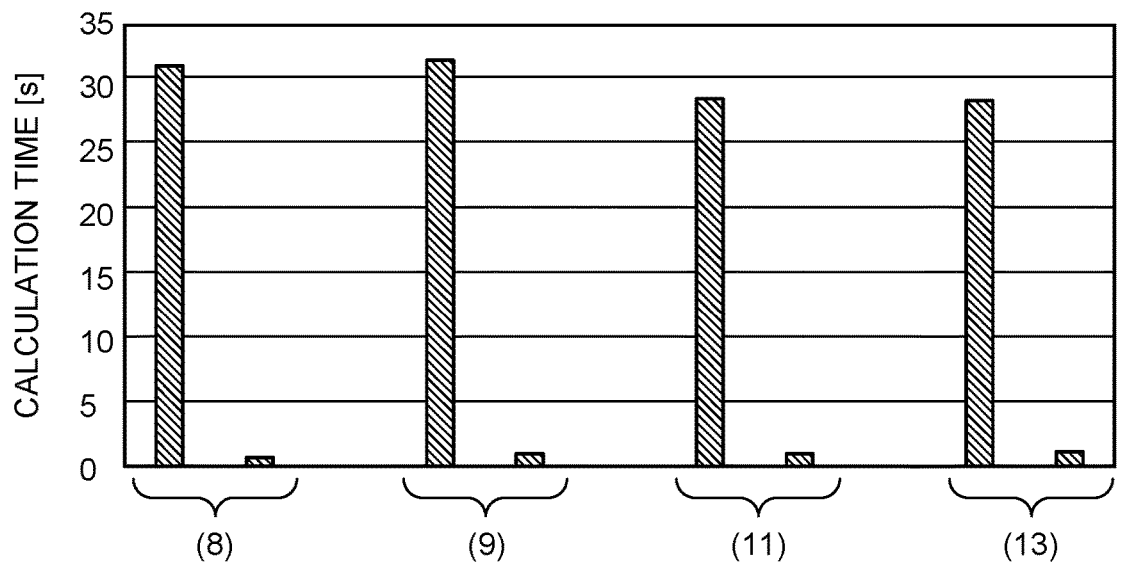
FIG. 17B is a diagram illustrating a mean value of calculation time when a problem was solved with GPUs.

FIG. 17A and FIG. 17B illustrate the result of solving the fully connected Ising problem of N=3600 using a GPU. The bar chart in FIG. 17A illustrates the mean value of the energy $E_{Ising}$ when the fully connected Ising problem was solved 10 times using each algorithm. The bar chart in FIG. 17B illustrates the mean value of calculation time in seconds when the fully connected Ising problem was solved 10 times using each algorithm.

The bar charts in FIG. 17A and FIG. 17B illustrate the following four cases from left to right: a case where the algorithm in Equation (8) was used; a case where the first algorithm in Equation (9) was used; a case where the second algorithm in Equation (11) was used; and a case where the third algorithm in Equation (13) was used. In the case where the algorithm in Equation (8) was used, in the case where the first algorithm in Equation (9) was used, and in the case where the second algorithm in Equation (11) was used, a constant $0.5D\sqrt{(3/N)}$ was used as the coefficient c. In all of the results, the total number of time steps is 10000. For each algorithm, the left side shows the result with a PC cluster with one calculation node, and the right side shows the result of using one GPU.

Referring to the bar chart in FIG. 17A, it can be understood that when the algorithms in Equation (9), Equation (11), and Equation (13) were used, compared with when the algorithm in Equation (8) was used, the mean value of the energy $E_{Ising}$ is low and a solution closer to the optimal solution is likely to be obtained. Referring to the bar chart in FIG. 17B, it can be understood that parallel calculation by a GPU can significantly reduce the calculation time, compared with the PC cluster with one calculation node. This is because the degree of parallelism of calculation with a GPU is higher than that of a common CPU.

First Example of Process Flow of First Algorithm

Figure 18:
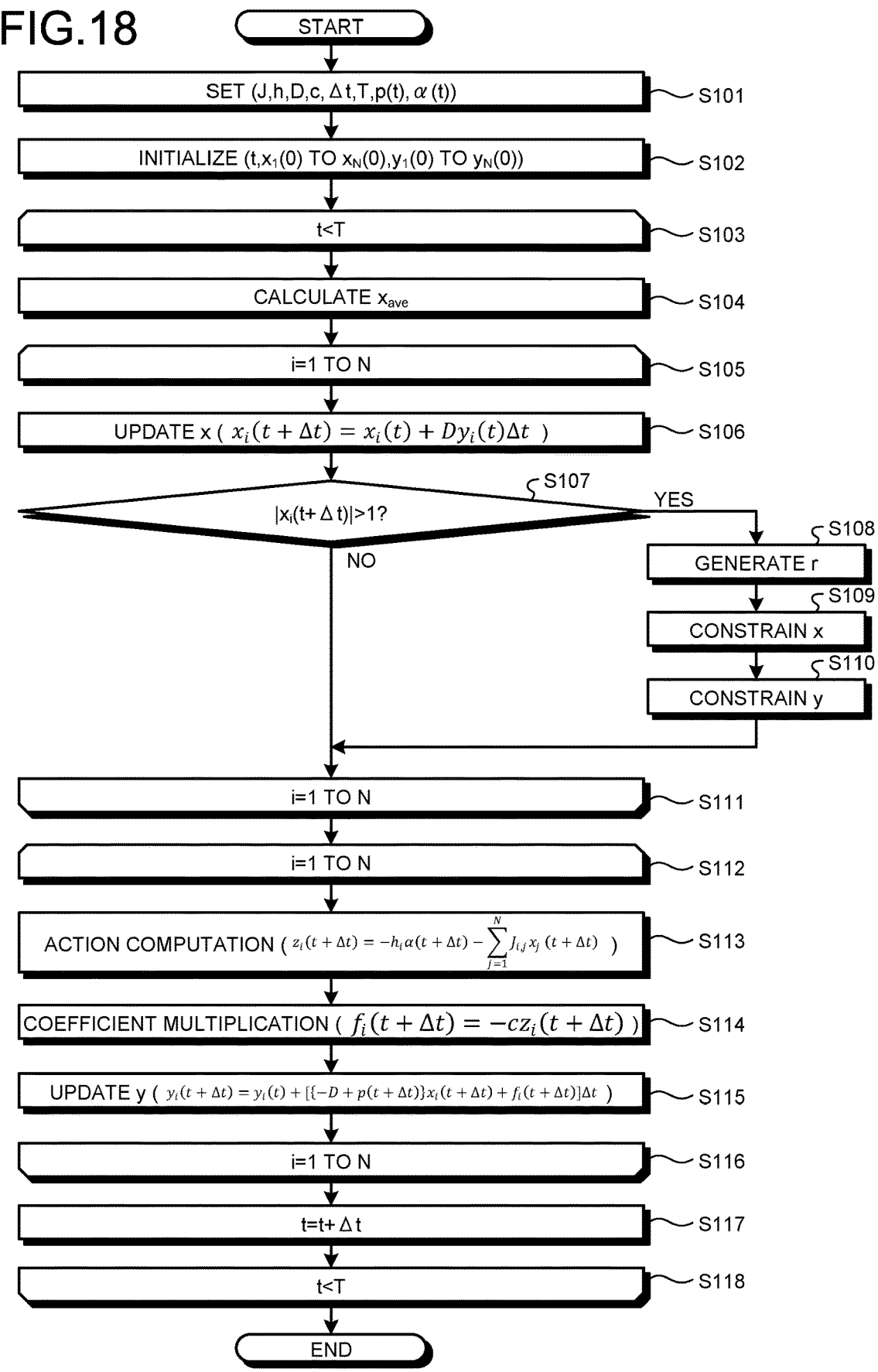
FIG. 18 is a flowchart illustrating a first example of a process when the first algorithm is executed.

FIG. 18 illustrates a first example of a process flow of the information processing system 100 when the first algorithm is executed. When an optimization problem is solved using the first algorithm given by Equation (9) and Equation (10), the information processing system 100 executes a process, for example, through the flow illustrated in FIG. 18.

First of all, at S101, the updating unit 50 sets parameters. Specifically, the updating unit 50 sets J, which is a matrix including N×N coupling coefficients, and h, which is an array including local magnetic field coefficients representing N local magnetic fields. When a HOBO problem is to be solved, the updating unit 50 sets $J^{(n)}$, which is an $n^{th}$ rank tensor including $N^n$ action coefficients, instead of J and h. In this case, n denotes the order of a variable of the objective function of the HOBO problem. The updating unit 50 further sets the coefficient D, the coefficient c, Δt denoting the unit time, T denoting the end time, the function p(t), and the function α(t), where p(t) and α(t) are the increasing function that is 0 at t=initial time (for example, 0) and 1 at t=end time (T). The updating unit 50 sets J and h in accordance with information received from a user. The updating unit 50 may set D, c, Δt, T, p(t), and α(t) in accordance with parameters received from a user or may set parameters that are determined in advance and cannot be changed.

Subsequently, at S102, the updating unit 50 initializes variables. Specifically, the updating unit 50 initializes t that is a variable denoting time to the initial time (for example, 0). Furthermore, the updating unit 50 substitutes an initial value received from the user, a predetermined fixed value, or a random number into each of N first variables ($x_1(t)$ to $x_N(t)$) and N second variables ($y_1$ to $y_N$).

Subsequently, the updating unit 50 repeats the loop process between S103 and S118 until t becomes greater than T. In one loop process, the updating unit 50 calculates N first variables ($x_1(t+\Delta t)$ to $x_N(t+\Delta t)$) at target time (t+Δt), based on N second variables ($y_1(t)$ to $y_N(t)$) at the previous time (t). In one loop process, the updating unit 50 calculates N second variables ($y_1(t+\Delta t)$ to $y_N(t+\Delta t)$) at target time (t+Δt), based on N first variables ($x_1(t)$ to $x_N(t)$) at the previous time (t).

The previous time (t) is the time a unit time (Δt) before the target time (t+Δt). That is, the updating unit 50 repeats the loop process between S103 and S118 to sequentially update N first variables ($x_1(t)$ to $x_N(t)$) and N second variables ($y_1(t)$ to $y_N(t)$) for each unit time ($\Delta t$) from the initial time (t=0) to the end time (t=T).

At S104, the updating unit 50 calculates the index value ($x_{ave}$) representing the average of magnitudes of N first variables ($x_1(t)$ to $x_N(t)$) at the previous time (t). For example, the index value ($x_{ave}$) is the root mean square or the average absolute value of N first variables ($x_1(t)$ to $x_N(t)$) at the previous time. For example, when the root mean square is calculated, the updating unit 50 executes computation given by Equation (21-1). For example, when the average absolute value is calculated, the updating unit 50 executes computation given by Equation (21-2). If the index value ($x_{ave}$) is not used at S109 described later, the updating unit 50 does not execute the process at S104.

$$x_{ave} = \sqrt{\frac{1}{N}\sum_{i=1}^{N} x^2(t)_i} \quad (21\text{-}1)$$

$$x_{ave} = \frac{1}{N}\sum_{i=1}^{N} |x(t)_i| \quad (21\text{-}2)$$

Subsequently, the updating unit 50 repeats the loop process between S105 and S111 while incrementing i by one from i=1 to i=N, where i is an integer of 1 to N and an index representing the process target of N elements. Each of N elements is associated with the first variable ($x_i(t)$) and the second variable ($y_i(t)$). In the loop process between S105 and S111, the updating unit 50 executes the process for the $i^{th}$ element of N elements as a target element.

At S106, the updating unit 50 calculates the first variable ($x_i(t+\Delta t)$) of a target element at the target time (t+$\Delta t$) by adding a value obtained by multiplying the second variable ($y_i(t)$) of the target element at the previous time (t) by the predetermined constant (D) and the unit time ($\Delta t$), to the first variable ($x_i(t)$) of the target element at the previous time (t). Specifically, the updating unit 50 calculates Equation (22).

$$x_i(t+\Delta t) = x_i(t) + D y_i(t) \Delta t \quad (22)$$

Subsequently, at S107, the updating unit 50 determines whether the absolute value ($|x_i(t+\Delta t)|$) of the first variable of the target element at the target time (t+$\Delta t$) is greater than a predetermined second value (+1). In the present example, the second value is +1. The second value is the unit amount of the first variable ($x_i(t)$) that is a continuous quantity. The updating unit 50 proceeds to S111 if the absolute value ($|x_i(t+\Delta t)|$) of the first variable of the target element at the target time (t+$\Delta t$) is equal to or smaller than the second value (No at S107). The updating unit 50 proceeds to S108 if the absolute value ($|x_i(t+\Delta t)|$) of the first variable of the target element at the target time (t+$\Delta t$) is greater than the second value.

Subsequently, at S108, the updating unit 50 generates a random number (r) that occurs with a uniform probability in a prescribed interval within a range equal to or greater than 0 and equal to or smaller than the second value (for example, +1). When a random number (r) is not used at S109 described later, the updating unit 50 does not execute the process at S108.

Subsequently, at S109, the updating unit 50 performs a constraining process for the first variable ($x_i(t+\Delta t)$) of the target element at the target time (t+$\Delta t$). Specifically, the updating unit 50 changes the first variable ($x_i(t+\Delta t)$) of the target element at the target time (t+$\Delta t$) to a value whose absolute value is equal to or greater than 0 and equal to or smaller than the second value, without changing its sign. In the present example, when the first variable ($x_i(t+\Delta t)$) of the target element at the target time (t+$\Delta t$) is smaller than −1 that is the first value (a), the updating unit 50 changes the first variable ($x_i(t+\Delta t)$) to a value equal to or greater than −1 and equal to or smaller than 0 that is a threshold value (v). Furthermore, when the first variable ($x_i(t+\Delta t)$) is greater than +1 that is the second value (b), the updating unit 50 changes the first variable ($x_i(t+\Delta t)$) to a value equal to or greater than 0 and equal to or smaller than +1.

For example, when the first variable ($x_i(t+\Delta t)$) is smaller than −1, the updating unit 50 may change the first variable ($x_i(t+\Delta t)$) to a predetermined value equal to or greater than −1 and equal to or smaller than 0 or to the random number (r) generated at S108. Furthermore, when the first variable ($x_i(t+\Delta t)$) is greater than +1, the updating unit 50 may change the first variable ($x_i(t+\Delta t)$) to a predetermined value equal to or greater than 0 and equal to or smaller than +1 or to a value obtained by subtracting the random number (r) generated at S108 from 0.

For example, when the first variable ($x_i(t+\Delta t)$) is smaller than −1, the updating unit 50 may change the first variable ($x_i(t+\Delta t)$) to a value obtained by subtracting the index value ($x_{ave}$) calculated at S104 from 0. Furthermore, when the first variable ($x_i(t+\Delta t)$) is greater than +1, the updating unit 50 may change the first variable ($x_i(t+\Delta t)$) to a value obtained by adding the index value ($x_{ave}$) to 0.

For example, when the first variable ($x_i(t+\Delta t)$) is smaller than −1, the updating unit 50 may change the first variable ($x_i(t+\Delta t)$) to a value, determined by the random number (r) calculated at S108, equal to or greater than −1 and equal to or greater than a value obtained by subtracting the index value ($x_{ave}$) from 0. Furthermore, when the first variable ($x_i(t+\Delta t)$) is greater than +1, the updating unit 50 may change the first variable ($x_i(t+\Delta t)$) to a value, determined by the random number (r) calculated at S108, equal to or greater than a value obtained by adding the index value ($x_{ave}$) to 0 and equal to or smaller than +1. In this case, the updating module calculates, for example, Equation (23).

$$x_i(t+\Delta t) = (r x_{ave} + 1 - r)\operatorname{sgn}\{x_i(t+\Delta t)\} \quad (23)$$

When the first variable ($x_i(t+\Delta t)$) is smaller than −1, the updating unit 50 may change the first variable ($x_i(t+\Delta t)$) to a value obtained by subtracting the increasing coefficient from 0. The increasing function may be changed to the increasing coefficient that increases from 0 to +1 or smaller with time from the initial time (t=0) to the end time (t=T). In this case, the updating unit 50 calculates the increasing coefficient by a linear function that is 0 at the initial time (t=0) and is the second value (for example, +1) at the end time (t=T), where time (t) is a variable, or the square root of the linear function. Furthermore, when the first variable ($x_i(t+\Delta t)$) is greater than +1, the updating unit 50 may change the first variable ($x_i(t+\Delta t)$) to a value obtained by adding the increasing coefficient to 0.

When the first variable ($x_i(t+\Delta t)$) is smaller than −1, the updating unit 50 may change the first variable ($x_i(t+\Delta t)$) to a value, determined by the random number (r) generated at S108, equal to or greater than −1 and equal to or smaller than a value obtained by adding the increasing coefficient to 0. Furthermore, when the first variable ($x_i(t+\Delta t)$) is greater than +1, the updating unit 50 may change the first variable ($x_i(t+\Delta t)$) to a value, determined by the random number (r) generated at S108, equal to or greater than a value obtained by adding the increasing coefficient to 0 and equal to or smaller than +1. In this case, the updating unit 50 calculates the first variable ($x_i(t+\Delta t)$) of the target element at the target time ($t+\Delta t$), by an equation obtained by replacing the index value ($x_{ave}$) included in Equation (23) with the increasing coefficient.

Subsequently, at S110, the updating unit 50 performs a constraining process for the second variable ($y_i(t)$) of the target element at the previous time (t). Specifically, the updating unit 50 changes the second variable ($y_i(t)$) of the target element at the previous time (t) to 0, a predetermined value, or a value in accordance with a random number. When the updating unit 50 changes to a value in accordance with a random number, for example, the updating unit 50 changes the second variable ($y_i(t)$) of the target element at the previous time (t) to a random number that occurs with a uniform probability within a predetermined range (for example, equal to or greater than −0.1 and equal to or smaller than +0.1). When S110 is finished, the updating unit 50 proceeds to S111.

The updating unit 50 executes the following process by executing the loop process between S105 and S111 as described above N times. That is, for each of N elements, the updating unit 50 updates the first variable ($x_i(t+\Delta t)$) of the target element at the target time ($t+\Delta t$), based on the second variable ($y_i(t)$) of the target element at the previous time (t). Furthermore, for each of N elements, when the absolute value ($|x_i(t+\Delta t)|$) of the first variable of the target element at the target time ($t+\Delta t$) is greater than the second value, the updating unit 50 changes the absolute value of the first variable ($x_i(t+\Delta t)$) of the target element at the target time ($t+\Delta t$) to equal to or greater than 0 and equal to or smaller than the second value, without changing its sign. Furthermore, for each of N elements, when the absolute value ($|x_i(t+\Delta t)|$) of the first variable of the target element at the target time ($t+\Delta t$) is greater than the second value, the updating unit 50 changes the second variable ($y_i(t)$) of the target element at the previous time (t) to 0, a predetermined value, or a value in accordance with a random number.

When the loop process between S105 and S111 is executed N times, the updating unit 50 proceeds to S112.

Subsequently, the updating unit 50 repeats the loop process between S112 and S116 while incrementing i by one from i=1 to i=N. In the loop process between S112 and S116, the updating unit 50 executes the process for the $i^{th}$ element of N elements as a target element.

At S113, the updating unit 50 calculates an update value ($z_i(t+\Delta t)$), based on the first variables ($x_1(t+\Delta t)$ to $x_N(t+\Delta t)$) of N elements at the target time ($t+\Delta t$) and a predetermined action coefficient for each of sets of a target element and N elements. In the case of a QUBO problem, the action coefficient is the coupling coefficient included in J and the local magnetic field coefficient included in h. In the case of a HOBO problem, the action coefficient is included in $J^{(n)}$.

In the case of a QUBO problem, the updating unit 50 calculates Equation (24).

$$z_i(t+\Delta t) = -h_i \alpha(t+\Delta t) - \sum_{j=1}^{N} J_{i,j} x_j(t+\Delta t) \quad (24)$$

In the case of a HOBO problem, the updating unit 50 calculates Equation (25).

$$z_i(t+\Delta t) = \\ J_i^{(1)} \alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t) x_k(t+\Delta t) + \ldots \quad (25)$$

Subsequently, at S114, the updating unit 50 calculates external force ($f_i(t+\Delta t)$) by multiplying the update value ($z_i(t+\Delta t)$) at the target time ($t+\Delta t$) by the coefficient (c). Specifically, the updating unit 50 calculates Equation (26).

$$f_i(t+\Delta t) = -c z_i(t+\Delta t) \quad (26)$$

Subsequently, at S115, the updating unit 50 calculates the second variable ($y_i(t+\Delta t)$) of the target element at the target time ($t+\Delta t$) by adding a value obtained by multiplying a value based on the external force ($f_i(t+\Delta t)$) and the first variable ($x_i(t+\Delta t)$) of the target element at the target time ($t+\Delta t$) by the unit time ($\Delta t$), to the second variable ($y_i(t)$) of the target element at the previous time (t). Specifically, the updating unit 50 calculates Equation (27).

$$y_i(t+\Delta t) = y_i(t) + [\{-D + p(t+\Delta t)\} x_i(t+\Delta t) + f_i(t+\Delta t)] \Delta t \quad (27)$$

The updating unit 50 executes the following process by executing the loop process between S112 and S116 as described above N times. That is, for each of N elements, the updating unit 50 updates the second variable ($y_i(t+\Delta t)$) at the target time ($t+\Delta t$), based on the first variables ($x_1(t+\Delta t)$ to $x_N(t+\Delta t)$) of N elements at the target time ($t+\Delta t$).

When the loop process between S112 and S116 is executed N times, the updating unit 50 proceeds to S117. At S117, the updating unit 50 updates the target time ($t+\Delta t$) by adding the unit time ($\Delta t$) to the previous time (t). At S118, the updating unit 50 repeats the process from S104 to S117 until t exceeds the end time (T). When t becomes greater than the end time (T), the updating unit 50 terminates this flow.

Then, for each of N elements, the updating unit 50 calculates the value of the corresponding spin, in accordance with the sign of the first variable ($x_i(T)$) at the end time (t=T). For example, when the first variable ($x_i(T)$) at the end time (t=T) has a negative sign, the updating unit 50 sets the corresponding spin to −1, and when positive, sets the corresponding spin to +1. Then, the updating unit 50 outputs the calculated values of a plurality of spins as a solution to the combinatorial optimization problem.

By executing the process in accordance with the flowchart illustrated in FIG. 18, the updating unit 50 updates, for each of N elements, the first variable ($x_i(t+\Delta t)$) and the second variable ($y_i(t+\Delta t)$) for each unit time ($\Delta t$) from the initial time (t=0) to the end time (t=T), sequentially for each unit time and alternately between the first variable ($x_i(t+\Delta t)$) and the second variable ($y_i(t+\Delta t)$). By executing the process in accordance with the flowchart in FIG. 18, the updating unit 50 calculates the first variable ($x_i(t+\Delta t)$) at the target time ($t+\Delta t$) and thereafter calculates the second variable ($y_i(t+\Delta t)$) at the target time ($t+\Delta t$), for each unit time. Thus, the updating unit 50 can calculate N first variables ($x_1(t)$ to $x_N(t)$) and N second variables ($y_1(t)$ to $y_N(t)$) at the end time (t=T) by executing computation in accordance with the first algorithm using the symplectic Euler method.

Second Example of Process Flow of First Algorithm

Figure 19:
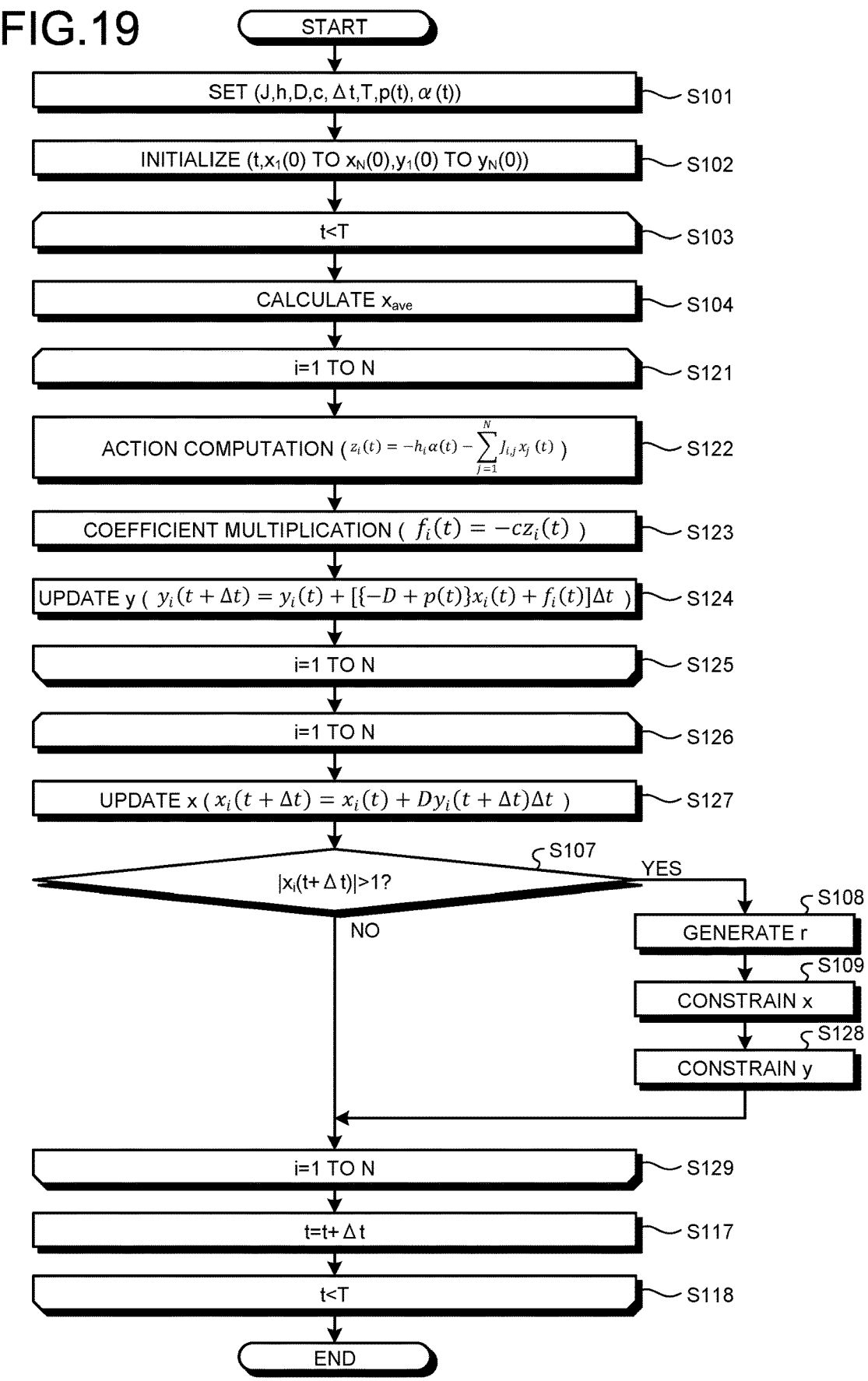
FIG. 19 is a flowchart illustrating a second example of a process when the first algorithm is executed.

FIG. 19 illustrates a second example of a process flow of the information processing system 100 when the first algorithm is executed. In the flowchart in FIG. 19, the step of the same process as the process in the flowchart illustrated in FIG. 18 is denoted by the same step number.

When an optimization problem is solved using the first algorithm given by Equation (9) and Equation (10), the information processing system 100 may execute a process, for example, through the flow illustrated in FIG. 19.

First of all, at S101 and S102, the updating unit 50 executes a process similar to that in the first example illustrated in FIG. 18. Subsequently, the updating unit 50 executes the loop process between S103 and S118, similarly to the first example illustrated in FIG. 18.

At S104, the updating unit 50 executes a process similar to that in the first example illustrated in FIG. 18. The updating unit 50 may execute the process at S104 immediately before S126.

Subsequently, the updating unit 50 repeats the loop process between S121 and S125 while incrementing i by one from i=1 to i=N. In the loop process between S121 and S125, the updating unit 50 executes the process for the $i^{th}$ element of N elements as a target element.

At S122, the updating unit 50 calculates the update value ($z_i(t)$), based on the first variables ($x_1(t)$ to $x_N(t)$) of N elements at the previous time (t) and a predetermined action coefficient for each of sets of a target element and N elements.

In the case of a QUBO problem, the updating unit 50 calculates Equation (28).

$$z_i(t) = -h_i \alpha(t) - \sum_{j=1}^{N} J_{i,j} x_j(t) \tag{28}$$

In the case of a HOBO problem, the updating unit 50 calculates Equation (29).

$$z_i(t) = J_i^{(1)} \alpha(t) + \sum_{j=1}^{N} J_{i,j}^{(2)} x_j(t) + \sum_{j=1}^{N}\sum_{k=1}^{N} J_{i,j,k}^{(3)} x_j(t) x_k(t) + \ldots \tag{29}$$

Subsequently, at S123, the updating unit 50 calculates the external force ($f_i(t)$) at the previous time (t) by multiplying the update value ($z_i(t)$) at the previous time (t) by the coefficient (c). Specifically, the updating unit 50 calculates Equation (30).

$$f_i(t) = -c z_i(t) \tag{30}$$

Subsequently, at S124, the updating unit 50 calculates the second variable ($y_i(t+\Delta t)$) of the target element at the target time ($t+\Delta t$) by adding a value obtained by multiplying a value based on the external force ($f_i(t)$) and the first variable ($x_i(t)$) of the target element at the previous time (t) by the unit time ($\Delta t$), to the second variable ($y_i(t)$) of the target element at the previous time (t). Specifically, the updating unit 50 calculates Equation (31).

$$y_i(t+\Delta t) = y_i(t) + [\{-D+p(t)\} x_i(t) + f_i(t)] \Delta t \tag{31}$$

The updating unit 50 executes the following process by executing the loop process between S121 and S125 as described above N times. That is, for each of N elements, the updating unit 50 updates the second variable ($y_i(t+\Delta t)$) at the target time ($t+\Delta t$), based on the first variables ($x_1(t)$ to $x_N(t)$) of N elements at the previous time (t).

When the loop process between S121 and S125 is executed N times, the updating unit 50 proceeds to S126.

Subsequently, the updating unit 50 repeats the loop process between S126 and S129 while incrementing i by one from i=1 to i=N. In the loop process between S126 and S129, the updating unit 50 executes the process for the $i^{th}$ element of N elements as a target element.

At S127, the updating unit 50 calculates the first variable ($x_i(t+\Delta t)$) of the target element at the target time ($t+\Delta t$) by adding a value obtained by multiplying the second variable ($y_i(t+\Delta t)$) of the target element at the target time ($t+\Delta t$) by the predetermined constant (D) and the unit time ($\Delta t$), to the first variable ($x_i(t)$) of the target element at the previous time (t). Specifically, the updating unit 50 calculates Equation (32).

$$x_i(t+\Delta t) = x_i(t) + D y_i(t+\Delta t) \Delta t \tag{32}$$

Subsequently, at S107, the updating unit 50 executes a process similar to that in the first example illustrated in FIG. 18. The updating unit 50 proceeds to S129 if the absolute value ($|x_i(t+\Delta t)|$) of the first variable of the target element at the target time ($t+\Delta t$) is equal to or smaller than the second value (No at S107). The updating unit 50 proceeds to S108 if the absolute value ($|x_i(t+\Delta t)|$) of the first variable of the target element at the target time ($t+\Delta t$) is greater than the second value.

Subsequently, at S108 and S109, the updating unit 50 executes a process similar to that in the first example illustrated in FIG. 18.

Subsequently, at S128, the updating unit 50 performs a constraining process for the second variable ($y_i(t+\Delta t)$) of the target element at the target time ($t+\Delta t$). Specifically, the updating unit 50 changes the second variable ($y_i(t+\Delta t)$) of the target element at the target time ($t+\Delta t$) to 0, a predetermined value, or a value in accordance with a random number. When changing to a value in accordance with a random number, for example, the updating unit 50 changes the second variable ($y_i(t+\Delta t)$) of the target element at the target time ($t+\Delta t$) to a random number that occurs with a uniform probability within a predetermined range (for example, equal to or greater than −0.1 and equal to or smaller than +0.1). When S128 is finished, the updating unit 50 proceeds to S129.

The updating unit 50 executes the following process by executing the loop process between S126 and S129 as described above N times. That is, for each of N elements, the updating unit 50 updates the first variable ($x_i(t+\Delta t)$) of the target element at the target time ($t+\Delta t$), based on the second variable ($y_i(t+\Delta t)$) of the target element at the target time ($t+\Delta t$). Furthermore, for each of N elements, when the absolute value ($|x_i(t+\Delta t)|$) of the first variable of the target element at the target time ($t+\Delta t$) is greater than the second value, the updating unit 50 changes the absolute value of the first variable ($x_i(t+\Delta t)$) of the target element at the target time ($t+\Delta t$) to equal to or greater than 0 and equal to or smaller than the second value, without changing its sign. Furthermore, for each of N elements, when the absolute value ($|x_i(t+\Delta t)|$) of the first variable of the target element at the target time ($t+\Delta t$) is greater than the second value, the updating unit 50 changes the second variable ($y_i(t+\Delta t)$) of the target element at the target time ($t+\Delta t$) to 0, a predetermined value, or a value in accordance with a random number.

When the loop process between S126 and S129 is executed N times, the updating unit 50 proceeds to S117. At S117, the updating unit 50 executes a process similar to that in the first example illustrated in FIG. 18. At S118, the updating unit 50 repeats the process from S104 to S117 until t exceeds the end time (T). When t becomes greater than the end time (T), the updating unit 50 terminates this flow. Then, the updating unit 50 calculates, for each of N elements, the value of the corresponding spin, in accordance with the sign of the first variable ($x_i(T)$) at the end time (t=T), and outputs the calculated values of the spins as a solution to the combinatorial optimization problem.

By executing the process in accordance with the flowchart illustrated in FIG. 19, for each of N elements, the updating unit 50 updates the first variable ($x_i(t+\Delta t)$) and the second variable ($y_i(t+\Delta t)$) for each unit time ($\Delta t$) from the initial time (t=0) to the end time (t=T), sequentially for each unit time and alternately between the first variable ($x_i(t+\Delta t)$) and the second variable ($y_i(t+\Delta t)$). By executing the process in accordance with the flowchart illustrated in FIG. 19, the updating unit 50 calculates the second variable ($y_i(t+\Delta t)$) at the target time (t+$\Delta t$) and thereafter calculates the first variable ($x_i(t+\Delta t)$) at the target time (t+$\Delta t$), for each unit time. Thus, the updating unit 50 can calculate N first variables ($x_1(t)$ to $x_N(t)$) and N second variables ($y_1(t)$ to $y_N(t)$) at the end time (t=T) by executing computation in accordance with the first algorithm using the symplectic Euler method.

First Example of Process Flow of Second Algorithm

Figure 20:
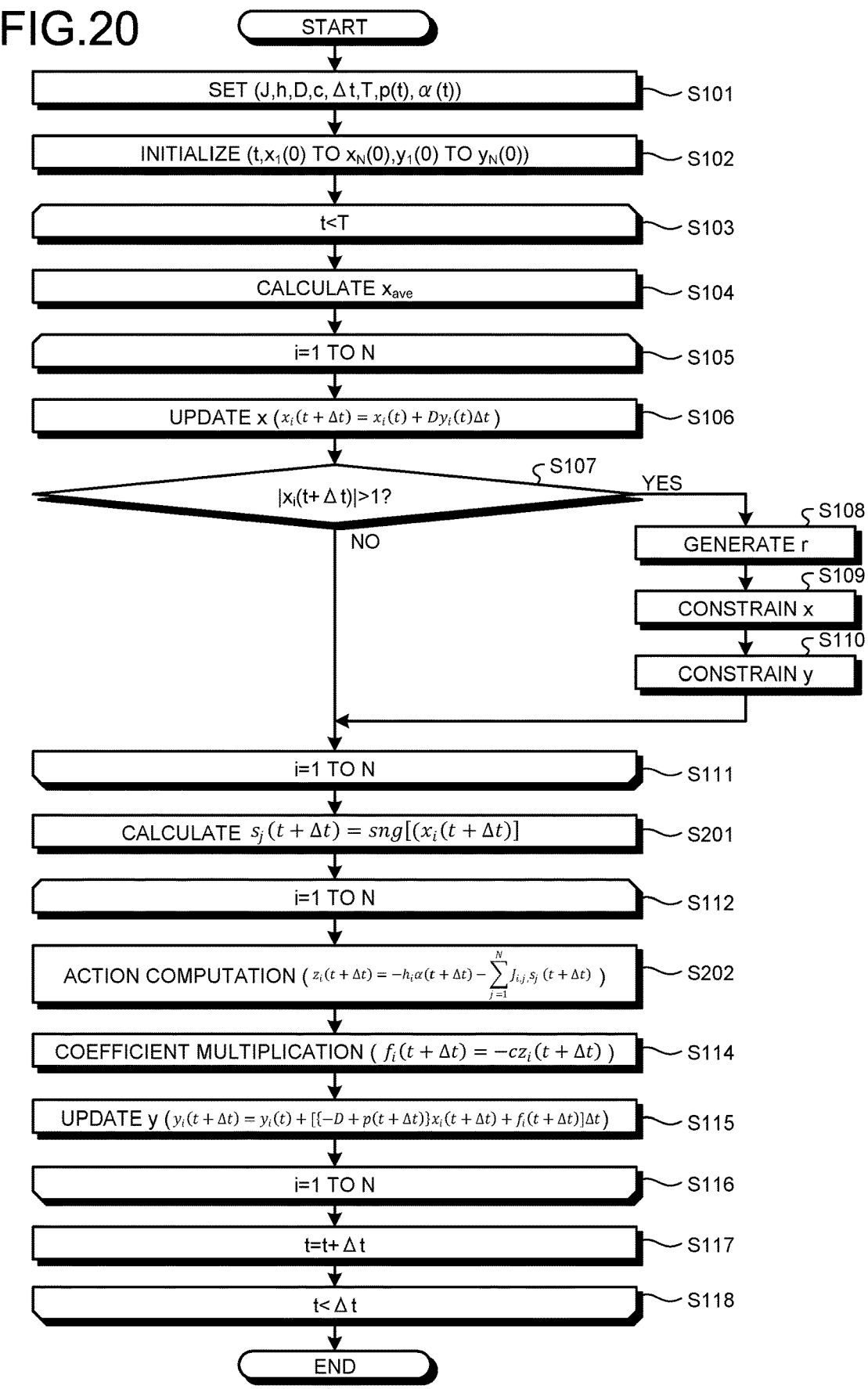
FIG. 20 is a flowchart illustrating a first example of a process when the second algorithm is executed.

FIG. 20 illustrates a first example of a process flow of the information processing system 100 when the second algorithm is executed.

When an optimization problem is solved using the second algorithm given by Equation (11) and Equation (12), the information processing system 100 executes a process, for example, through the flow illustrated in FIG. 20. In the flowchart in FIG. 20, the step of the same process as the process in the flowchart illustrated in FIG. 18 is denoted by the same step number. The differences from when the first algorithm is executed through the flow illustrated in FIG. 18 will be described below.

In the process in FIG. 20, a process at S201 is added between S111 and S112. At S201, the updating unit 50 calculates, for each of N elements, the sign ($s_j(t+\Delta t)$) of the first variable ($x_j(t+\Delta t)$) at the target time (t+$\Delta t$). Specifically, for each of j=1 to J=N, the updating unit 50 calculates Equation (33).

$$s_j(t+\Delta t)=sng[(x_j(t+\Delta t)] \qquad (33)$$

The updating unit 50 executes S202 instead of S113. At S202, the updating unit 50 calculates an update value ($z_i(t+\Delta t)$), based on the signs ($s_1(t+\Delta t)$ to $s_N(t+\Delta t)$) of the first variables of N elements at the target time (t+$\Delta t$), and a predetermined action coefficient for each of sets of a target element and N elements.

In the case of a QUBO problem, the updating unit 50 calculates Equation (34).

$$z_i(t+\Delta t) = -h_i\alpha(t+\Delta t) - \sum_{j=1}^{N} J_{i,j}s_j(t+\Delta t) \qquad (34)$$

In the case of a HOBO problem, the updating unit 50 calculates Equation (35).

$$z_i(t+\Delta t) = J_i^{(1)}\alpha(t+\Delta t) + \sum_{j=1}^{N} J_{i,j}^{(2)}s_j(t+\Delta t) + \sum_{j=1}^{N}\sum_{k=1}^{N} J_{i,j,k}^{(3)}s_j(t+\Delta t)s_k(t+\Delta t) + \ldots \qquad (35)$$

By executing the process in accordance with the flowchart illustrated in FIG. 20, the updating unit 50 can calculate N first variables ($x_1(t)$ to $x_N(t)$) and N second variables ($y_1(t)$ to $y_N(t)$) at the end time (t=T) by executing computation in accordance with the second algorithm using the symplectic Euler method.

Second Example of Process Flow of Second Algorithm

Figure 21:
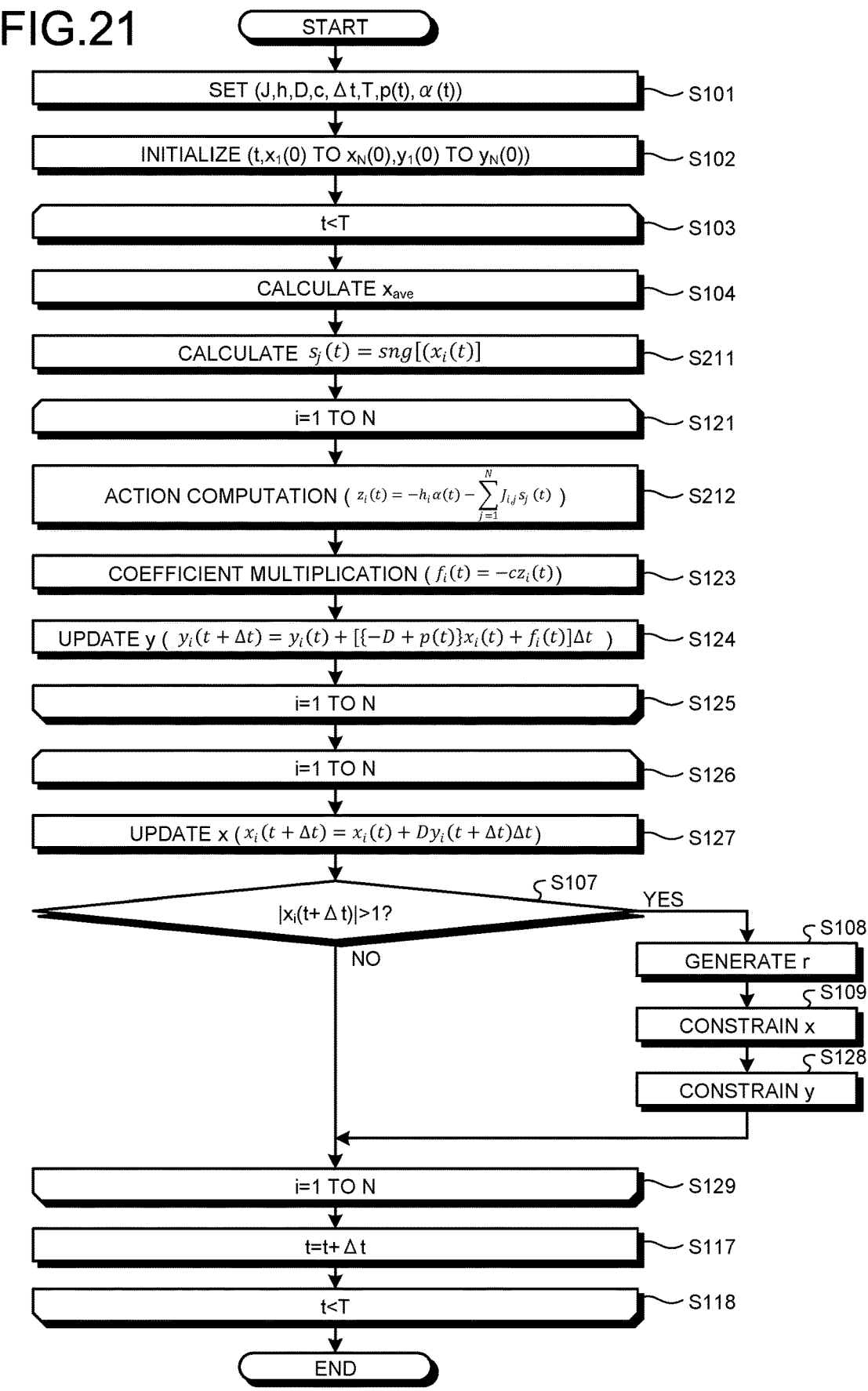
FIG. 21 is a flowchart illustrating a second example of a process when the second algorithm is executed.

FIG. 21 illustrates a second example of a process flow of the information processing system 100 when the second algorithm is executed.

When an optimization problem is solved using the second algorithm given by Equation (11) and Equation (12), the information processing system 100 also can execute a process, for example, through the flow illustrated in FIG. 21. In the flowchart in FIG. 21, the step of the same process as the process in the flowchart illustrated in FIG. 19 is denoted by the same step number. The differences from when the first algorithm is executed through the flow illustrated in FIG. 19 will be described below.

In the process in FIG. 21, a process at S211 is added before S121. S211 may be added before S104.

At S211, the updating unit 50 calculates, for each of N elements, the sign ($s_j(t)$) of the first variable ($x_j(t)$) at the previous time (t). The updating unit 50 calculates, for each of N elements, the sign ($s_j(t)$) of the first variable ($x_j(t)$) at the previous time (t) by computing Equation (36). Specifically, for each of j=1 to J=N, the updating unit 50 calculates Equation (36).

$$s_j(t)=sng[(x_j(t)] \qquad (36)$$

The updating unit 50 executes S212 instead of S122. At S212, the updating unit 50 calculates the update value ($z_i(t)$), based on the signs ($s_1(t)$ to $s_N(t)$) of the first variables of N elements at the previous time (t) and a predetermined action coefficient for each of sets of a target element and N elements.

In the case of a QUBO problem, the updating unit 50 calculates Equation (37).

$$z_i(t) = -h_i\alpha(t) - \sum_{j=1}^{N} J_{i,j}s_j(t) \qquad (37)$$

In the case of a HOBO problem, the updating unit 50 calculates Equation (38).

$$z_i(t) = J_i^{(1)}\alpha(t) + \sum_{j=1}^{N} J_{i,j}^{(2)}s_j(t) + \sum_{j=1}^{N}\sum_{k=1}^{N} J_{i,j,k}^{(3)}s_j(t)s_k(t) + \ldots \qquad (38)$$

By executing the process in accordance with the flowchart illustrated in FIG. 21, the updating unit 50 can calculate N first variables ($x_1(t)$ to $x_N(t)$) and N second variables ($y_1(t)$ to $y_N(t)$) at the end time (t=T) by executing computation in accordance with the second algorithm using the symplectic Euler method.

First Example of Process Flow of Third Algorithm

Figure 22:
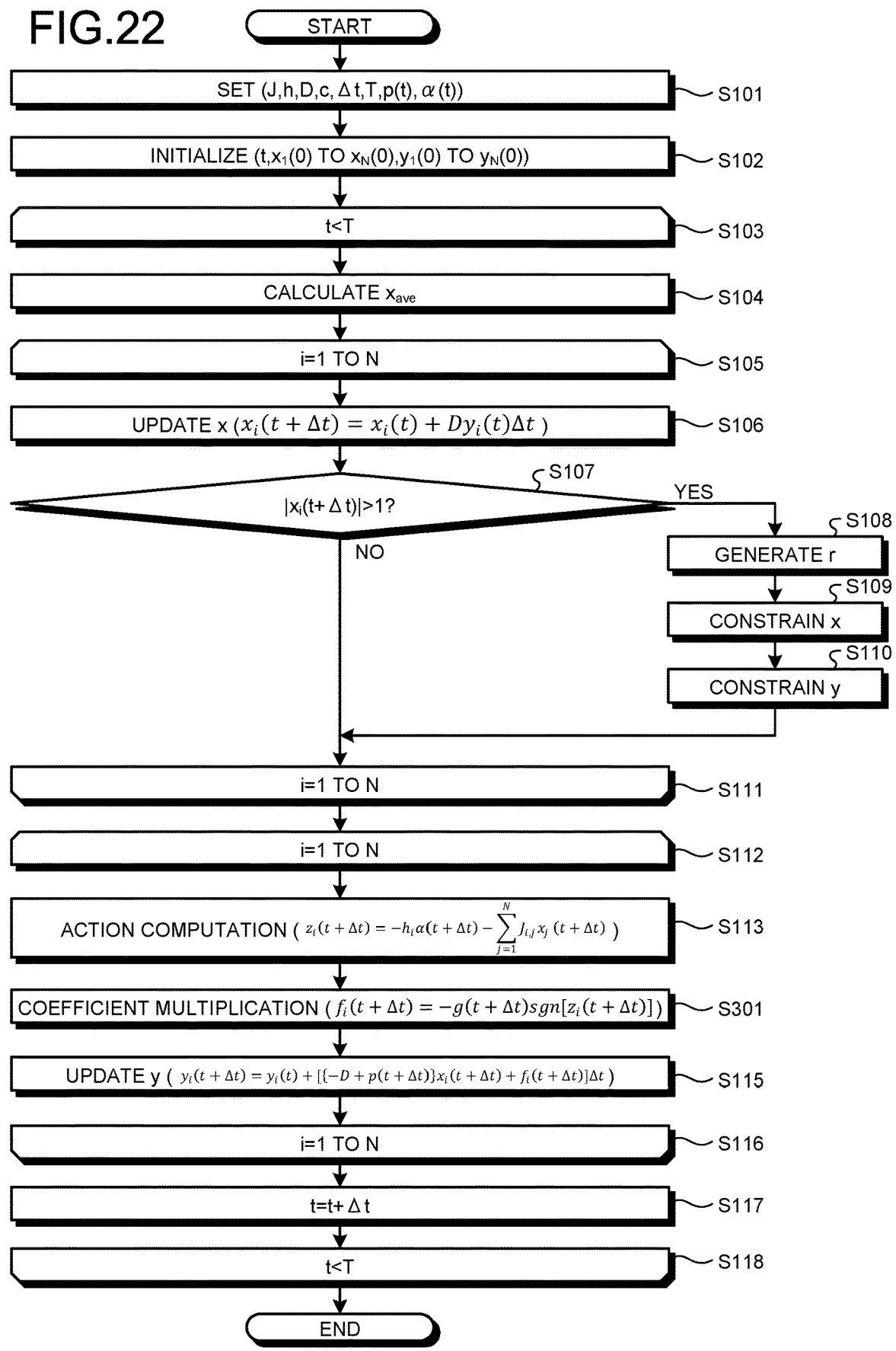
FIG. 22 is a flowchart illustrating a first example of a process when the third algorithm is executed.

FIG. 22 illustrates a first example of a process flow of the information processing system 100 when the third algorithm is executed.

When an optimization problem is solved using the third algorithm given by Equation (13) and Equation (14), the information processing system 100 executes a process, for example, through the flow illustrated in FIG. 22. In the flowchart in FIG. 22, the step of the same process as the process in the flowchart illustrated in FIG. 18 is denoted by the same step number. The differences from when the first algorithm is executed through the flow illustrated in FIG. 18 will be described below.

The updating unit 50 executes S301 instead of S114. At S301, the updating unit 50 calculates the external force ($f_i(t+\Delta t)$) at the target time ($t+\Delta t$) by multiplying the sign of the update value ($z_i(t+\Delta t)$) at the target time ($t+\Delta t$) by a coefficient determined by a predetermined function. Specifically, the updating unit 50 calculates Equation (39).

$$f_i(t+\Delta t) = -g(t+\Delta t)\mathrm{sgn}[z_i(t+\Delta t)] \tag{39}$$

Here, $g(t+\Delta t)$ is given by Equation (40).

$$g(t+\Delta t) = \{D - p(t+\Delta t)\}\sqrt{p(t+\Delta t)} \tag{40}$$

By executing the process in accordance with the flowchart illustrated in FIG. 22, the updating unit 50 can calculate N first variables ($x_1(t)$ to $x_N(t)$) and N second variables ($y_1(t)$ to $y_N(t)$) at the end time ($t=T$) by executing computation in accordance with the third algorithm using the symplectic Euler method.

Second Example of Process Flow of Third Algorithm

Figure 23:
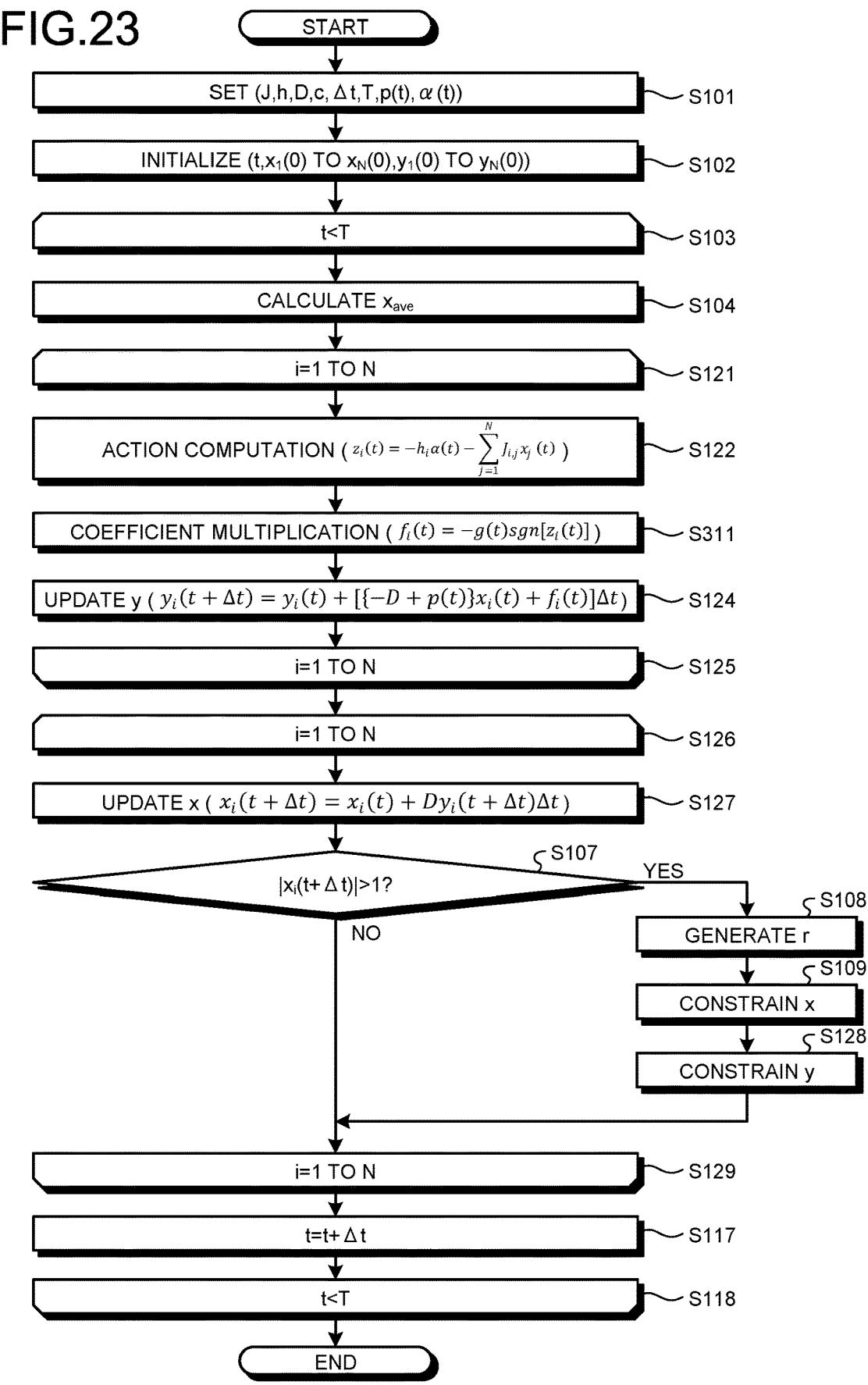
FIG. 23 is a flowchart illustrating a second example of a process when the third algorithm is executed.

FIG. 23 illustrates a second example of a process flow of the information processing system 100 when the third algorithm is executed.

When an optimization problem is solved using the third algorithm given by Equation (13) and Equation (14), the information processing system 100 also can execute a process, for example, through the flow illustrated in FIG. 23. In the flowchart in FIG. 23, the step of the same process as the process in the flowchart illustrated in FIG. 19 is denoted by the same step number. The differences from when the first algorithm is executed through the flow illustrated in FIG. 19 will be described below.

The updating unit 50 executes S311 instead of S123. At S311, the updating unit 50 calculates the external force ($f_i(t)$) at the previous time (t) by multiplying the sign of the update value ($z_i(t)$) at the previous time (t) by a coefficient determined by a predetermined function. Specifically, the updating unit 50 calculates the external force ($f_i(t)$) at the previous time (t) by computing Equation (41).

$$f_i(t) = -g(t)\mathrm{sgn}[z_i(t)] \tag{41}$$

Here, $g(t)$ is given by Equation (42).

$$g(t) = \{D - p(t)\}\sqrt{p(t)} \tag{42}$$

By executing the process in accordance with the flowchart illustrated in FIG. 23, the updating unit 50 can calculate N first variables ($x_1(t)$ to $x_N(t)$) and N second variables ($y_1(t)$ to $y_N(t)$) at the end time ($t=T$) by executing computation in accordance with the third algorithm using the symplectic Euler method.

Implementation of Circuit in Semiconductor Device

Figure 24:
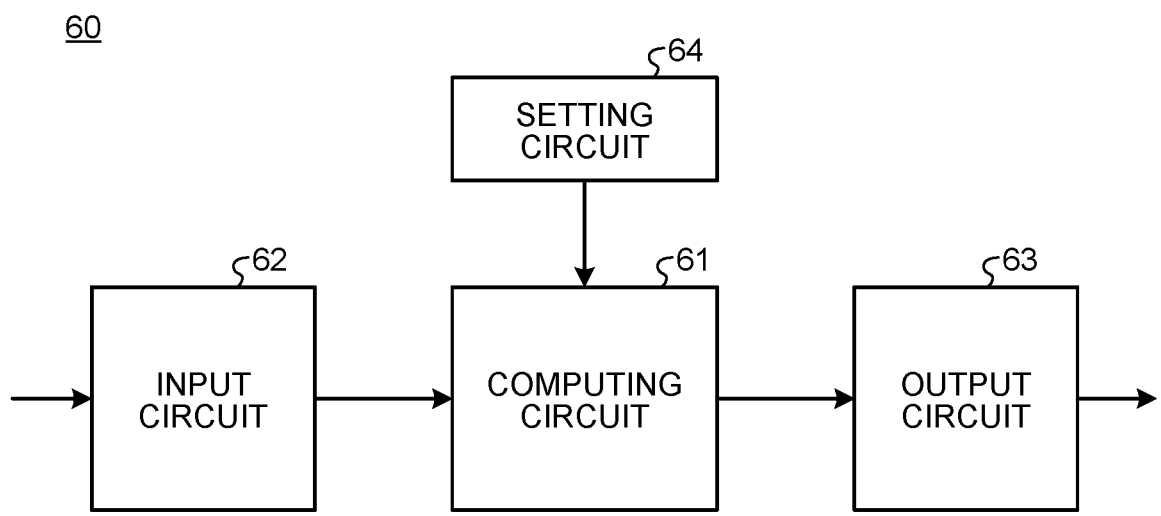
FIG. 24 is a diagram illustrating a configuration of a computing device.

FIG. 24 is a diagram illustrating a configuration of a computing device 60 that calculates a solution to a combinatorial optimization problem by executing the first algorithm in Equation (9), the second algorithm in Equation (11), or the third algorithm in Equation (13). The computing device 60 is, for example, an FPGA, a gate array, or an application-specific integrated circuit, and implemented in the form of a circuit in a semiconductor device.

The computing device 60 includes a computing circuit 61, an input circuit 62, an output circuit 63, and a setting circuit 64.

The computing circuit 61 increments t that is a parameter representing time by unit time ($\Delta t$) from the initial time (for example, 0) to the end time. The computing circuit 61 calculates the first variable ($x_i$) and the second variable ($y_i$) associated with each of N elements (virtual particles). The first variable ($x_i$) denotes the position of a corresponding element (virtual particle). The second variable ($y_i$) denotes the momentum of a corresponding element (virtual particle).

The computing circuit 61 calculates, for each unit time from the initial time to the end time, N first variables ($x_i$) and N second variables ($y_i$), sequentially for each unit time, and alternately between the first variable ($x_i$) and the second variable ($y_i$). More specifically, the computing circuit 61 executes computation represented by the algorithm of Equation (9), Equation (11), or Equation (13), for each unit time from the initial time to the end time. Then, the computing circuit 61 calculates a solution to a combinatorial optimization problem by binarizing the values of N first variables ($x_i$) (that is, the respective positions of N virtual particles) at the end time.

Prior to the computation process by the computing circuit 61, the input circuit 62 acquires the respective initial values of N first variables ($x_i$) and N second variables ($y_i$) (that is, the respective initial positions and initial momentums of a plurality of virtual particles) at the initial time and applies the acquired initial values to the computing circuit 61. After the computation process by the computing circuit 61 is finished, the output circuit 63 acquires a solution to a combinatorial optimization problem from the computing circuit 61. Then, the output circuit 63 outputs the acquired solution. Prior to the computation process by the computing circuit 61, the setting circuit 64 sets parameters for the computing circuit 61.

Computing Circuit 61 Executing Process of First Algorithm

Figure 25:
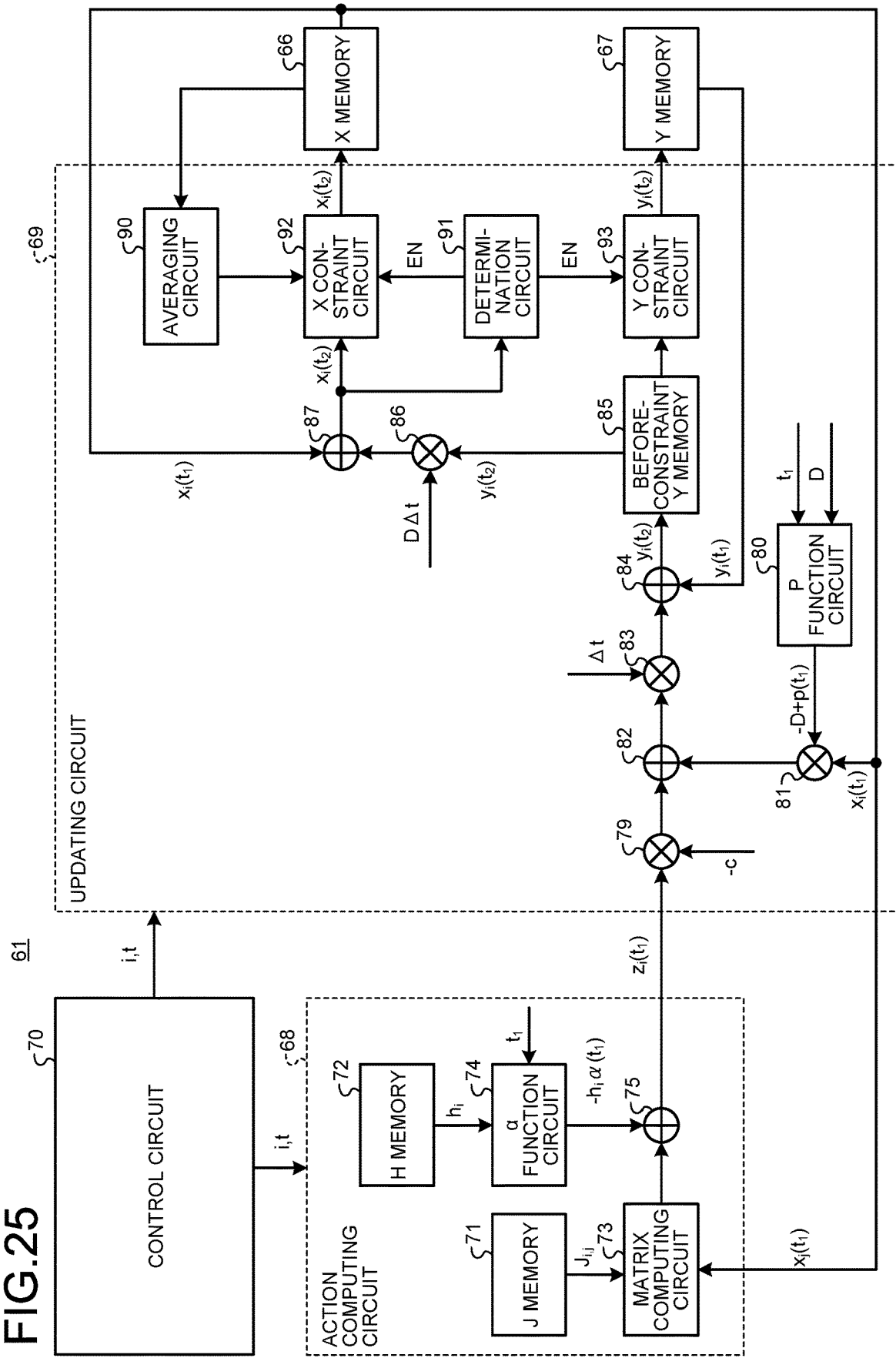
FIG. 25 is a block configuration diagram of a computing circuit that executes the first algorithm.

FIG. 25 is a diagram illustrating a block configuration of the computing circuit 61 executing the first algorithm in Equation (9). The computing circuit 61 is configured as illustrated in FIG. 25 when the first algorithm in Equation (9) is executed. In the description of FIG. 25, the previous time is denoted by $t_1$. The target time is denoted by $t_2$. This is applicable to FIG. 26 and FIG. 27.

The computing circuit 61 executing the first algorithm in Equation (9) includes an X memory 66, a Y memory 67, an action computing circuit 68, an updating circuit 69, and a control circuit 70.

The X memory 66 stores N first variables ($x_i(t_1)$) at the previous time ($t_1$). The N first variables ($x_i(t_1)$) at the previous time ($t_1$) stored in the X memory 66 are overwritten with updating of the time. That is, when N first variables ($x_i(t_2)$) at the target time ($t_2$) are calculated, the calculated N first variables ($x_i(t_2)$) at the target time ($t_2$) are written into the X memory 66 as new N first variables ($x_i(t_1)$) at the previous time ($t_1$). Prior to computation, the setting circuit 64 writes N first variables $x_i$ at the initial time into the X memory 66.

The Y memory 67 stores N second variables ($y_i(t_1)$) at the previous time ($t_1$). N second variables ($y_i(t_1)$) at the previous time ($t_1$) stored in the Y memory 67 are overwritten with updating of the time. That is, when N second variables ($y_i(t_2)$) at the target time ($t_2$) are calculated, the calculated N second variables ($y_i(t_2)$) at the target time ($t_2$) are written into the Y memory 67 as new N second variables ($y_i(t_1)$) at the previous time ($t_1$). Prior to computation, the setting circuit 64 writes N second variables $y_i$ at the initial time into the Y memory 67.

The action computing circuit 68 acquires N first variables ($x_i(t_1)$) at the previous time ($t_1$) from the X memory 66. Then, the action computing circuit 68 calculates, for each of N elements, the update value ($z_i(t_1)$) at the previous time ($t_1$).

The updating circuit 69 acquires, for each of N elements, the update value ($z_i(t_1)$) at the previous time ($t_1$) from the action computing circuit 68. Furthermore, for each of N elements, the updating circuit 69 acquires the first variable ($x_i(t_1)$) at the previous time ($t_1$) from the X memory 66 and acquires the second variable ($y_i(t_1)$) at the previous time ($t_1$) from the Y memory 67. Then, for each of N elements, the updating circuit 69 calculates the first variable ($x_i(t_2)$) at the target time ($t_2$) and overwrites the first variable ($x_i(t_1)$) at the previous time ($t_1$) stored in the X memory 66. In addition, for each of N elements, the updating circuit 69 calculates the second variable ($y_i(t_2)$) at the target time ($t_2$) and overwrites the second variable ($y_i(t_1)$) at the previous time ($t_1$) stored in the Y memory 67.

The control circuit 70 sequentially updates the target time ($t_2$) for each unit time ($\Delta t$) to allow the action computing circuit 68 and the updating circuit 69 to sequentially calculate the first variable ($x_i(t)$) and the second variable ($y_i(t)$) for each unit time ($\Delta t$).

Furthermore, the control circuit 70 generates an index (i) by incrementing from 1 to N and allows the action computing circuit 68 and the updating circuit 69 to calculate the first variable ($x_i(t_2)$) at the target time ($t_2$) and the second variable ($y_i(t_2)$) at the target time ($t_2$) corresponding to each of N elements, in the order of index. The action computing circuit 68 and the updating circuit 69 may concurrently calculate a plurality of first variables ($x_i(t_2)$) and a plurality of second variables ($y_i(t_2)$) corresponding to a plurality of indices.

The action computing circuit 68 includes a J memory 71, an H memory 72, a matrix computing circuit 73, an α function circuit 74, and a first adder circuit 75.

The J memory 71 stores an N×N matrix including (N×N) coupling coefficients. $J_{i,j}$ denotes the coupling coefficient at the $i^{th}$ row and the $j^{th}$ column included in the matrix. $J_{i,j}$ denotes the coupling coefficient of the $i^{th}$ spin and $j^{th}$ spin in the Ising model representing a combinatorial optimization problem. Prior to computation, the setting circuit 64 writes a matrix generated by a user in advance into the J memory 71.

The H memory 72 stores an array including N local magnetic field coefficients. $h_i$ denotes the $i^{th}$ local magnetic field coefficient included in the array. $h_i$ denotes a local magnetic field acting on the $i^{th}$ spin in the Ising model representing a combinatorial optimization problem. Prior to computation, the setting circuit 64 writes an array generated by a user in advance into the H memory 72.

The matrix computing circuit 73 acquires N first variables ($x_j(t_1)$) at the previous time ($t_1$) from the X memory 66. The matrix computing circuit 73 acquires, for each of N elements, N coupling coefficients $J_{i,j}$ included in a target row from the J memory 71. Then, the matrix computing circuit 73 executes, for each of N elements, a product-sum operation of N first variables ($x_j(t_1)$) at the previous time ($t_1$) and N coupling coefficients $J_{i,j}$ included in the target row.

The α function circuit 74 acquires, for each of N elements, a target local magnetic field coefficient $h_i$ from the H memory 72. The α function circuit 74 executes, for each of N elements, the computation $\{-h_i\alpha(t_1)\}$, where $\alpha(t)$ is a preset function.

The first adder circuit 75 adds, for each of N elements, the result of the product-sum operation by the matrix computing circuit 73 to the computation result by the α function circuit 74. With this computation, the first adder circuit 75 outputs, for each of N elements, the update value ($z_i(t_1)$) at the previous time ($t_1$) given by Equation (43).

$$z_i(t_1) = -h_i\alpha(t_i) - \sum_{j=1}^{N} J_{i,j} x_j(t_1) \quad (43)$$

The updating circuit 69 includes a first multiplier circuit 79, a P function circuit 80, a second multiplier circuit 81, a second adder circuit 82, a third multiplier circuit 83, a third adder circuit 84, a before-constraint Y memory 85, a fourth multiplier circuit 86, a fourth adder circuit 87, an averaging circuit 90, a determination circuit 91, an X constraint circuit 92, and a Y constraint circuit 93.

The first multiplier circuit 79 multiplies, for each of N elements, the update value ($z_i(t_1)$) at the previous time ($t_1$) by the coefficient −c. The P function circuit 80 executes, for each of N elements, computation of $\{-D+p(t_1)\}$. The second multiplier circuit 81 acquires, for each of N elements, the first variable ($x_i(t_1)$) at the previous time ($t_1$) from the X memory 66. Then, the second multiplier circuit 81 multiplies, for each of N elements, the first variable ($x_i(t_1)$) at the previous time ($t_1$) by the computation result in the P function circuit 80.

The second adder circuit 82 adds, for each of N elements, the computation result in the first multiplier circuit 79 to the computation result in the second multiplier circuit 81. The third multiplier circuit 83 multiplies the computation result in the second adder circuit 82 by the unit time $\Delta t$.

The third adder circuit 84 acquires, for each of N elements, the second variable ($y_i(t_1)$) at the previous time ($t_1$) from the Y memory 67. The third adder circuit 84 adds, for each of N elements, the second variable ($y_i(t_1)$) at the previous time ($t_1$) to the computation result in the third multiplier circuit 83. With this computation, the third adder circuit 84 outputs, for each of N elements, the second variable ($y_i(t_2)$) at the target time ($t_2$) given by Equation (44)

$$y_i(t_2)=y_i(t_1)+[\{-D+p(t_1)\}x_i(t_1)-cz_i(t_1)]\Delta t \quad (44)$$

Then, the third adder circuit 84 writes the calculated second variable ($y_i(t_2)$) at the target time ($t_2$) for each of N elements into the before-constraint Y memory 85. The before-constraint Y memory 85 stores N second variables ($y_i(t_2)$) at the target time ($t_2$) before constraint by the Y constraint circuit 93.

The fourth multiplier circuit 86 acquires, for each of N elements, the second variable ($y_i(t_2)$) before constraint at the target time ($t_2$) from the before-constraint Y memory 85. The fourth multiplier circuit 86 multiplies, for each of N elements, the second variable ($y_i(t_2)$) before constraint at the target time ($t_2$) by $\{D\Delta t\}$.

The fourth adder circuit 87 acquires, for each of N elements, the first variable ($x_i(t_1)$) at the previous time ($t_1$) from the X memory 66. The fourth adder circuit 87 adds, for each of N elements, the first variable ($x_i(t_1)$) at the previous time ($t_1$) to the computation result in the fourth multiplier circuit 86. With this computation, the fourth adder circuit 87 outputs, for each of N elements, the first variable ($x_i(t_2)$) at the previous time ($t_2$) given by Equation (45).

$$x_i(t_2)=x_i(t_1)+Dy_i(t_2)\Delta t \quad (45)$$

The averaging circuit 90 calculates the index value ($x_{ave}$) representing the average of magnitudes of N first variables ($x_1(t_1)$ to $x_N(t_1)$) at the previous time ($t_1$) stored in the X memory 66. For example, the index value ($x_{ave}$) is the root mean square or the average absolute value of N first variables ($x_1(t)$ to $x_N(t)$) at the previous time.

The determination circuit 91 determines, for each of N elements, whether the absolute value ($|x_i(t_2)|$) of the first variable at the target time ($t_2$) calculated by the fourth adder circuit 87 is greater than a predetermined second value. For example, the second value is +1. When the absolute value ($|x_i(t_2)|$) of the first variable at the target time ($t_2$) is greater than the second value, the determination circuit 91 applies an enable signal (EN) to the X constraint circuit 92 and the Y constraint circuit 93.

The X constraint circuit 92 receives, for each of N elements, the first variable ($x_i(t_2)$) at the target time ($t_2$) calculated by the fourth adder circuit 87. When an enable signal (EN) is not received from the determination circuit 91, for each of N elements, the X constraint circuit 92 writes the first variable ($x_i(t_2)$) at the target time ($t_2$) calculated by the fourth adder circuit 87 as it is into the X memory 66.

When an enable signal (EN) is received from the determination circuit 91, for each of N elements, the X constraint circuit 92 executes a constraining process for the first variable ($x_i(t_2)$) at the target time ($t_2$) calculated by the fourth adder circuit 87 and writes the first variable ($x_i(t_2)$) subjected to the constraining process into the X memory 66.

Here, as the constraining process, the X constraint circuit 92 changes, for each of N elements, the absolute value of the first variable ($x_i(t_2)$) at the target time ($t_2$) to a value equal to or greater than 0 and equal to or smaller than the second value (for example, +1), without changing its sign.

For example, for each of N elements, the X constraint circuit 92 sets the absolute value ($|x_i(t_2)|$) of the first variable to a predetermined value or a value in accordance with a random number that occurs with a uniform probability in a prescribed interval within a range equal to or greater than 0 and equal to or smaller than the second value (for example, +1). In this case, the prescribed interval may be any range as long as it falls within a range equal to or greater than 0 and equal to or smaller than the second value.

For each of N elements, the X constraint circuit 92 may change the absolute value ($|x_i(t_2)|$) of the first variable at the target time ($t_2$) to the index value calculated by the averaging circuit 90.

For each of N elements, the X constraint circuit 92 may change the absolute value ($|x_i(t_2)|$) of the first variable at the target time ($t_2$) to a value, determined by a random number, equal to or greater than the index value calculated by the averaging circuit 90 and equal to or smaller than the second value (for example, +1). In this case, the value determined by a random number is, for example, a random number that occurs with a uniform probability in a prescribed interval within a range from the index value to the second value (for example, +1) or smaller.

For each of N elements, the X constraint circuit 92 may change the absolute value ($|x_i(t_2)|$) of the first variable at the target time ($t_2$) to the increasing coefficient that increases from 0 to the second value or smaller with time from the initial time to the end time. In this case, the increasing function may be, for example, a linear function that is 0 at the initial time and is the second value at the end time, where time is a variable, or the square root of this linear function. For each of N elements, the X constraint circuit 92 may change the absolute value ($|x_i(t_2)|$) of the first variable at the target time ($t_2$) to a value, determined by a random number, equal to or greater than the increasing coefficient and equal to or smaller than the second value (for example, +1). In this case, the value determined by a random number is, for example, a random number (r) that occurs with a uniform probability between the increasing coefficient and the second value (for example, +1).

The Y constraint circuit 93 acquires, for each of N elements, the second variable ($y_i(t_2)$) at the target time ($t_2$) from the before-constraint Y memory 85. When an enable signal (EN) is not received from the determination circuit 91, for each of N elements, the Y constraint circuit 93 writes the second variable ($y_i(t_2)$) at the target time ($t_2$) acquired from the before-constraint Y memory 85 as it is into the Y memory 67.

When an enable signal (EN) is received from the determination circuit 91, for each of N elements, the Y constraint circuit 93 executes a constraining process for the second variable ($y_i(t_2)$) at the target time ($t_2$) calculated by the fourth adder circuit 87 and writes the second variable ($y_i(t_2)$) subjected to the constraining process into the Y memory 67.

Here, as the constraining process, the Y constraint circuit 93 changes, for each of N elements, the second variable ($y_i(t_2)$) at the target time ($t_2$) to a value obtained by multiplying the second variable ($y_i(t_2)$) by a random number, 0, a predetermined value, or a value in accordance with a random number. In this case, the Y constraint circuit 93 performs the process such that the changed value is a value within a prescribed range. For example, the Y constraint circuit 93 may perform the process such that the changed value falls within a range equal to or greater than −0.1 and equal to or smaller than +0.1.

As described above, the computing circuit 61 can calculate N first variables ($x_i(T)$) and N second variables ($y_i(T)$) at the end time (T) by executing the first algorithm in Equation (9). Furthermore, when the absolute value of the first variable ($x_i(t_1)$) at the target time ($t_2$) becomes greater than the second value as a result of updating, the computing circuit 61 can change the absolute value of the first variable ($x_i(t_1)$) at the target time ($t_2$) to a value equal to or greater than 0 and equal to or smaller than the second value, with its sign being kept.

The computing circuit 61 described above calculates the second variable ($y_i(t_2)$) at the target time ($t_2$) and thereafter calculates the first variable ($x_i(t_2)$) at the target time ($t_2$), for each unit time. Instead of this, the computing circuit 61 may calculate the first variable ($x_i(t_2)$) at the target time ($t_2$) and thereafter calculate the second variable ($y_i(t_2)$) at the target time ($t_2$), for each unit time.

In this case, the before-constraint Y memory 85 stores N first variables ($x_i(t_1)$) at the previous time ($t_1$) before constraint by the Y constraint circuit 93. Then, the fourth adder circuit 87 outputs, for each of N elements, the first variable ($x_i(t_2)$) at the target time ($t_2$) given by Equation (46).

$$x_i(t_2) = x_i(t_1) + Dy_i(t_1)\Delta t \qquad (46)$$

The matrix computing circuit 73 acquires N first variables ($x_i(t_2)$) at the target time ($t_2$) from the X memory 66. Then, the first adder circuit 75 outputs, for each of N elements, the update variable ($z_i(t_2)$) at the target time ($t_2$) given by Equation (47).

$$z_i(t_2) = -h_i\alpha(t_2) - \sum_{j=1}^{N} J_{i,j} x_j(t_2) \qquad (47)$$

The first multiplier circuit 79 multiplies, for each of N elements, the update value ($z_i(t_2)$) at the target time ($t_2$) by −c. The P function circuit 80 executes, for each of N elements, computation of $\{-D+p(t_2)\}$. The second multiplier circuit 81 multiplies, for each of N elements, the first variable ($x_i(t_2)$) at the target time ($t_2$) by the computation result in the P function circuit 80.

Then, the third adder circuit 84 outputs, for each of N elements, the second variable ($y_i(t_2)$) at the target time ($t_2$) given by Equation (48).

$$y_i(t_2)=y_i(t_1)+[\{-D+p(t_2)\}x_i(t_2)-cz_i(t_2)]\Delta t \qquad (48)$$

Even with such a process, the computing circuit 61 can calculate N first variables ($x_i(T)$) and N second variables ($y_i(T)$) at the end time (T) by executing the first algorithm in Equation (9). Furthermore, when the absolute value of the first variable ($x_i(t_2)$) at the target time ($t_2$) becomes greater than the second value as a result of updating, the computing circuit 61 can change the absolute value of the first variable ($x_i(t_2)$) at the target time ($t_2$) to a value equal to or greater than 0 and equal to or smaller than the second value, without its sign being kept.

Computing Circuit 61 Executing Process of Second Algorithm

Figure 26:
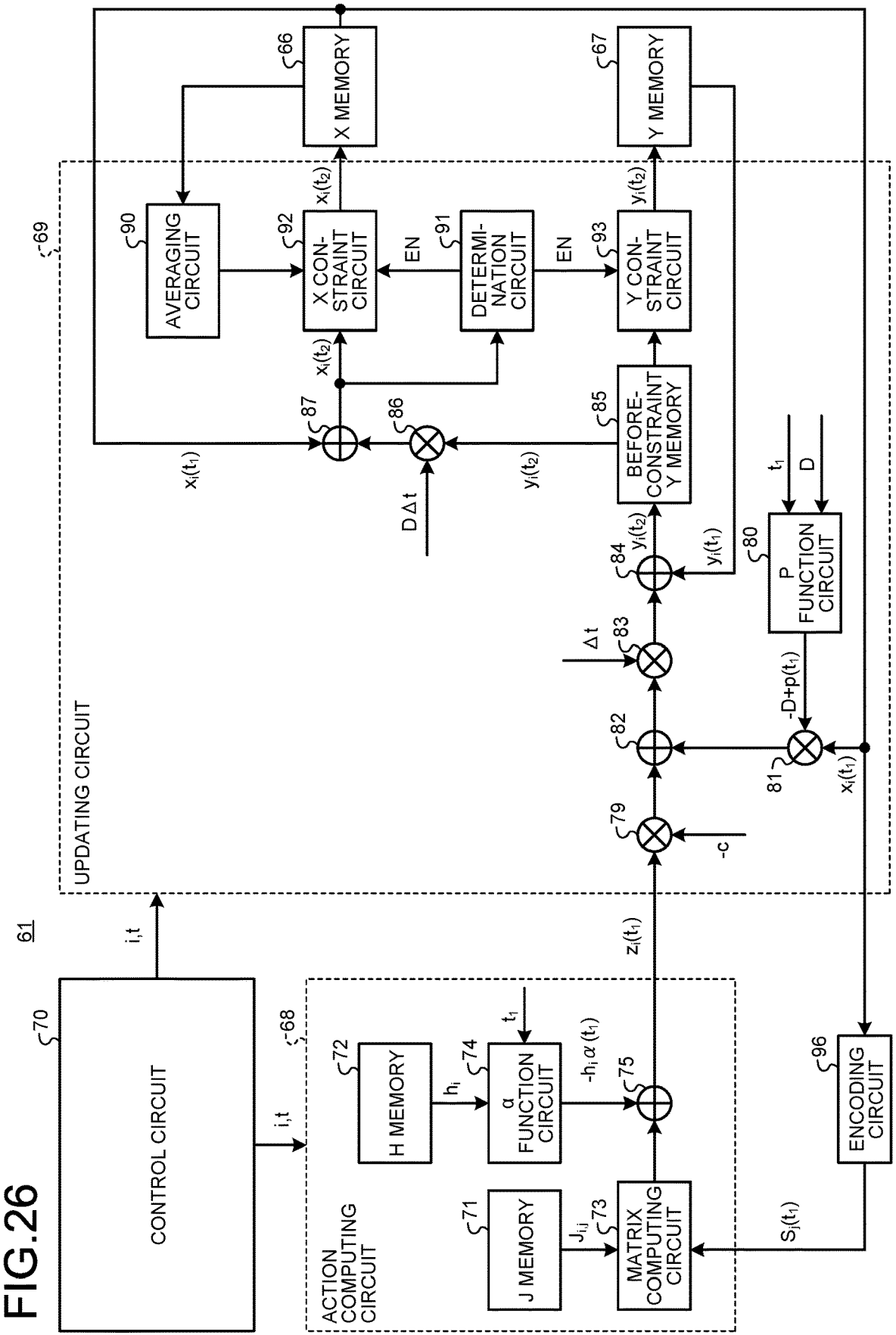
FIG. 26 is a block configuration diagram of a computing circuit that executes the second algorithm.

FIG. 26 is a diagram illustrating a block configuration of the computing circuit 61 executing the second algorithm in Equation (11). The computing circuit 61 is configured as illustrated in FIG. 25 when the second algorithm in Equation (11) is executed. The computing circuit 61 illustrated in FIG. 26 has substantially the same configuration as the configuration illustrated in FIG. 25, and a constituent element having the same function will be denoted by the same reference sign and will not be further elaborated.

The computing circuit 61 executing the second algorithm in Equation (11) differs from the configuration illustrated in FIG. 25 in that it further includes an encoding circuit 96.

The encoding circuit 96 acquires each of N first variables ($x_j(t_1)$) at the previous time ($t_1$) from the X memory 66. The encoding circuit 96 extracts the sign (−1 or +1) of each of N first variables ($x_j(t_1)$) at the previous time ($t_1$) and outputs the signs ($s_j(t_1)$) of N first variables.

The matrix computing circuit 73 acquires the signs ($s_j(t_1)$) of N first variables from the encoding circuit 96, instead of N first variables ($x_j(t_1)$) at the previous time ($t_1$). Then, the matrix computing circuit 73 executes, for each of N elements, a product-sum operation of the signs of ($s_j(t_1)$) of N first variables at the previous time ($t_1$) and N coupling coefficients $J_{i,j}$ included in the target row.

As described above, the computing circuit 61 can calculate N first variables ($x_i(T)$) and N second variables ($y_i(T)$) at the end time (T) by executing the second algorithm in Equation (11).

When the computing circuit 61 calculates the first variable ($x_i(t_2)$) at the target time ($t_2$) and thereafter calculates the second variable ($y_i(t_2)$) at the target time ($t_2$), for each unit time, the encoding circuit 96 acquires each of N first variables ($x_j(t_2)$) at the target time ($t_2$) from the X memory 66. The encoding circuit 96 extracts the sign (−1 or +1) of each of N first variables ($x_i(t_2)$) at the target time ($t_2$) and outputs the signs ($s_j(t_2)$) of N first variables. In this case, the matrix computing circuit 73 acquires the signs ($s_j(t_2)$) of N first variables from the encoding circuit 96, instead of N first variables ($x_j(t_2)$) at the target time ($t_2$). Then, the matrix computing circuit 73 executes, for each of N elements, a product-sum operation of the signs of ($s_j(t_2)$) of N first variables at the target time ($t_2$) and N coupling coefficients $J_{i,j}$ included in the target row. Even with such a process, the computing circuit 61 can calculate N first variables ($x_i(T)$) and N second variables ($y_i(T)$) at the end time (T) by executing the second algorithm in Equation (11).

Computing Circuit 61 Executing Process of Third Algorithm

Figure 27:
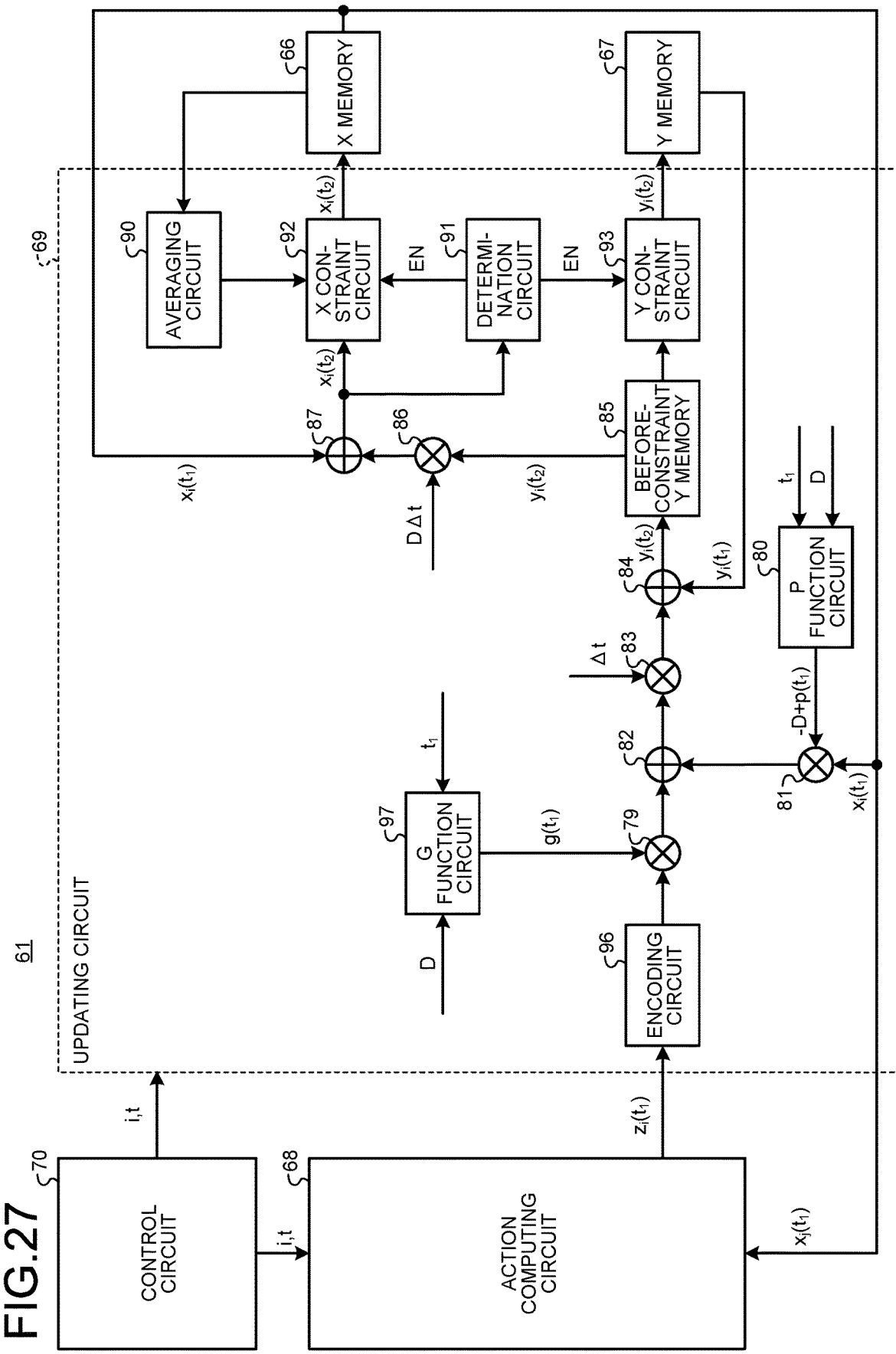
FIG. 27 is a block configuration diagram of a computing circuit that executes the third algorithm.

FIG. 27 is a diagram illustrating a block configuration of the computing circuit 61 executing the third algorithm in Equation (13). The computing circuit 61 is configured as illustrated in FIG. 27 when the third algorithm in Equation (13) is executed. The computing circuit 61 illustrated in FIG. 27 has substantially the same configuration as the configuration illustrated in FIG. 25, and a constituent element having the same function will be denoted by the same reference sign and will not be further elaborated.

The computing circuit 61 executing the third algorithm in Equation (13) differs from the configuration illustrated in FIG. 25 in internal configuration of the updating circuit 69. The updating circuit 69 executing the third algorithm in Equation (13) differs from the configuration illustrated in FIG. 25 in that it further includes an encoding circuit 96 and a G function circuit 97.

The encoding circuit 96 acquires, for each of N elements, the update value ($z_i(t_1)$) at the previous time ($t_1$) from the action computing circuit 68. The encoding circuit 96 extracts, for each of N elements, the sign (−1 or +1) from the update value ($z_i(t_1)$) at the previous time ($t_1$) and outputs the sign $\{\text{sgn}(z_i(t_1))\}$ of the update value at the previous time ($t_1$).

The G function circuit 97 executes, for each of N elements, computation of a predetermined function g(t). Specifically, the G function circuit 97 executes computation of $g(t_1)=\{D-p(t_1)\}\sqrt{(p(t_1))}$.

Then, the first multiplier circuit 79 multiplies, for each of N elements, the sign $\{\text{sgn}(z_i(t_1))\}$ of the update value at the previous time ($t_1$) output from the encoding circuit 96 by the computation result in the G function circuit 97.

As described above, the computing circuit 61 can calculate N first variables ($x_i(T)$) and N second variables ($y_i(T)$) at the end time (T) by executing the third algorithm in Equation (13).

When the computing circuit 61 calculates the first variable ($x_i(t_2)$) at the target time ($t_2$) and thereafter calculates the second variable ($y_i(t_2)$) at the target time ($t_2$), for each unit time, the encoding circuit 96 acquires the update value ($z_i(t_2)$) at the target time ($t_2$) from the action computing circuit 68. The encoding circuit 96 extracts, for each of N elements, the sign (−1 or +1) from the update value ($z_i(t_2)$) at the target time ($t_2$) and outputs the sign $\{\text{sgn}(z_i(t_2))\}$ of the updated value at the target time ($t_2$). In this case, the G function circuit 97 executes, for each of N elements, computation of $g(t_2)=\{D-p(t_2)\}\sqrt{(p(t_2))}$. Then, the first multiplier circuit 79 multiplies, for each of N elements, the sign $\{\text{sgn}(z_i(t_2))\}$ of the update value at the target time ($t_2$) output from the encoding circuit 96 by the computation result in the G function circuit 97.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation device configured to solve a combinatorial optimization problem, the calculation device comprising:
    a computing circuit comprising:
       a first memory and a second memory storing a plurality of elements, wherein elements of the plurality of elements stored in the first memory are associated with a first variable and elements of the plurality of elements stored in the second memory are associated with a second variable; and an updating circuit comprising a first adder, a second adder, a first constraint circuit, a second constraint circuit, and a determination circuit, the updating circuit being coupled to the first memory and the second memory, and configured to update, for the plurality of elements each associated with the first variable and the second variable, the first variable and the second variable for each of unit times from an initial time to an end time, sequentially for the unit times and alternately between the first variable and the second variable; and an output circuit configured to output a solution to the combinatorial optimization problem that is calculated based on the elements associated with the first variable at the end time, wherein the plurality of elements correspond to a plurality of discrete variables representing the combinatorial optimization problem, the first variable and the second variable are represented by a real number, in a calculation process for each of the unit times, for each of the plurality of elements:

the first memory outputs the first variable to the first adder to update the first variable based on the second variable;

the second memory outputs the second variable to the second adder to update the second variable based on the first variable;

when the first variable is smaller than a predetermined first value, the determination circuit applies a first enable signal to the first constraint circuit, and the first constraint circuit changes the first variable to a value equal to or greater than the predetermined first value and equal to or smaller than a predetermined threshold value in response to the first enable signal; and when the first variable is greater than a predetermined second value, the determination circuit applies a second enable signal to the first constraint circuit, and the first constraint circuit changes the first variable to a value equal to or greater than the threshold value and equal to or smaller than the predetermined second value in response to the second enable signal, the predetermined second value is greater than the predetermined first value, and the threshold value is greater than the predetermined first value and smaller than the predetermined second value.

2. The device according to claim 1, wherein
the updating circuit is configured to:
calculate, for each of the plurality of elements at the end time, a value of a discrete variable by binarizing the first variable by the threshold value; and
the output circuit is configured to:
output the calculated values of a plurality of the discrete variables as the solution to the combinatorial optimization problem.

3. The device according to claim 1, wherein
in the calculation process for each of the unit times, the updating circuit is configured to:
for each of the plurality of elements,
when the first variable is smaller than the predetermined first value, change the first variable to a predetermined value equal to or greater than the predetermined first value and equal to or smaller than the threshold value, or a value according to a random number that occurs with a uniform probability in a predetermined interval within a range equal to or greater than the predetermined first value and equal to or smaller than the threshold value; and
when the first variable is greater than the predetermined second value, change the first variable to a predetermined value equal to or greater than the threshold value and equal to or smaller than the predetermined second value, or a value according to a random number that occurs with a uniform probability in a predetermined interval within a range equal to or greater than the threshold value and equal to or smaller than the predetermined second value.

4. The device according to claim 1, wherein
in the calculation process for each of the unit times, the updating circuit is configured to:
for each of the plurality of elements,
when the first variable is smaller than the predetermined first value, change the first variable to a value obtained by subtracting an index value from the threshold value; and
when the first variable is greater than the predetermined second value, change the first variable to a value obtained by adding the index value to the threshold value, and
the index value represents an average for magnitudes of deviations of the elements associated with the first variable from the threshold value.

5. The device according to claim 1, wherein
in the calculation process for each of the unit times, the updating circuit is configured to:
for each of the plurality of elements,
when the first variable is smaller than the predetermined first value, change the first variable to a value determined by a random number, equal to or greater than the predetermined first value and equal to or greater than a value obtained by subtracting an index value from the threshold; and
when the first variable is greater than the predetermined second value, change the first variable to a value determined by a random number, equal to or greater than a value obtained by adding the index value to the threshold value and equal to or smaller than the predetermined second value, and
the index value represents an average for magnitudes of deviations of the elements associated with the first variable from the threshold value.

6. The device according to claim 4, wherein the index value is a root mean square or an average absolute value of the deviations of the elements associated with the first variable from the threshold value.

7. The device according to claim 1, wherein
in the calculation process for each of the unit times, the updating circuit is configured to:
for each of the plurality of elements,
when the first variable is smaller than the predetermined first value, change the first variable to a value obtained by subtracting an increasing coefficient from the threshold value; and when the first variable is greater than the predetermined second value, change the first variable to a value obtained by adding the increasing coefficient to the threshold value, and the increasing coefficient is zero at the initial time and increases with time from the initial time to the end time.

8. The device according to claim 1, wherein
in the calculation process for each of the unit times, the updating circuit is configured to:
for each of the plurality of elements,
when the first variable is smaller than the predetermined first value, change the first variable to a value determined by a random number, equal to or greater than the predetermined first value and equal to or smaller than a value obtained by adding an increasing coefficient to the threshold value; and
when the first variable is greater than the predetermined second value, change the first variable to a value determined by a random number, equal to or greater than a value obtained by adding the increasing coefficient to the threshold value and equal to or smaller than the predetermined second value, and
the increasing coefficient is zero at the initial time and increases with time from the initial time to the end time.

9. The device according to claim 7, wherein the increasing coefficient is a linear function that is 0 at the initial time and is the predetermined second value at the end time, where time is a variable, or a square root of the linear function.

10. The device according to claim 1, wherein
in the calculation process for each of the unit times,
for each of the plurality of elements, when the first variable is greater than the predetermined second value or when the first variable is smaller than the predetermined first value, the updating circuit is configured to change the second variable to a value obtained by multiplying the second variable by a random number, 0, a predetermined value, or a value according to a random number.

11. The device according to claim 1, wherein
in the calculation process for each of the unit times,
for each of the plurality of elements, the updating circuit is configured to calculate the first variable at target time by adding a value obtained by multiplying the second variable, a predetermined constant, and the unit time together, to the first variable at a previous time the unit time before the target time.

12. The device according to claim 11, wherein
in the calculation process for each of the unit times, the updating circuit is configured to:
for each of the plurality of elements,
calculate an external force, based on the first variable of each of the plurality of elements and an action coefficient for each of sets of a target element and the plurality of elements; and
calculate the second variable at the target time by adding a value obtained by multiplying a value determined by the external force and the first variable by the unit time, to the second variable at the previous time.

13. The device according to claim 12, wherein
in the calculation process for each of the unit times, the updating circuit is configured to:
for each of the plurality of elements,
calculate the first variable at the target time by adding a value obtained by multiplying the second variable at the previous time, the predetermined constant, and the unit time together, to the first variable at the previous time;
calculate the external force, based on the first variable of each of the plurality of elements at the target time and the action coefficient; and
calculate the second variable at the target time by adding a value obtained by multiplying a value determined by the external force and the first variable at the target time by the unit time, to the second variable at the previous time.

14. The device according to claim 12, wherein
in the calculation process for each of the unit times, the updating circuit is configured to:
for each of the plurality of elements,
calculate the external force, based on the first variable of each of the plurality of elements at the previous time and the action coefficient;
calculate the second variable at the target time by adding a value obtained by multiplying a value determined by the external force and the first variable at the previous time by the unit time, to the second variable at the previous time; and
calculate the first variable at the target time by adding a value obtained by multiplying the second variable at the target time, the predetermined constant, and the unit time together, to the first variable at the previous time.

15. The device according to claim 12, wherein
the combinatorial optimization problem includes N discrete variables, and
the updating circuit configured to calculate the first variable at the target time for an $i^{th}$ element corresponding to an $i^{th}$ discrete variable among the N discrete variables, by Equation (101) or (102), $$x_i(t+\Delta t)=x_i(t)+Dy_i(t)\Delta t \qquad (101)$$

$$x_i(t+\Delta t)=x_i(t)+Dy_i(t+\Delta t)\Delta t \qquad (102)$$

where
N is an integer equal to or greater than 2,
i is any integer from 1 to N,
D is the predetermined constant,
$\Delta t$ is the unit time,
t is the previous time,
$t+\Delta t$ is the target time,
$x_i(t)$ is the first variable of the $i^{th}$ element at the previous time,
$y_i(t)$ is the second variable of the $i^{th}$ element at the previous time,
$x_i(t+\Delta t)$ is the first variable of the $i^{th}$ element at the target time, and
$y_i(t+\Delta t)$ is the second variable of the $i^{th}$ element at the target time.

16. The device according to claim 15, wherein
the combinatorial optimization problem is a quadratic unconstrained binary optimization (QUBO) problem, and
the updating circuit is configured to calculate the second variable of the $i^{th}$ element at the target time by Equation (103) or Equation (104), $$y_i(t+\Delta t)=y_i(t)+[\{-D+p(t+\Delta t)\}x_i(t+\Delta t)+f_i(t+\Delta t)]\Delta t \qquad (103)$$

$$y_i(t+\Delta t)=y_i(t)+[\{-D+p(t)\}x_i(t)+f_i(t)]\Delta t \qquad (104)$$

where
f_i(t+Δt) is given by Equation (105), and f_i(t) is given by Equation (106), $$f_i(t+\Delta t)=-cz_i(t+\Delta t) \quad (105)$$

$$f_i(t)=-cz_i(t) \quad (106)$$

where
$z_i(t+\Delta t)$ is given by Equation (107),
$z_i(t)$ is given by Equation (108), $$z_i(t + \Delta t) = -h_i\alpha(t + \Delta t) - \sum_{j=1}^{N} J_{i,j}x_j(t + \Delta t) \quad (107)$$

$$z_i(t) = -h_i\alpha(t) - \sum_{j=1}^{N} J_{i,j}x_j(t) \quad (108)$$

where
j is any integer from 1 to N,
$h_i$ is an $i^{th}$ local magnetic field coefficient included in a predetermined array including N local magnetic field coefficients,
$J_{i,j}$ is a coupling coefficient at an $i^{th}$ row and a $j^{th}$ column included in a predetermined matrix including N×N coupling coefficients,
c is a coefficient,
$x_j(t)$ is the first variable at the previous time for a $j^{th}$ element corresponding to a $j^{th}$ discrete variable among the N discrete variables,
$x_j(t+\Delta t)$ is the first variable of the $j^{th}$ element at the target time,
p(t) is a predetermined function with t as a variable, in which p(t) increases as t increases, becomes 0 with t at the initial time, and becomes 1 with t at the end time, and
α(t) is a predetermined function with t as a variable.

17. The device according to claim 15, wherein
the combinatorial optimization problem is a quadratic unconstrained binary optimization (QUBO) problem, and
the updating circuit is configured to calculate the second variable of the $i^{th}$ element at the target time by Equation (103) or Equation (104), $$y_i(t+\Delta t)=y_i(t)+[\{-D+p(t+\Delta t)\}x_i(t+\Delta t)+f_i(t+\Delta t)]\Delta t \quad (103)$$

$$y_i(t+\Delta t)=y_i(t)+[\{-D+p(t)\}x_i(t)+f_i(t)]\Delta t \quad (104)$$

where
$f_i(t+\Delta t)$ is given by Equation (105), and $f_i(t)$ is given by Equation (106), $$f_i(t+\Delta t)=-cz_i(t+\Delta t) \quad (105)$$

$$f_i(t)=-cz_i(t) \quad (106)$$

where
$z_i(t+\Delta t)$ is given by Equation (109), and
$z_i(t)$ is given by Equation (110), $$z_i(t + \Delta t) = -h_i\alpha(t + \Delta t) - \sum_{j=1}^{N} J_{i,j}s_j(t + \Delta t) \quad (109)$$

$$z_i(t) = -h_i\alpha(t) - \sum_{j=1}^{N} J_{i,j}s_j(t) \quad (110)$$

where
j is any integer from 1 to N,
$h_i$ is an $i^{th}$ local magnetic field coefficient included in a predetermined array including N local magnetic field coefficients,
$J_{i,j}$ is a coupling coefficient at an $i^{th}$ row and a $j^{th}$ column included in a predetermined matrix including N×N coupling coefficients,
c is a coefficient,
p(t) is a predetermined function with t as a variable, in which p(t) increases as t increases, becomes 0 with t at the initial time, and becomes 1 with t at the end time,
α(t) is a predetermined function with t as a variable,
$s_j(t+\Delta t)$ is a sign of the first variable of the $j^{th}$ element at the target time, and
$s_j(t)$ is a sign of the first variable of the $j^{th}$ element at the previous time.

18. The device according to claim 15, wherein
the combinatorial optimization problem is a quadratic unconstrained binary optimization (QUBO) problem, and
the updating circuit is configured to calculate the second variable of the $i^{th}$ element at the target time by Equation (103) or Equation (104), $$y_i(t+\Delta t)=y_i(t)+[\{-D+p(t+\Delta t)\}x_i(t+\Delta t)+f_i(t+\Delta t)]\Delta t \quad (103)$$

$$y_i(t+\Delta t)=y_i(t)+[\{-D+p(t)\}x_i(t)+f_i(t)]\Delta t \quad (104)$$

where
$f_i(t+\Delta t)$ is given by Equation (111),
$f_i(t)$ is given by Equation (112), $$f_i(t+\Delta t)=-g(t+\Delta t)\text{sgn}[z_i(t+\Delta t)] \quad (111)$$

$$f_i(t)=-g(t)\text{sgn}[z_i(t)] \quad (112)$$

where
$g(t+\Delta t)$ is given by Equation (113), and $g(t)$ is given by Equation (114), $$g(t+\Delta t)=\{D-p(t+\Delta t)\}\sqrt{p(t+\Delta t)} \quad (113)$$

$$g(t)=\{D-p(t)\}\sqrt{p(t)} \quad (114)$$

where
$\text{sgn}(z_i(t+\Delta t))$ denotes a sign of $z_i(t+\Delta t)$,
$\text{sgn}(z_i(t))$ denotes a sign of $z_i(t)$,
$z_i(t+\Delta t)$ is given by Equation (115), and
$z_i(t)$ is given by Equation (116), $$z_i(t + \Delta t) = -h_i\alpha(t + \Delta t) - \sum_{j=1}^{N} J_{i,j}x_j(t + \Delta t) \quad (115)$$

$$z_i(t) = -h_i\alpha(t) - \sum_{j=1}^{N} J_{i,j}x_j(t). \quad (116)$$

where
j is any integer from 1 to N,
$h_i$ is an $i^{th}$ local magnetic field coefficient included in a predetermined array including N local magnetic field coefficients, $J_{i,j}$ is a coupling coefficient at an $i^{th}$ row and a $j^{th}$ column included in a predetermined matrix including N×N coupling coefficients, $x_j(t)$ is the first variable at the previous time for a $j^{th}$ element corresponding to a $j^{th}$ discrete variable among the N discrete variables, $x_j(t+\Delta t)$ is the first variable of the $j^{th}$ element at the target time, p(t) is a predetermined function with t as a variable, in which p(t) increases as t increases, becomes 0 with t at the initial time, and becomes 1 with t at the end time, and α(t) is a predetermined function with t as a variable.

19. The device according to claim 15, wherein the combinatorial optimization problem is a higher order binary optimization (HOBO) problem, and the updating circuit is configured to calculate the second variable of the $i^{th}$ element at the target time by Equation (103) or Equation (104), $$y_i(t+\Delta t)=y_i(t)+[\{-D+p(t+\Delta t)\}x_i(t+\Delta t)+f_i(t+\Delta t)]\Delta t \qquad (103)$$

$$y_i(t+\Delta t)=y_i(t)+[\{-D+p(t)\}x_i(t)+f_i(t)]\Delta t \qquad (104)$$

where $f_i(t+\Delta t)$ is given by Equation (105), and $f_i(t)$ is given by Equation (106), $$f_i(t+\Delta t)=-cz_i(t+\Delta t) \qquad (105)$$

$$f_i(t)=-cz_i(t) \qquad (106)$$

where $z_i(t+\Delta t)$ is given by Equation (117), and
$z_i(t)$ is given by Equation (118), $$z_i(t+\Delta t) = \qquad (117)$$
$$J_i^{(1)}\alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t)x_k(t+\Delta t) + \ldots$$

$$z_i(t) = J_i^{(1)}\alpha(t) + \sum_{j=1}^{N} J_{i,j}^{(2)} x_j(t) + \sum_{j=1}^{N}\sum_{k=1}^{N} J_{i,j,k}^{(3)} x_j(t)x_k(t) + \ldots \qquad (118)$$

where j is any integer from 1 to N, c is a coefficient, $x_j(t)$ is the first variable at the previous time for a $j^{th}$ element corresponding to a $j^{th}$ discrete variable among the N discrete variables, $x_j(t+\Delta t)$ is the first variable of the $j^{th}$ element at the target time, p(t) is a predetermined function with t as a variable, in which p(t) increases as t increases, becomes 0 with t at the initial time, and becomes 1 with t at the end time, α(t) is a predetermined function with t as a variable, k is any integer from 1 to N, $J^{(1)}_i$ is an $i^{th}$ element of a first component in a first-rank tensor, $J^{(1)}_{i,j}$ is an element that is $i^{th}$ of a first component and $j^{th}$ of a second component in a second-rank tensor, $J^{(3)}_{i,j,k}$ is an element that is $i^{th}$ of a first component, $j^{th}$ of a second component, and $k^{th}$ of a third component in a third-rank tensor, $x_k(t)$ is the first variable at the previous time for a $k^{th}$ element corresponding to a $k^{th}$ discrete variable among the N discrete variables, and $x_k(t+\Delta t)$ is the first variable of the $k^{th}$ element at the target time.

20. The device according to claim 15, wherein the combinatorial optimization problem is a higher order binary optimization (HOBO) problem, and the updating circuit is configured to calculate the second variable of the $i^{th}$ element at the target time by Equation (103) or Equation (104), $$y_i(t+\Delta t)=y_i(t)+[\{-D+p(t+\Delta t)\}x_i(t+\Delta t)+f_i(t+\Delta t)]\Delta t \qquad (103)$$

$$y_i(t+\Delta t)=y_i(t)+[\{-D+p(t)\}x_i(t)+f_i(t)]\Delta t \qquad (104)$$

where $f_i(t+\Delta t)$ is given by Equation (105), and $f_i(t)$ is given by Equation (106), $$f_i(t+\Delta t)=-cz_i(t+\Delta t) \qquad (105)$$

$$f_i(t)=-cz_i(t) \qquad (106)$$

where $z_i(t+\Delta t)$ is given by Equation (119), and
$z_i(t)$ is given by Equation (120), $$z_i(t+\Delta t) = \qquad (119)$$
$$J_i^{(1)}\alpha(t+\Delta t) + \sum_{j=1}^{N} J_{i,j}^{(2)} s_j(t+\Delta t) + \sum_{j=1}^{N}\sum_{k=1}^{N} J_{i,j,k}^{(3)} s_j(t+\Delta t)s_k(t+\Delta t) + \ldots$$

$$z_i(t) = J_i^{(1)}\alpha(t) + \sum_{j=1}^{N} J_{i,j}^{(2)} s_j(t) + \sum_{j=1}^{N}\sum_{k=1}^{N} J_{i,j,k}^{(3)} s_j(t)s_k(t) + \ldots \qquad (120)$$

where j is any integer from 1 to N, c is a coefficient, p(t) is a predetermined function with t as a variable, in which p(t) increases as t increases, becomes 0 with t at the initial time, and becomes 1 with t at the end time, α(t) is a predetermined function with t as a variable, $s_j(t+\Delta t)$ is a sign of the first variable of the $j^{th}$ element at the target time, $s_j(t)$ is a sign of the first variable of the $j^{th}$ element at the previous time, k denotes any integer from 1 to N, $J^{(1)}_i$ is an $i^{th}$ element of a first component in a first-rank tensor, $J^{(2)}_{i,j}$ is an element that is $i^{th}$ of a first component and $j^{th}$ of a second component in a second-rank tensor, $J^{(3)}_{i,j,k}$ is an element that is $i^{th}$ of a first component, $j^{th}$ of a second component, and $k^{th}$ of a third component in a third-rank tensor, $s_k(t+\Delta t)$ is a sign of the first variable of the $k^{th}$ element at the target time, and $s_k(t)$ is a sign of the first variable of the $k^{th}$ element at the previous time.

21. A calculation method for solving a combinatorial optimization problem by an information processing device, wherein the information processing device comprises a computing circuit and an output circuit, the computing circuit comprises a first memory, a second memory, and an updating circuit, and the updating circuit comprises a first adder, a second adder, a first constraint circuit, a second constraint circuit, and a determination circuit, the calculation method comprising:

storing a plurality of elements using the first memory and the second memory, wherein elements of the plurality of elements stored in the first memory are associated with a first variable and elements of the plurality of elements stored in the second memory are associated with a second variable;

updating, by the updating circuit coupled to the first memory and the second memory, for each of the plurality of elements associated with the first variable and the second variable, the first variable and the second variable for each of unit times from an initial time to an end time, sequentially for the unit times and alternately between the first variable and the second variable; and outputting, by the output circuit coupled to the computing circuit, a solution to the combinatorial optimization problem that is calculated based on the elements associated with the first variable at the end time, wherein the plurality of elements correspond to a plurality of discrete variables representing the combinatorial optimization problem, the first variable and the second variable are represented by a real number, in an updating process for each of the unit times by the computing circuit, the calculation method comprising, for each of the plurality of elements:

outputting, by the first memory, the first variable to the first adder to update the first variable based on the second variable;

outputting, by the second memory, the second variable to the second adder to update the second variable based on the first variable; and performing a constraining process for the first variable;

the constraining process comprises:

when the first variable is smaller than a predetermined first value, applying, by the determination circuit, a first enable signal to the first constraint circuit, and changing, by the first constraint circuit the first variable to a value equal to or greater than the predetermined first value and equal to or smaller than a predetermined threshold value in response to the first enable signal;

when the first variable is greater than a predetermined second value, applying, by the determination circuit, a second enable signal to the first constraint circuit, and changing, by the first constraint circuit, the first variable to a value equal to or greater than the threshold value and equal to or smaller than the predetermined second value in response to the second enable signal; and when the first variable is equal to or greater than the predetermined first value and equal to or smaller than the predetermined second value, foregoing the changing of the first variable, the predetermined second value is greater than the predetermined first value, and the threshold value is greater than the predetermined first value and smaller than the predetermined second value.

22. A computer program product comprising a non-transitory computer-readable medium including programmed instructions for solving a combinatorial optimization problem by an information processing device, wherein the information processing device comprises a computing circuit and an output circuit, and the computing circuit comprises a first memory, a second memory, and an updating circuit, and the updating circuit comprising a first adder, a second adder, a first constraint circuit, a second constraint circuit, and a determination circuit, the instructions causing the information processing device to execute a calculation method comprising:

storing a plurality of elements using the first memory and the second memory, wherein elements of the plurality of elements stored in the first memory are associated with a first variable and elements of the plurality of elements stored in the second memory are associated with a second variable;

updating, by the updating circuit coupled to the first memory and the second memory, for each of the plurality of elements associated with the first variable and the second variable, the first variable and the second variable for each of unit times from an initial time to an end time, sequentially for the unit times and alternately between the first variable and the second variable; and outputting, by the output circuit coupled to the computing circuit, a solution to the combinatorial optimization problem that is calculated based on the elements associated with the first variable at the end time, wherein the plurality of elements correspond to a plurality of discrete variables representing the combinatorial optimization problem, the first variable and the second variable are represented by a real number, in an updating process for each of the unit times by the computing circuit, the calculation method includes, for each of the plurality of elements:

outputting, by the first memory, the first variable to the first adder to update the first variable based on the second variable;

outputting, by the second memory, the second variable to the second adder to update the second variable based on the first variable;

when the first variable is smaller than a predetermined first value, applying, by the determination circuit, a first enable signal to the first constraint circuit, and changing, by the first constraint circuit, the first variable to a value equal to or greater than the predetermined first value and equal to or smaller than a predetermined threshold value in response to the first enable signal; and when the first variable is greater than a predetermined second value, applying, by the determination circuit, a second enable signal to the first constraint circuit, and changing, by the first constraint circuit, the first variable to a value equal to or greater than the threshold value and equal to or smaller than the predetermined second value in response to the second enable signal, the predetermined second value is greater than the predetermined first value, and the threshold value is greater than the predetermined first value and smaller than the predetermined second value.

* * * * *